US012503637B2

(12) United States Patent
Piri et al.

(10) Patent No.: US 12,503,637 B2
(45) Date of Patent: Dec. 23, 2025

(54) FOAMING AGENTS, GAS MOBILITY CONTROL AGENTS, METHODS, AND SYSTEMS FOR ENHANCED OIL RECOVERY

(71) Applicant: UNIVERSITY OF WYOMING, Laramie, WY (US)

(72) Inventors: Mohammad Piri, Laramie, WY (US); Soheil Saraji, Laramie, WY (US); Alvinda Sri Hanamertani, Laramie, WY (US); Keerti Vardhan Sharma, Laramie, WY (US); Van Si Le, Laramie, WY (US); Magda Ibrahim Youssif Mohamed Soliman, Laramie, WY (US)

(73) Assignee: UNIVERSITY OF WYOMING, Laramie, WY (US)

( * ) Notice: Subject to any disclaimer, the term of this patent is extended or adjusted under 35 U.S.C. 154(b) by 0 days.

(21) Appl. No.: 18/126,194

(22) Filed: Mar. 24, 2023

(65) Prior Publication Data

US 2023/0303912 A1 Sep. 28, 2023

Related U.S. Application Data

(60) Provisional application No. 63/323,910, filed on Mar. 25, 2022.

(51) Int. Cl.
*C09K 8/584* (2006.01)
*C09K 8/70* (2006.01)
(Continued)

(52) U.S. Cl.
CPC .............. *C09K 8/584* (2013.01); *C09K 8/703* (2013.01); *E21B 43/25* (2013.01)

(58) Field of Classification Search
CPC .......... C09K 8/68; C09K 8/584; C09K 8/035; C09K 8/80; C09K 8/602; C09K 8/594;
(Continued)

(56) References Cited

U.S. PATENT DOCUMENTS 4,620,983 A 11/1986 Zimmer
2020/0172795 A1 * 6/2020 AlYousif .............. E21B 43/166

FOREIGN PATENT DOCUMENTS

CA 3149996 A1 * 4/2021 ............ C09K 8/584
WO 2020191491 A1 10/2020

OTHER PUBLICATIONS

International Search Report and Written Opinion dated Aug. 15, 2023 for Application No. PCT/US23/16227.

(Continued)

*Primary Examiner* — Zakiya W Bates
(74) *Attorney, Agent, or Firm* — Patterson + Sheridan, LLP

(57) ABSTRACT

Embodiments relate to methods and materials for foam production in enhanced oil recovery operations and to foaming agents, gas mobility control agents for use in porous media, compositions comprising such agents, methods for using such agents, methods for generating foams, and systems for enhanced oil recovery. In an embodiment, a method for recovery of oil from a porous rock formation includes contacting a foaming fluid and a surfactant solution with the porous rock formation, and generating a foam comprising the foaming fluid and the surfactant solution. The method further includes mobilizing oil from the porous rock formation by contacting the porous rock formation with the foam, and collecting at least a portion of the mobilized oil.

17 Claims, 18 Drawing Sheets

(51) Int. Cl.
*E21B 43/22* (2006.01)
*E21B 43/25* (2006.01)

(58) Field of Classification Search
CPC .......... C09K 8/94; C09K 8/52; E21B 43/267; E21B 43/26; E21B 43/16; E21B 43/24; E21B 43/04; E21B 43/164; E21B 33/13; E21B 37/06; E21B 43/168; E21B 43/166
See application file for complete search history.

(56) References Cited

OTHER PUBLICATIONS

International Search Report and Written Opinion dated Jul. 28, 2023 for Application No. PCT/US23/16237.
Memon et al. "Study of blended surfactants to generate stable foam in presence of crude oil for gas mobility control", J Petrol Explor Prod Technol. 2017. 7: pp. 77-85.
Liu et al. "Ultra-Low Interfacial Tension Foam System for Enhanced Oil Recovery", Appl. Sci. 2019. 9, 2155, 13 pages.
Osei-Bonsu et al. "Foam stability in the presence and absence of hydrocarbons: From bubble to bulk-scale", Colloids and Surfaces A: Physicochem. Eng. Aspects 481. 2015. pp 514-526.
Ammonyx Lmdo, Lauramidopropylamine Oxide, Stepan Product Bulletin, Oct. 2017.
Han et al. "Recent Developments on Surfactants for Enhanced Oil Recovery", Tenside Surf. Det. 2021. 58, 3, pp. 164-176.
Fu, et al. "Rheology and stability of nanoparticle-stabilized CO2 foam under reservoir conditions." Journal of Petroleum Science and Engineering 196 (Jan. 1, 2021 ): 107671.
Pang. "The blocking ability and flowing characteristics of steady foams in porous media." Transport in porous media 85 (Mar. 11, 2010): 299-316.
Sun, et al. "Utilization of surfactant-stabilized foam for enhanced oil recovery by adding nanoparticles." Energy & Fuels 28.4 (Apr. 17, 2014): 2384-2394.
United Arab Emirates Office Action dated Oct. 21, 2024 for Application No. P2024-02508.
R. Farajzadeh, R. M. Muruganathan, W. R. Rossen, and R. Krastev, "Effect of gas type on foam film permeability and its implications for foam flow in porous media," Advances in Colloid and Interface Science, vol. 168, pp. 71-78, 2011/10/14/ 2011.
G. Q. Tang and A. R. Kovscek, "Trapped Gas Fraction During Steady-State Foam Flow," Transport in Porous Media, vol. 65, pp. 287-307, 2006/11/01 2006.
R. A. Kil, Q. P. Nguyen, and W. R. Rossen, "Determining Trapped Gas in Foam From Computed-Tomography Images," SPE Journal, vol. 16, pp. 24-34, 2011/3/1/ 2011.
D. Cohen, T. W. Patzek, and C. J. Radke, "Two-Dimensional Network Simulation of Diffusion-Driven Coarsening of Foam Inside a Porous Medium," Journal of Colloid and Interface Science, vol. 179, pp. 357-373, 1996/05/10/ 1996.
D. Cohen, T. W. Patzek, and C. J. Radke, "Onset of Mobilization and the Fraction of Trapped Foam in Porous Media," Transport in Porous Media, vol. 28, pp. 253-284, 1997/09/01 1997.
Q. Nguyen, p. L. Zitha, and p. K. Currie, "Effect of foam films on gas diffusion," Journal of colloid and interface science, vol. 248, pp. 467-476, 2002.
W. R. Rossen, "Foams in Enhanced Oil Recovery," in Foams Theory Measurements Applications, R. K. Prud'homme and S. A. Khan, Eds., ed New York: Marvel Dekker, Inc., 1996, pp. 414-457.
F. Friedmann, W. H. Chen, and p. A. Gauglitz, "Experimental and Simulation Study of High-Temperature Foam Displacement in Porous Media," SPE Reservoir Engineering, vol. 6, pp. 37-45, 1991.
S. H. Yang and R. L. Reed, "Mobility Control Using CO2 Forms," presented at the SPE Annual Technical Conference and Exhibition, San Antonio, Texas, 1989.
S. I. Chou, "Conditions for Generating Foam in Porous Media," presented at the SPE Annual Technical Conference and Exhibition, Dallas, Texas, 1991.
R. Krustev and H. J. Muller, "Effect of Film Free Energy on the Gas Permeability of Foam Films," Langmuir, vol. 15, pp. 2134-2141, Mar. 1, 1999 1999.
G. Andreatta, L.-T. Lee, F. K. Lee, and J .- J. Benattar, "Gas Permeability in Polymer- and Surfactant-Stabilized Bubble Films," The Journal of Physical Chemistry B, vol. 110, pp. 19537-19542, Oct. 1, 2006 2006.
F. G. Gandolfo and H. L. Rosano, "Interbubble gas diffusion and the stability of foams," Journal of colloid and interface science, vol. 194, pp. 31-36, 1997.
A. S. Aronson, V. Bergeron, M. E. Fagan, and C. J. Radke, "The influence of disjoining pressure on foam stability and flow in porous media," Colloids and Surfaces A: Physicochemical and Engineering Aspects, vol. 83, pp. 109-120, Mar. 18, 1994 1994.
M. A. Q. Siddiqui and R. N. Gajbhiye, "Stability and texture of CO2/N2 foam in sandstone," Colloids and Surfaces A: Physicochemical and Engineering Aspects, 2017.
R. Farajzadeh, A. Andrianov, H. Bruining, and p. L. J. Zitha, "Comparative Study of CO2 and N2 Foams in Porous Media at Low and High Pressure-Temperatures," Industrial & Engineering Chemistry Research, vol. 48, pp. 4542-4552, 2009/05/06 2009.
Y. Zeng, R. Farajzadeh, A. A. Eftekhari, S. Vincent-Bonnieu, A. Muthuswamy, W. R. Rossen, et al., "Role of Gas Type on Foam Transport in Porous Media," Langmuir, vol. 32, pp. 6239-6245, Jun. 28, 2016 2016.
A. S. Hanamertani, R. M. Pilus, N. A. Manan, S. Ahmed, and M. Awang, "Ionic Liquid Application in Surfactant Foam Stabilization for Gas Mobility Control," Energy & Fuels, vol. 32, pp. 6545-6556, 2018.
S. Ahmed, K. A. Elraies, M. R. Hashmet, A. S. Hanamertani, and S. R. M. Shafian, "Laboratory Study of CO2 Foam for Enhanced Oil Recovery: Advanced Screening, Optimization, and Evaluation," presented at the SPE Kingdom of Saudi Arabia Annual Technical Symposium and Exhibition, Dammam, Saudi Arabia, 2018.
J. A. Clark and E. E. Santiso, "Carbon Sequestration through CO2 Foam-Enhanced Oil Recovery: A Green Chemistry Perspective," Engineering, vol. 4, pp. 336-342, Jun. 1, 2018 2018.
M. G. Aarra, A. Skauge, J. Solbakken, and P. A. Ormehaug, "Properties of N2- and CO2-foams as a function of pressure," Journal of Petroleum Science and Engineering, vol. 116, pp. 72-80, 2014.
D.-X. Du, A. N. Beni, R. Farajzadeh, and p. L. J. Zitha, "Effect of Water Solubility on Carbon Dioxide Foam Flow in Porous Media: An X-ray Computed Tomography Study," Industrial & Engineering Chemistry Research, vol. 47, pp. 6298-6306, Aug. 1, 2008 2008.
M. G. Aarra, A. Skauge, and H. A. Martinsen, "Fawag: A Breakthrough for EOR in the North Sea," presented at the SPE Annual Technical Conference and Exhibition, San Antonio, Texas, 2002.
A. Skauge, M. G. Aarra, L. Surguchev, H. A. Martinsen, and L. Rasmussen, "Foam-Assisted WAG: Experience from the Snorre Field," presented at the SPE/DOE Improved Oil Recovery Symposium, Tulsa, Oklahoma, 2002.
T. Blaker, H. K. Celius, T. Lie, H. A. Martinsen, L. Rasmussen, and F. Vassenden, "Foam for Gas Mobility Control in the Snorre Field: The FAWAG Project," SPE Reservoir Evaluation & Engineering, vol. 5, pp. 317-323, 2002.
K. Mannhardt, J. J. Novosad, and L. L. Schramm, "Comparative Evaluation of Foam Stability to Oil," SPE Reservoir Evaluation & Engineering, vol. 3, pp. 1094-6470, 2000.
R. K. Bahrim, Y. Zeng, S. Vincent Bonnieu, J. Groenenboom, S. Mohd Shafian, A. Abdul Manap, et al., "A Study of Methane Foam in Reservoir Rocks for Mobility Control at High Temperature with Varied Permeabilities: Experiment and Simulation," in SPE/IATMI Asia Pacific Oil & Gas Conference and Exhibition, 2017.
Y. Sun, X. Qi, H. Sun, H. Zhao, and Y. Li, "Understanding about How Different Foaming Gases Effect the Interfacial Array Behaviors of Surfactants and the Foam Properties," Langmuir, vol. 32, pp. 7503-7511, Au. 2, 2016 2016.
M. Lv, S. Wang, Z. Zhai, X. Luo, and Z. Jing, "Comparative investigation of the static and dynamic properties of CO2 foam and N2 foam," The Canadian Journal of Chemical Engineering, vol. 94, pp. 1313-1321, 2016.

(56) References Cited

OTHER PUBLICATIONS

J. S. Solbakken, A. Skauge, and M. G. Aarra, "Supercritical CO2 Foam—The Importance of CO2 Density on Foams Performance," presented at the SPE Enhanced Oil Recovery Conference, Kuala Lumpur, Malaysia, 2013.
J. Chad, P. Malsalla, and J. J. Novosad, "Foam Forming Surfactants In Pembina/Ostracod 'G' Pool," presented at the Annual Technical Meeting, Calgary, Alberta, 1988.
P. C. Liu and G. J. Besserer, "Application of Foam Injection in Triassic Pool, Canada: Laboratory and Field Test Results," presented at the SPE Annual Technical Conference and Exhibition, Houston, Texas, 1988.
M. G. Aarra, P. A. Ormehaug, A. Skauge, and S. K. Masalmeh, "Experimental Study of CO2- and Methane- Foam Using Carbonate Core Material at Reservoir Conditions," presented at the SPE Middle East Oil and Gas Show and Conference, Manama, Bahrain, 2011.
B. Kurtoglu, H. Kazemi, R. Rosen, W. Mickelson, and T. Kosanke, "A Rock and Fluid Study of Middle Bakken Formation: Key to Enhanced Oil Recovery," presented at the SPE/CSUR Unconventional Resources Conference - Canada, Calgary, Alberta, Canada, 2014.
S. M. Hosseini-Nasab and p. L. J. Zitha, "Investigation of certain physical-chemical features of oil recovery by an optimized alkali-surfactant-foam (ASF) system," Colloid and polymer science, vol. 295, pp. 1873-1886, 2017.
M. Simjoo, Y. Dong, A. Andrianov, M. Talanana, and p. L. J. Zitha, "Novel Insight Into Foam Mobility Control," SPE Journal, vol. 18, pp. 416-427, 2013.
M. Amirmoshiri, Y. Zeng, Z. Chen, P. M. Singer, M. C. Puerto, H. Grier, et al., "Probing the Effect of Oil Type and Saturation on Foam Flow in Porous Media: Core-Flooding and Nuclear Magnetic Resonance (NMR) Imaging," Energy & Fuels, vol. 32, pp. 11177-11189, Nov. 15, 2018 2018.
D. Weaire, S. Hutzler, G. Verbist, and E. Peters, "A Review of Foam Drainage," in Advances in Chemical Physics, ed: John Wiley & Sons, Inc., 1997, pp. 315-374.
M. Simjoo, T. Rezaei, A. Andrianov, and P. L. J. Zitha, "Foam stability in the presence of oil: Effect of surfactant concentration and oil type," Colloids and Surfaces A: Physicochemical and Engineering Aspects, vol. 438, pp. 148-158, 2013.
M. Vera and D. J. Durian, "Enhanced drainage and coarsening in aqueous foams," Physical review letters, vol. 88, p. 088304, 2002.
A. S. Hanamertani, R. M. Pilus, N. A. Manan, and M. I. A. Mutalib, "The use of ionic liquids as additive to stabilize surfactant foam for mobility control application," Journal of Petroleum Science and Engineering, vol. 167, pp. 192-201, 2018.
B. B. Maini and V. Ma, "Laboratory Evaluation Of Foaming Agents For High-Temperature Applications—I. Measurements Of Foam Stability At Elevated Temperatures And Pressures," Journal of Canadian Petroleum Technology, vol. 25, pp. 65-69, 1986.
S. I. Kam, W. W. Frenier, S. N. Davies, and W. R. Rossen, "Experimental Study of High-Temperature Foam for Acid Diversion," presented at the SPE European Formation Damage Conference, The Hague, Netherlands, 2003.
D. K. Olsen, "Use of amine oxide surfactants for chemical flooding EOR (enhanced oil recovery)," National Inst. for Petroleum and Energy Research, Bartlesville, OK (USA)1989.
M. S. Kamal, S. M. Shakil Hussain, and L. T. Fogang, "A Zwitterionic Surfactant Bearing Unsaturated Tail for Enhanced Oil Recovery in High-Temperature High-Salinity Reservoirs," Journal of Surfactants and Detergents, vol. 21, pp. 165-174, Jan. 1, 2018 2018.
D. Wang, C. Liu, W. Wu, and G. Wang, "Development of an Ultralow Interfacial Tension Surfactant in Systems With No. Alkali for Chemical Flooding," in SPE Symposium on Improved Oil Recovery, Tulsa, Oklahoma, USA, 2008.
A. Kumar and A. Mandal, "Evaluation of Zwitterionic Surfactant for Applicability in Enhanced Oil Recovery," in SPE Oil and Gas India Conference and Exhibition, 2019.
D. Floyd, "Applications of Amphoterics-Based Formulations," in Handbook of Detergents, Part E: Applications. vol. 141, ed, 2008, p. 287.
C. H. Tan, Z. J. Huang, and X. G. Huang, "Rapid determination of surfactant critical micelle concentration in aqueous solutions using fiber-optic refractive index sensing," Anal Biochem, vol. 401, pp. 144-147, Jun. 1, 2010.
S. K. Shah, S. K. Chatterjee, and A. Bhattarai, "The Effect of Methanol on the Micellar Properties of Dodecyltrimethylammonium Bromide (DTAB) in Aqueous Medium at Different Temperatures," Journal of Surfactants and Detergents, vol. 19, pp. 201-207, Jan. 1, 2016 2016.
K. Staszak, D. Wieczorek, and K. Michocka, "Effect of Sodium Chloride on the Surface and Wetting Properties of Aqueous Solutions of Cocamidopropyl Betaine," Journal of Surfactants and Detergents, vol. 18, pp. 321-328, Mar. 1, 2015 2015.
J. Wang, O. Morales-Collazo, and A. Wei, "Micellization and Single-Particle Encapsulation with Dimethylammoniopropyl Sulfobetaines," ACS Omega, vol. 2, pp. 1287-1294, Apr. 30, 2017 2017.
L. L. Schramm, Emulsions, Foams, and Suspensions: Fundamentals and Applications. Weinheim: WILEY-VCH, 2005.
Y. Wang, Y. Zhang, Y. Liu, L. Zhang, S. Ren, J. Lu, et al., "The stability study of CO2 foams at high pressure and high temperature," Journal of Petroleum Science and Engineering, vol. 154, pp. 234-243, Jun. 1, 2017 2017.
R. Farajzadeh, S. Vincent-Bonnieu, and N. Bourada Bourada, "Effect of Gas Permeability and Solubility on Foam," Journal of Soft Matter, vol. 2014, p. 145352, Nov. 30, 2014 2014.
R. Farajzadeh, R. Krastev, and p. L. J. Zitha, "Foam film permeability: Theory and experiment," Advances in Colloid and Interface Science, vol. 137, pp. 27-44, Feb. 28, 2008 2008.
S. J. Neethling, H. T. Lee, and p. Grassia, "The growth, drainage and breakdown of foams," Colloids and Surfaces A: Physicochemical and Engineering Aspects, vol. 263, pp. 184-196, Aug. 1, 2005 2005.
H. M. Princen and S. G. Mason, "The permeability of soap films to gases," Journal of Colloid Science, vol. 20, pp. 353-375, Apr. 1, 1965 1965.
H. M. Princen, J. T. G. Overbeek, and S. G. Mason, "The permeability of soap films to gases: Ii. A simple mechanism of monolayer permeability," Journal of Colloid and Interface Science, vol. 24, pp. 125-130, May 1, 1967 1967.
R. Sun, W. Hu, and Z. Duan, "Prediction of Nitrogen Solubility in Pure Water and Aqueous NaCl Solutions up to High Temperature, Pressure, and Ionic Strength," Journal of Solution Chemistry, vol. 30, pp. 561-573, Jun. 1, 2001 2001.
A. Hemmati-Sarapardeh, M. N. Amar, M. R. Soltanian, Z. Dai, and X. Zhang, "Modeling CO2 Solubility in Water at High Pressure and Temperature Conditions," Energy & Fuels, vol. 34, pp. 4761-4776, Apr. 16, 2020 2020.
Z. Duan, N. Møller, J. Greenberg, and J. H. Weare, "The prediction of methane solubility in natural waters to high ionic strength from 0 to 250°C and from 0 to 1600 bar," Geochimica et Cosmochimica Acta, vol. 56, pp. 1451-1460, Apr. 1, 1992 1992.
R. M. Muruganathan, H. J. Muller, H. Mohwald, and R. Krastev, "Effect of Headgroup Size on Permeability of Newton Black Films," Langmuir, vol. 21, pp. 12222-12228, Dec. 1, 2005 2005.
R. Krustev, D. Platikanov, A. Stankova, and M. Nedyalkov, "Permeation of Gas through Newton Black Films at Different Chain Length of the Surfactant," Journal of Dispersion Science and Technology, vol. 18, pp. 789-800, Sep. 1, 1997 1997.
K. Koczo, L. A. Lobo, and D. T. Wasan, "Effect of oil on foam stability: Aqueous foams stabilized by emulsions," Journal of Colloid and Interface Science, vol. 150, pp. 492-506, May 1, 1992 1992.
S. J. Neethling, G. Morris, and P. R. Garrett, "Modeling Oil Droplets in Plateau Borders," Langmuir, vol. 27, pp. 9738-9747, Aug. 11, 2011 2011.
M. I. Kuhlman, "Visualizing the effect of light oil on CO2 foams," Journal of Petroleum Technology, vol. 42, pp. 902-908, 1990.
W. Yu, H. R. Lashgari, K. Wu, and K. Sepehrnoori, "CO2 injection for enhanced oil recovery in Bakken tight oil reservoirs," Fuel, vol. 159, pp. 354-363, 2015 Nov. 1, 2015.

(56) References Cited

OTHER PUBLICATIONS

W. Yu and K. Sepehrnoori, "CO2 Injection for Enhanced Oil Recovery in Tight Oil Reservoirs," in Shale Gas and Tight Oil Reservoir Simulation, W. Yu and K. Sepehrnoori, Eds., ed: Gulf Professional Publishing, 2018, pp. 333-376.

A. K. Vikingstad, A. Skauge, H. Høiland, and M. Aarra, "Foam-oil interactions analyzed by static foam tests," Colloids and Surfaces A: Physicochemical and Engineering Aspects, vol. 260, pp. 189-198, 2005.

A. Andrianov, R. Farajzadeh, M. M. Nick, M. Talanana, and P. L. J. Zitha, "Immiscible Foam for Enhancing Oil Recovery: Bulk and Porous Media Experiments," presented at the SPE Enhanced Oil Recovery Conference, Kuala Lumpur, Malaysia, 2011.

F. E. Suffridge, K. T. Raterman, and G. C. Russell, "Foam Performance Under Reservoir Conditions," presented at the SPE Annual Technical Conference and Exhibition, San Antonio, Texas, 1989.

Y. Yu, Z. A. Soukup, and S. Saraji, "An Experimental Study of In-situ Foam Rheology: Effect of Stabilizing and Destabilizing Agents," Colloids and Surfaces A: Physicochemical and Engineering Aspects, 2019.

L. A. Lobo, A. D. Nikolov, and D. T. Wasan, "Foam Stability in the Presence of Oil: On the Importance of the Second Virial Coefficient," Journal of Dispersion Science and Technology, vol. 10, pp. 143-161, Jan. 1, 1989 1989.

K. Ma, J. L. Lopez-Salinas, M. C. Puerto, C. A. Miller, S. L. Biswal, and G. J. Hirasaki, "Estimation of Parameters for the Simulation of Foam Flow through Porous Media. Part 1: The Dry-Out Effect," Energy & Fuels, vol. 27, pp. 2363-2375, 2013.

Z. I. Khatib, G. J. Hirasaki, and A. H. Falls, "Effects of Capillary Pressure on Coalescence and Phase Mobilities in Foams Flowing Through Porous Media," SPE Reservoir Engineering, vol. 3, pp. 919-926, 1988.

R. Farajzadeh, M. Lotfollahi, A. Eftekhari, W. Rossen, and G. Hirasaki, "Effect of permeability on implicit-texture foam model parameters and the limiting capillary pressure," Energy & fuels, vol. 29, pp. 3011-3018, 2015.

P. J. Linstrom and W. G. Mallard, "The NIST Chemistry WebBook: A Chemical Data Resource on the Internet," Journal of Chemical & Engineering Data, vol. 46, pp. 1059-1063, Sep. 1, 2001 2001.

R. Farajzadeh, S. Vincent-Bonnieu, and N. Bourada Bourada, "Effect of gas permeability and solubility on foam," Journal of Soft Matter, vol. 2014, 2014. -- duplicate ( 55).

T. Zhu, D. O. Ogbe, and S. Khataniar, "Improving the Foam Performance for Mobility Control and Improved Sweep Efficiency in Gas Flooding," Industrial & Engineering Chemistry Research, vol. 43, pp. 4413-4421, 2004.

J. M. Alvarez, H. J. Rivas, and W. R. Rossen, "Unified Model for Steady-State Foam Behavior at High and Low Foam Qualities," SPE Journal, vol. 6, pp. 325-333, Sep. 1, 2001 2001.

C. Mamun, J. Rong, S. Kam, H. Liljestrand, and W. Rossen, "Extending foam technology from improved oil recovery to environmental remediation," in SPE Annual Technical Conference and Exhibition, 2002.

G. Jian, L. Zhang, C. Da, M. Puerto, K. P. Johnston, S. L. Biswal, et al., "Evaluating the Transport Behavior of CO2 Foam in the Presence of Crude Oil under High-Temperature and High-Salinity Conditions for Carbonate Reservoirs," Energy & Fuels, vol. 33, pp. 6038-6047, Jul. 18, 2019 2019.

H. Lee, J. Heller, and A. Hoefer, "Change in apparent viscosity of CO2 foam with rock permeability," SPE reservoir engineering, vol. 6, pp. 421-428, 1991.

* cited by examiner

FOAMING AGENTS, GAS MOBILITY CONTROL AGENTS, METHODS, AND SYSTEMS FOR ENHANCED OIL RECOVERY

CROSS-REFERENCES TO RELATED APPLICATIONS

This application claims benefit of and priority to U.S. Provisional Patent Application Ser. No. 63/323,910, filed on Mar. 25, 2022, which is incorporated herein by reference in its entirety.

GOVERNMENT RIGHTS

This invention was made with government support under (DE-FE0031787) awarded by the Department of Energy. The government has certain rights in the invention.

BACKGROUND

Field

Embodiments of the present disclosure generally relate to materials and methods for foam generation. More specifically, embodiments of the present disclosure relate to foaming agents, gas mobility control agents for use in porous media, compositions comprising such agents, methods for using such agents, methods for generating foams, and systems for enhanced oil recovery.

Description of the Related Art

Increasing oil recovery is a major technical challenge in the upstream petroleum industry during the oil and gas production from unconventional reservoirs or formations. One method for increasing the oil recovery in such reservoirs is with the use of foam. Foam has the ability to block and control the channeling of fluids within oil-bearing formations. Moreover, foam has beneficial mobility control characteristics. A foam's mobility control generally refers to the ability of foam to block, divert, or control a flow of fluid from high-permeability to low-permeability regions of formations. Generally, foams reduce a gas's mobility. Foam is typically generated using gases such as nitrogen and carbon dioxide and is stabilized by chemical materials such as surfactants with and without other stabilizers. The success of foams to increase oil recovery depends, to a large extent, on the stability of the foam.

Major challenges, however, are presented by the reservoir conditions, the foam's formulation, as well as the gases used to generate the foam. Each of these can reduce the stability of the foam, thereby undermining the action of the foam and reducing its success in mobilizing and producing oil. For example, the high temperatures, pressures, and salinity of the reservoir, as well as reservoir heterogeneities (for example, porosity, scale, and wettability), affect the foam's compatibility and tolerance with fluids and surfaces in the reservoir. Conventional foam formulations, including its chemical make-up, as well as conventional foam generation methods such as the type and solubility of foaming gas(es) used to generate the foam, have been unable to achieve sufficient mobility control and noticeable recovery of oil from reservoirs for at least the reason that conventional technologies do not produce stable and strong foams for practical applications.

There is a need for new and improved methods and materials for foam generation in enhanced oil recovery (EOR) operations.

SUMMARY

In an embodiment, a method for recovering oil from a porous rock formation is provided. The method includes contacting the porous rock formation with a foaming fluid and a surfactant solution; generating a foam comprising the foaming fluid and the surfactant solution, the surfactant solution comprising brine and one or more surfactants, at least one surfactant of the one or more surfactants comprising a primary foaming agent represented by formula (FX1):

(FX1)

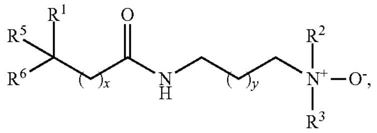

wherein: x is a number selected from 6 to 13; y is a number selected from 0 to 3; each of $R^1$, $R^2$, $R^3$, $R^4$, $R^5$, and $R^6$, is, independently, hydrogen, substituted $C_{1-3}$ hydrocarbyl, or unsubstituted $C_{1-3}$ hydrocarbyl group; and when the surfactant solution comprises more than one surfactant, the primary foaming agent is the surfactant of highest concentration in the surfactant solution. The method further includes mobilizing oil from the porous rock formation by contacting the porous rock formation with the foam; and collecting at least a portion of the mobilized oil.

In another embodiment, a method for recovering oil is provided. The method includes injecting a foaming gas and a surfactant solution into a porous rock formation, wherein: the surfactant solution comprises one or more surfactants; a first surfactant of the one or more surfactants comprises lauramidopropylamine oxide, myristamidopropylamine oxide, or a mixture of lauramidopropylamine oxide and myristamidopropylamine oxide; and when the surfactant solution comprises more than one surfactant, the first surfactant is present in the surfactant solution at a higher concentration than other surfactants. The method further includes generating a foam comprising the foaming gas, the surfactant solution, and a brine of the porous rock formation; mobilizing oil from the porous rock formation by contacting the porous rock formation with the foam; and collecting at least a portion of the mobilized oil.

In another embodiment, a composition for oil recovery is provided. The composition includes a foam comprising: a phase comprising one or more foaming fluids; and an aqueous phase comprising one or more surfactants and brine, the one or more surfactants comprising a primary foaming agent represented by formula (FX1):

(FX1)

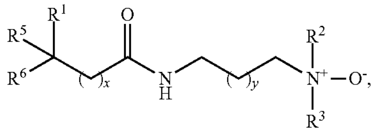

wherein: x is a number selected from 6 to 13; y is a number selected from 0 to 3; each of $R^1$, $R^2$, $R^3$, $R^4$, $R^5$, and $R^6$, is, independently, hydrogen, substituted $C_{1-3}$ hydrocarbyl group, or unsubstituted $C_{1-3}$ hydrocarbyl group; and when more than one surfactant is present, the primary foaming agent has the highest concentration of the surfactants.

In another embodiment, a composition for oil recovery is provided. The composition includes a foam comprising: a phase comprising one or more foaming fluids; and an aqueous phase comprising one or more surfactants and a brine, the one or more surfactants comprising a primary foaming agent, the primary foaming agent comprising lauramidopropylamine oxide, myristamidopropylamine oxide, or a mixture of lauramidopropylamine oxide and myristamidopropylamine oxide, wherein, when more than one surfactant is present, the primary foaming agent has the highest concentration of the more than one surfactant present.

In another embodiment, an enhanced oil recovery system is provided. The enhanced oil recovery system includes a rock formation; and a foam comprising: a phase comprising one or more foaming fluids; and an aqueous phase comprising one or more surfactants in brine solution, the one or more surfactants comprising a primary foaming agent represented by formula (FX1):

(FX1)

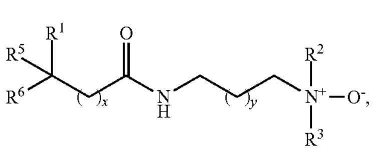

wherein: x is a number selected from 6 to 13; y is a number selected from 0 to 3; each of $R^1$, $R^2$, $R^3$, $R^4$, $R^5$, and $R^6$, is, independently, hydrogen, substituted $C_{1-3}$ hydrocarbyl group, or unsubstituted $C_{1-3}$ hydrocarbyl group; and when more than one surfactant is present, the primary foaming agent has the highest concentration of the more than one surfactant present. The enhanced oil recovery system further includes a proppant, and a subterranean oil.

In another embodiment, an enhanced oil recovery system is provided. The enhanced oil recovery system includes a rock formation; a subterranean oil; and a foam comprising: a phase comprising one or more foaming fluids; and an aqueous phase comprising one or more surfactants in brine solution, the one or more surfactants comprising a primary foaming agent, the primary foaming agent comprising lauramidopropylamine oxide, myristamidopropylamine oxide, or a mixture of lauramidopropylamine oxide and myristamidopropylamine oxide.

In another embodiment, a composition for oil recovery is provided. The composition includes a surfactant represented by formula (FX1):

(FX1)

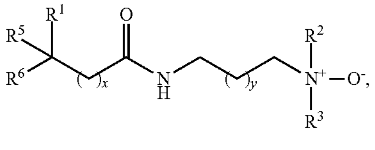

wherein: x is a number selected from 6 to 13; y is a number selected from 0 to 3; and each of $R^1$, $R^2$, $R^3$, $R^4$, $R^5$, and $R^6$, is, independently, hydrogen, substituted $C_{1-3}$ hydrocarbyl group, or unsubstituted $C_{1-3}$ hydrocarbyl group.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
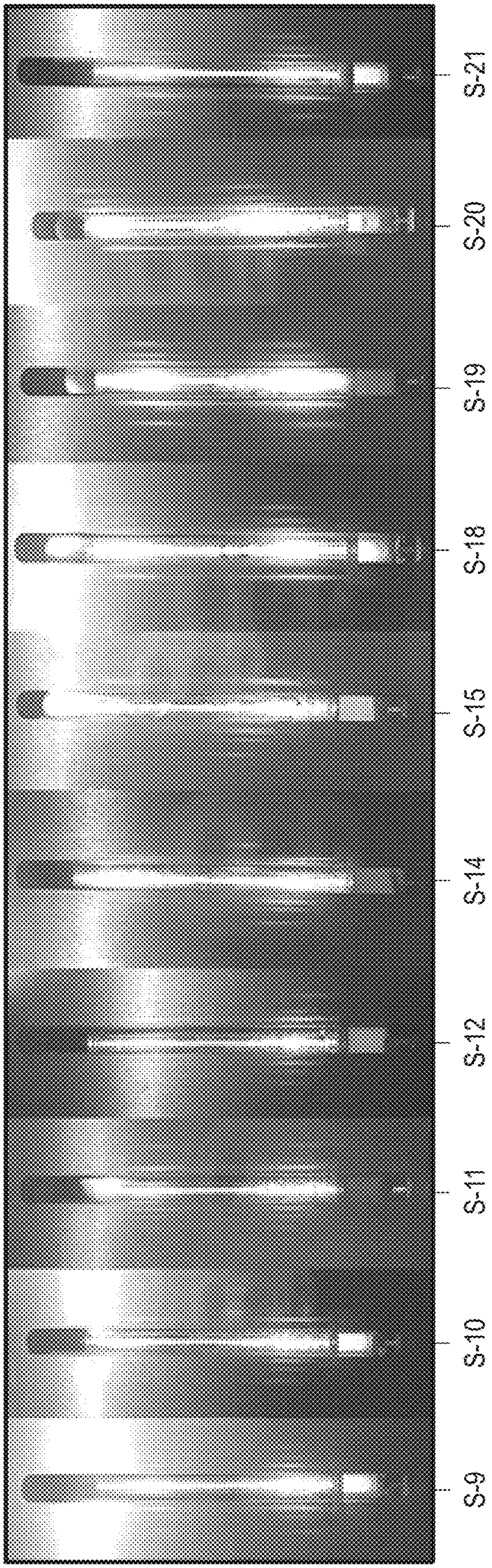
FIG. 1 illustrates phase behavior of selected surfactants during a chemical compatibility and stability test in 200,000 mg/L salinity brine at 90° C. and 13.8 MPa according to at least one embodiment of the present disclosure.

Embodiments of the present disclosure generally relate to materials and methods for foam generation. More specifically, embodiments of the present disclosure relate to foaming agents, gas mobility control agents for use in porous media, compositions comprising such agents, methods for using such agents, methods for generating foams, and systems for enhanced oil recovery.

The inventors have found new and improved compositions and methods for generating foams. Embodiments of the compositions and methods described herein enable, for example, the formation of stable foams where conventional technologies have failed. For example, foams generated by compositions and methods of the present disclosure can exhibit high stability and high performance under the harsh conditions typically present at reservoirs (for example, high temperatures, high pressures, and high salinities). Moreover, the foams generated by compositions and methods described herein can control, direct, or channel the flow of fluids in reservoirs consisting of a single lithology or reservoirs having high lithological heterogeneity.

The inventors have also found that the foaming agent, or surfactant, can be utilized to stabilize foam in the presence of crude oil. Although surfactants are known, conventional surfactants are not utilized for oil recovery due to, for example, the harsh conditions of an oil producing reservoir. There is also no indication in the literature that conventional surfactants known to stabilize foams (in a shampoo, soap, cleaner, detergent) would perform as indicated in oil producing reservoir. Various reasons for this include: the crude oil (which destabilizes foam) present; the non-water wet conditions present (rocks in reservoirs are typically non-water wet, e.g., water repellent); the brine composition in terms of, for example, salinity and ionic composition; the temperature of the reservoir; and the pressure of the reservoir.

As used herein, and unless the context indicates otherwise, the terms “foaming agent” and “surfactant” are used interchangeably such that reference to one includes reference to the other. For example, reference to "foaming agent" includes reference to "foaming agent" and "surfactant."

Foaming agents, or surfactants, can generally be used in both static and dynamic conditions. Gas mobility control agents, which are combination of foaming gas and surfactants, are used for gas mobility control, and such gas mobility control is a result of foam generation in dynamic conditions (in porous media).

As used herein, a "composition" can include component(s) of the composition, reaction product(s) of two or more components of the composition, and/or a remainder balance of remaining starting component(s). Compositions of the present disclosure can be prepared by any suitable mixing process.

Although embodiments herein are described with respect to a foaming gas, foaming fluids can be used. That is, the chemistry described herein can be deployed using foaming fluid(s) which can take the form of, for example, gas(es), liquid(s), and/or supercritical fluid(s). As used herein, foaming fluid can be used interchangeably with foaming gas such that foaming fluid refers to both foaming gas and foaming fluid and vice-versa unless the context indicates otherwise.

For example, the foaming fluid can be a supercritical fluid of, for example, a hydrocarbon gas (such as methane, ethane, propane, and butane, among others), carbon dioxide, nitrogen, and/or other gases described herein. As another example, a method for recovering oil can include contacting a porous rock formation with a foaming fluid (such as a foaming gas) and a surfactant solution; generating a foam comprising the foaming fluid and the surfactant solution; mobilizing oil from the porous rock formation by contacting the porous rock formation with the foam; and collecting at least a portion of the mobilized oil.

In yet another example, a foam described herein can include a phase (for example, a supercritical fluid phase, a gaseous phase, a liquid phase, or combinations thereof) comprising one or more foaming fluids and an aqueous phase comprising one or more surfactants. Such foams can make up at least a portion of a composition for oil recovery. Additionally, or alternatively, such foams can make be utilized in enhanced oil recovery systems that include a rock formation and a foam.

For the purposes of this present disclosure, and unless otherwise specified, the term "hydrocarbyl" or "hydrocarbyl group" interchangeably refers to a group consisting of hydrogen and carbon atoms only. The hydrocarbyl can be substituted or unsubstituted, linear or branched, cyclic or acyclic, aromatic or non-aromatic, or combinations thereof. The hydrocarbyl can be saturated, partially unsaturated, or unsaturated. For example, the hydrocarbyl can be alkyl, alkenyl, alkynyl, aryl, among others.

Chemical moieties of the application can be substituted or unsubstituted unless otherwise specified. "Substituted hydrocarbyl" refers to a hydrocarbyl in which at least one hydrogen has been substituted with at least one heteroatom or heteroatom-containing group, such as one or more elements from Group 13-17 of the periodic table of the elements, such as halogen (F, Cl, Br, or I), O, N, Se, Te, P, As, Sb, S, B, Si, Ge, Sn, Pb, and the like, such as C(O)R*, C(C)NR*$_2$, C(O)OR*, NR*$_2$, OR*, SeR*, TeR*, PR*$_2$, AsR*$_2$, SbR*$_2$, SR*, $SO_x$ (where x=2 or 3), BR*$_2$, SiR*$_3$, GeR*$_3$, SnR*$_3$, PbR*$_3$, and the like or where at least one heteroatom has been inserted within the hydrocarbyl such as one or more of halogen (Cl, Br, I, F), O, N, S, Se, Te, NR*, PR*, AsR*, SbR*, BR*, SiR*$_2$, GeR*$_2$, SnR*$_2$, PbR*$_2$, and the like, where R* is, independently, hydrogen, hydrocarbyl (for example, $C_1$-$C_{10}$), or two or more R* may join together to form a substituted or unsubstituted completely saturated, partially unsaturated, fully unsaturated, or aromatic cyclic or polycyclic ring structure.

Reference to a hydrocarbyl group without specifying a particular isomer (for example, butyl) expressly discloses all isomers (for example, n-butyl, iso-butyl, sec-butyl, and tert-butyl). For example, reference to a hydrocarbyl group having 4 carbon atoms expressly discloses all isomers thereof. When a compound is described herein such that a particular isomer, enantiomer or diastereomer of the compound is not specified, for example, in a formula or in a chemical name, that description is intended to include each isomer and enantiomer of the compound described individual or in any combination.

Certain molecules disclosed herein may contain one or more ionizable groups [groups from which a proton can be removed (for example, —COOH) or added (for example, amines) or which can be quaternized (for example, amines)]. All possible ionic forms of such molecules and salts thereof are intended to be included individually in the disclosure herein. With regard to salts of the compounds herein, one of ordinary skill in the art can select from among a wide variety of available counterions that are appropriate for preparation of salts of for a given application. In solution, the salts can exist in their ionic form.

Example Compositions

Embodiments of the present disclosure relate to compositions for oil recovery. During an oil recovery operation, for example, at least a portion of the composition for oil recovery can exist as a foam.

The compositions for oil recovery can include various components, such as a surfactant solution and a foaming gas, among other components. Contact between the surfactant solution and the foaming gas generates a foam, such that at least a portion of the composition for oil recovery includes a foam. This foam can help stabilize gas dispersions and thereby aid oil recovery. The compositions for oil recovery can be introduced or added to an oil-containing reservoir or an oil-containing formation to, for example, enhance oil recovery.

Each surfactant solution can include one or more surfactants. Surfactants that can be utilized with embodiments described herein include any suitable surfactant such as a zwitterionic surfactant, an anionic surfactant, a cationic surfactant, a nonionic surfactant, or combinations thereof. The surfactants can be selected from a wide variety of surfactants having various functional groups. In a solution or suspension, the surfactant may exist as one or more ions in its ionic form or neutral form depending on, for example, the pH of the composition, the conditions of the reservoir, etcetera. For example, surfactants having carboxylic acid moieties can present as anionic in solution, surfactants having quaternary amine moieties can present as cationic in solution. The surfactants may also include a counterion (for example, halides, Na, K, Ca, Mg, ammonium compounds, et cetera) which can also exist in solution or suspension. Likewise, other components in the compositions described herein can exist it its ionic form or neutral form.

In some embodiments, a surfactant useful in the compositions described herein is represented by formula (FX1):

(FX1)

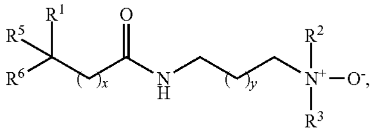

wherein:

each of $R^1$, $R^2$, $R^3$, $R^4$, $R^5$, and $R^6$, is, independently, hydrogen, hydrocarbyl, or substituted hydrocarbyl;

x is a number (for example an integer) from 1 to 30;

y is an integer (for example an integer) from 0 to 10.

For purposes of the present disclosure, the terms "surfactant of formula (FX1)," "surfactant FX1," "surfactant represented by formula (FX1)" are used interchangeably. One or more surfactants of formula (FX1) can be utilized together according to some embodiments. In at least one embodiment, each of $R^1$, $R^2$, $R^3$, $R^4$, $R^5$, and $R^6$ is, independently, hydrogen or a group having any suitable number of carbon atoms, such as from about 1 to about 40 carbon atoms. Each of $R^1$, $R^2$, $R^3$, $R^4$, $R^5$, and $R^6$ can, independently, be substituted or unsubstituted, saturated or unsaturated, linear or branched, cyclic or acyclic, and/or aromatic or non-aromatic.

In some examples, the number of carbon atoms for each of $R^1$, $R^2$, $R^3$, $R^4$, $R^5$, and $R^6$ can be 1, 2, 3, 4, 5, 6, 7, 8, 9, 10, 11, 12, 13, 14, 15, 16, 17, 18, 19, or 20. Each of the foregoing numbers can be preceded by the word "about," "at least about," "less than about," or "more than about," and any of the foregoing numbers can be used singly to describe an open-ended range or in combination to describe a close-ended range. For example, the number of carbon atoms can be from about 5 to about 10, from about 4 to about 12, from about 8 to about 10, about 12 or less, or about 6 or more. In at least one embodiment, $R^1$, $R^2$, $R^3$, $R^4$, $R^5$, and $R^6$ is independently, hydrogen, substituted $C_{1-5}$ hydrocarbyl (for example, substituted $C_{1-3}$ hydrocarbyl), or unsubstituted $C_{1-5}$ hydrocarbyl group (for example, unsubstituted $C_{1-3}$ hydrocarbyl).

The x of surfactant FX1 can be 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30. Each of the foregoing numbers can be preceded by the word "about," "at least about," "less than about," or "more than about," and any of the foregoing numbers can be used singly to describe an open-ended range or in combination to describe a close-ended range. For example, x of surfactant FX1 can be from about 5 to about 15, from about 6 to about 13, about 13 or less, or about 5 or more.

The y of surfactant FX1 can be 0, 2, 3, 4, 5, 6, 7, 8, 9, or 10. Each of the foregoing numbers can be preceded by the word "about," "at least about," "less than about," or "more than about," and any of the foregoing numbers can be used singly to describe an open-ended range or in combination to describe a close-ended range. For example, x of surfactant FX1 can be from about 0 to about 5, from about 1 to about 3, about 3 or less, or about 1 or more.

In some embodiments, a first surfactant of formula (FX1) is present in the surfactant solution component of the composition for oil recovery. Additionally, or alternatively, a first surfactant of formula (FX1) and a second surfactant of formula (FX1) are present in the surfactant solution component of the composition for oil recovery. Many other iterations are contemplated.

Illustrative, but non-limiting, examples of surfactants include a sodium C14-C16 sulfonate; sodium dodecylbenzene sulfonate; sodium dodecylbenzene sulfonate; an ammonium alkyl ether sulfate; sodium dioctyl sulfosuccinate; a sodium alkyl (C14-C17) sulphonate; sodium decyl sulfate; cetyltrimethylammonium chloride; dodecyltrimethylammonium bromide; cocotrimethylammonium chloride; PEG-10 hydrogenated tallow amine; N-oleyl-1,3-diaminopropane; a C9-C11 alcohol ethoxylate; a C9-C11 alcoho; a C9-C11 alcohol ethoxylate and a C9-C11 alcohol; a C12-C15 alcohol ethoxylate; octoxynol 99002-93-1; cocamidopropyl betaine; lauramine oxide; cocamidopropyl hydroxysultaine; disodium lauroamphodiacetate; sodium trideceth sulfate; mixture of disodium lauroamphodiacetate and sodium trideceth sulfate; oxirane, 2-methyl-, polymer with oxirane, mono(hydrogen sulfate), dodecyl ether, sodium salt; oxirane, methyl-, polymer with oxirane, mono(hydrogen sulfate), decyl ether, sodium salt; mixture of oxirane, 2-methyl-, polymer with oxirane, mono(hydrogen sulfate), dodecyl ether, sodium salt; and oxirane, methyl-, polymer with oxirane, mono(hydrogen sulfate), decyl ether, sodium salt; lauramidopropylamine oxide; myristamidopropylamine oxide; mixture of lauramidopropylamine oxide and myristamidopropylamine oxide. Selected, and non-limiting, surfactants are listed in Table 1A. Mixtures of surfactants can be utilized.

In some embodiments, the surfactant solution includes a total amount of the surfactant (for example, one or more surfactants) in any suitable amount. A total amount of the surfactant (in weight percent (wt %)) in the surfactant solution, based on a total weight of the surfactant solution, ranges from $wt_1$ to $wt_2$, where each of $wt_1$ and $wt_2$ is 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, 0.2, 0.22, 0.24, 0.26, 0.28, 0.3, 0.32, 0.34, 0.36, 0.38, 0.4, 0.45, 0.5, 0.55, 0.6, 0.65, 0.7, 0.75, 0.8, 0.85, 0.9, 0.95, or 1 so long as $wt_1 < wt_2$. Each of the foregoing numbers can be preceded by the word "about," "at least about," "less than about," or "more than about" and any of the foregoing numbers can be used singly to describe an open-ended range or in combination to describe a close-ended range. For example, the amount (wt %) of surfactant in the surfactant solution is about 0.03 or more, about 0.08 to about 0.12, about 0.3 or less, or at least about 0.05. Any of the foregoing amounts can apply to a single surfactant, the total amount of a specified combination of surfactants, or the total amount of all surfactants present in the surfactant solution, as will be clear from context. The total weight of the surfactant solution does not exceed 100 wt %.

In some examples, a total amount of the surfactant (for example, one or more surfactants) in the surfactant solution can be any suitable amount such as from about 0.01 wt % to about 5 wt %, such as from about 0.05 wt % to about 3 wt %, such as from about 0.075 wt % to about 1 wt %, such as from about 0.1 wt % to about 1 wt %, such as from about 0.2 wt % to about 0.9 wt %, such as from about 0.3 wt % to about 0.8 wt %, such as from about 0.4 wt % to about 0.7 wt %, such as from about 0.5 wt % to about 0.6 wt %, based on the total weight of the surfactant solution. In at least one embodiment, the total amount of surfactant in the surfactant solution can be less than about 1 wt %, such as less than about 0.5 wt %, such as less than about 0.25 wt %, such as less than about 0.2 wt %, such as less than about 0.15 wt %, such as less than about 0.1 wt %. Higher and lower total amounts of surfactant are contemplated.

In some embodiments, the composition for oil recovery includes a plurality of surfactants, for example two or more surfactants, such as three or more surfactants, and so forth. The primary foaming agent (i.e., primary surfactant) is the surfactant of highest concentration in the composition for oil recovery.

The amount of each surfactant of the composition for oil recovery can be any suitable amount. In some examples, a weight ratio (w/w) of the surfactant of formula (A) to the surfactant of formula (B) ranges from weight $ratio_1$ to weight $ratio_2$, where each of weight $ratio_1$ and weight $ratio_2$ is 1:99, 5:95, 10:90, 15:85, 20:80, 25:75, 30:70, 35:65, 40:60, 45:55, 50:50, 55:45, 60:40, 65:35, 70:30, 75:25, 80:20, 85:15, 90:10, 95:5, or 99:1, so long as weight $ratio_1$<weight $ratio_2$. Each of the foregoing numbers can be preceded by the word "about," "at least about," "less than about," or "more than about," and any of the foregoing numbers can be used singly to describe an open-ended range or in combination to describe a close-ended range. For example, the weight ratio of the first surfactant of formula (FX1) to the second surfactant of formula (FX1) in the composition for oil recovery is about 50:50, about 40:60 to about 60:40, about 25:75, or about 75:25. In some embodiments, the weight ratio of the first surfactant of formula (FX1) to the second surfactant of formula (FX1) in the composition for oil recovery is about 1:99 to about 99:1, about 5:95 to about 95:5, about 10:90 to about 90:10, about 25:75 to about 75:25, about 40:60 to about 60:40, about 55:45 to about 45:55, or about 50:50. In at least one embodiment, the weight ratio of the first surfactant of formula (FX1) to the second surfactant of formula (FX1) composition for oil recovery is about 10:1 to about 1:1, such as from about 8:1 to about 2:1, such as from about 6:1 to about 3:1. Other ratios are contemplated.

As described above, the composition for oil recovery can include one or more other components besides the surfactant(s). The one or more other components of the composition for oil recovery can include a salt (for example, NaCl, $CaCl_2$), $MgCl_2$, $Mg_2SO_4$, $Na_2SO_4$), a brine (for example, a brine composition or a low salinity brine composition), a polymer (for example, poly(vinyl alcohol), xantham gum, polyacrylamide), alkaline materials (for example, NaOH and/or $Na_2CO_3$), a hydrophobe, an alcohol (for example, sec-butyl alcohol), co-surfactants (such as alcohols, among other chemicals), or combinations thereof. Other components are contemplated.

The composition for oil recovery can include a brine composition. The brine composition includes one or more salts. The one or more salts include a cation and an anion. The cation and/or the anion can be monoatomic or polyatomic. Monoatomic cations can include an alkali metal (for example, Li, Na, K, Rb, and Cs), an alkaline earth metal (for example, Be, Mg, Ca, Sr, and Ba), a transition metal (Fe, Zn, Mn), or combinations thereof. Polyatomic cations can include such as ammonium ($NR_4^+$, wherein each R is independently H or hydrocarbyl (for example, an alkyl), pyridinium, or combinations thereof. Anions can include one or more elements from Group 15-Group 17 of the periodic table of the elements, such as N, P, S, O, F, Cl, Br, I, or combinations thereof. Monoatomic anions can include a halide (F, Cl, Br, and I), oxides, or combinations thereof. Polyatomic anions can include a carbonate, a nitrate, a sulfate, a sulfonate, a tosyl, a trifluoromethesulfonate, a phosphate, a phosphonate, a hydroxide, or combinations thereof. Other ions are contemplated.

In a solution or suspension, the salt(s) may exist as one or more ions. For example, one or more anions (for example, Cl, Br, I, Sr, et cetera) and one or more cations (for example, Na, K, Ca, Mg, et cetera) may exist in the solution or suspension.

Illustrative, but non-limiting, examples of salts include sodium chloride (NaCl), sodium bromide (NaBr), sodium iodide (NaI), sodium sulfate ($Na_2SO_4$), potassium chloride (KCl), potassium bromide (KBr), potassium iodide (KI), potassium nitrate ($KNO_3$), calcium chloride ($CaCl_2$)), calcium bromide ($CaBr_2$), calcium iodide ($CaI_2$), calcium sulfate ($CaSO_4$), calcium oxide (CaO), magnesium chloride ($MgCl_2$), magnesium sulfate ($Mg_2SO_4$), and/or $Mg(OH)_2$, among others. One or more of these salts can be hydrates, for example, hexahydrates. In some embodiments, the brine composition comprises calcium chloride, magnesium chloride, and/or ions thereof. In some embodiments, the brine composition comprises sodium chloride, calcium chloride, magnesium chloride, and/or ions thereof.

The brine composition can include any suitable total dissolved salts (TDS) content of any suitable amount, excluding the presence of any surfactants. The TDS can be based on the aforementioned salts. In some embodiments, the TDS content (ppm) of the brine composition is from about 10,000 ppm to about 1,000,000 ppm. In at least one embodiment, the TDS content of the brine composition ranges from $TDS_1$ to $TDS_2$, where each of $TDS_1$ to $TDS_2$ (in ppm) is 10,000, 20,000, 30,000, 40,000, 50,000, 60,000, 70,000, 80,000, 90,000, 100,000, 120,000, 140,000, 160, 000, 180,000, 200,000, 220,000, 240,000, 260,000, 280,000, 300,000, 320,000, 340,000, 360,000, 380,000, 400,000, 420, 000, 440,000, 460,000, 480,000, 500,000, 520,000, 540,000, 560,000, 580,000, 600,000, 620,000, 640,000, 660,000, 680, 000, 700,000, 720,000, 740,000, 760,000, 780,000, 800,000, 820,000, 840,000, 860,000, 880,000, 900,000, 920,000, 940, 000, 960,000, 980,000, or 1,000,000, so long as $TDS_1$<$TDS_2$. Each of the foregoing numbers can be preceded by the word "about," "at least about," "less than about," or "more than about" and any of the foregoing numbers can be used singly to describe an open-ended range or in combination to describe a close-ended range. For example, the TDS content (ppm) of the brine composition is about 100,000 or more, about 200,000 to about 400,000, about 320,000 or less, or at least about 300,000. A higher or lower TDS content (ppm) of the brine composition is contemplated.

In some embodiments, the TDS content (g/L) of the brine composition is 240, 250, 260, 270, 280, 290, 300, 310, 320, 330, 340, 350, 360, 370, 380, 390, or 400, excluding the presence of any surfactants. Each of the foregoing numbers can be preceded by the word "about," "at least about," "less than about," or "more than about," and any of the foregoing numbers can be used singly to describe an open-ended range or in combination to describe a close-ended range. For example, the TDS content (g/L) of the brine composition can be about 260 or more, about 310 to about 330, at least about 290, or about 320. A higher or lower TDS content (g/L) of the brine composition is contemplated.

In some embodiments, the brine composition is a low salinity brine composition comprising any suitable total dissolved salts (TDS) content, excluding the presence of any surfactants. The TDS content (ppm) of the low salinity brine composition can be from about 100 ppm to about 10,000 ppm. In at least one embodiment, the TDS content of the low salinity brine composition ranges from $TDS_3$ to $TDS_4$, where each of $TDS_3$ to $TDS_4$ (in ppm) is 100, 150, 200, 250, 300, 350, 400, 450, 500, 550, 600, 650, 700, 750, 800, 850, 900, 950, 1000, 1100, 1200, 1300, 1400, 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900, 4000, 4100, 4200, 4300, 4400, 4500, 4600, 4700, 4800, 4900, 5000, 5100, 5200, 5300, 5400, 5500, 5600, 5700, 5800, 5900, 6000, 6100, 6200, 6300, 6400, 6500, 6600, 6700, 6800, 6900, 7000, 7100, 7200, 7300, 7400, 7500, 7600, 7700, 7800, 7900, 8000, 8100, 8200, 8300, 8400, 8500, 8600, 8700, 8800, 8900, 9000, 9100, 9200, 9300, 9400, 9500, 9600, 9700, 9800, 9900, or 10,000, so long as $TDS_3<TDS_4$. Each of the foregoing numbers can be preceded by the word "about," "at least about," "less than about," or "more than about" and any of the foregoing numbers can be used singly to describe an open-ended range or in combination to describe a close-ended range. For example, the TDS content (ppm) of the low salinity brine composition is about 100 or more, about 200 to about 2,000, about 5,000 or less, or at least about 400. A higher or lower TDS content (ppm) of the low salinity brine composition is contemplated.

In some embodiments, the low salinity brine composition has a TDS content (g/L), excluding the presence of any surfactants, is 0.1, 0.2, 0.3, 0.4, 0.5, 0.6, 0.7, 0.8, 0.9, 1, 1.5, 2, 2.5, 3, 3.5, 4, 4.5, or 5, excluding the presence of any surfactants. Each of the foregoing numbers can be preceded by the word "about," "at least about," "less than about," or "more than about," and any of the foregoing numbers can be used singly to describe an open-ended range or in combination to describe a close-ended range. For example, the TDS content (g/L) of the low salinity brine composition can be 0.2 to about 0.5, about 1 or less, about 0.5 to about 5.

In some embodiments, the TDS content of a brine described herein, excluding the presence of any surfactants, is from about 50,000 ppm to about 1,000,000 ppm, such as from about 100,000 ppm to about 700,000 ppm, such as from about 200,000 ppm to about 500,000 ppm, such as from about 300,000 ppm to about 400,000 ppm. In some embodiments, the brine composition has a TDS content that is less than about 50,000 ppm, such as less than about 40,000 ppm, such as less than about 30,000 ppm, such as less than about 20,000 ppm, such as less than about 10,000 ppm, such as less than about 5,000 ppm, such as less than about 2,000 ppm, such as less than about 1,500 ppm, such as from about 50 ppm to about 1,500 ppm, such as from about 100 ppm to about 1,000 ppm, such as from about 200 ppm to about 900 ppm, such as from about 300 ppm to about 800 ppm, such as from about 400 ppm to about 700 ppm, such as from about 500 ppm to about 600 ppm. Other ranges are contemplated.

In some embodiments, the brine composition and/or the low salinity brine composition includes water, such as municipal water, sea water, or water from other sources.

The compositions for oil recovery can further include one or more foaming gases such as $N_2$, $CO_2$, hydrocarbon gas(es) (for example, $CH_4$), natural gas, combusted natural gas, air, combinations thereof, among others. When one or more foaming gases is utilized, a concentration (in wt %) of each gas in the foaming gas is 1, 5, 10, 15, 20, 25, 30, 35, 40, 45, 50, 55, 60, 65, 70, 75, 80, 85, 90, 95, or 99, based on the total weight of the foaming gas, the total weight of the foaming gas not to exceed 100 wt %. Each of the foregoing numbers can be preceded by the word "about," "at least about," "less than about," or "more than about," and any of the foregoing numbers can be used singly to describe an open-ended range or in combination to describe a close-ended range. For example, an amount of $N_2$ in the foaming gas can be about 50 wt %, at least about 25 wt %, from about 40 wt % to about 65 wt %. Other amounts are contemplated.

In some examples, a weight ratio (w/w) of a first foaming gas to a second foaming gas ranges from weight $ratio_3$ and weight $ratio_4$, where each of weight $ratio_3$ and weight $ratio_4$ is 1:99, 2:98, 5:95, 10:90, 15:85, 20:80, 25:75, 30:70, 35:65, 40:60, 45:55, 50:50, 55:45, 60:40, 65:35, 70:30, 75:25, 80:20, 85:15, 90:10, 95:5, 98:2 or 99:1, so long as weight $ratio_3<$weight $ratio_4$. Each of the foregoing numbers can be preceded by the word "about," "at least about," "less than about," or "more than about," and any of the foregoing numbers can be used singly to describe an open-ended range or in combination to describe a close-ended range. For example, the volume ratio of the aqueous phase to the gas phase is about 60:40, from about 80:20 to about 2:98, less than about 90:10, or more than about 5:95. Other ratios are contemplated.

Example Methods

Embodiments of the present disclosure also relate to methods of utilizing compositions for oil recovery described herein. As described above, the compositions for oil recovery include a surfactant solution and a foaming gas. Contact between the surfactant solution and the foaming gas results in a foam such that at least a portion of the composition for oil recovery can be in the form of a foam. This foam can help stabilize gas dispersions and thereby aid oil recovery. The foam can be generated outside of a formation, inside the formation, or both. When generating the foam outside the formation, for example, a surfactant solution and a foaming gas can be mixed prior to introducing the foam into the formation. When generating the foam inside the formation, for example, a surfactant solution can be introduced to a formation, and before, during, and/or after introducing the surfactant solution, a foaming gas can be introduced to same formation, thereby generating a foam.

The compositions for oil recovery described herein can be used with methods for producing hydrocarbons (oil) from oil-containing porous media, and methods for treating oil-containing porous media. Other methods are contemplated. Embodiments of the methods described herein can enable enhanced oil recovery from oil-containing porous media in an improved manner relative to the state-of-the-art. Methods described herein can also be performed on porous rock formations.

Each of these methods generally include introducing a composition for oil recovery with an oil-containing porous media. Introducing the composition for oil recovery with the oil-containing porous media includes contacting the oil-containing porous media with the composition for oil recovery. In some embodiments, contacting includes bringing into contact a composition for oil recovery and at least one surface of an oil-containing porous media. In some embodiments, contacting includes bringing into contact a composition for oil recovery and the interior of pores of an oil-containing porous media. In some embodiments, contacting includes bringing into contact a composition for oil recovery and materials adsorbed onto a surface of an oil-containing porous media. In some embodiments, contacting includes bringing into contact a composition for oil recovery and materials adsorbed onto and/or absorbed within the interior of pores of an oil-containing porous media.

When at least a portion of the composition for oil recovery exists as a foam, the foam can include an aqueous phase and a gaseous phase, where the aqueous phase includes brine (whether being a synthetic brine and/or brine from the formation), and the gaseous phase can include the foaming gas. The amount of each of the aqueous phase and the gaseous phase of the foam can be any suitable amount. In some examples, a volume ratio (v/v) of the aqueous phase to the gaseous phase of the foam ranges from volume $ratio_1$ to volume $ratio_2$, where each of volume $ratio_1$ and volume $ratio_2$ is 1:99, 2:98, 5:95, 10:90, 15:85, 20:80, 25:75, 30:70, 35:65, 40:60, 45:55, 50:50, 55:45, 60:40, 65:35, 70:30, 75:25, 80:20, 85:15, 90:10, 95:5, 98:2 or 99:1, so long as volume $ratio_1$<volume $ratio_2$. Each of the foregoing numbers can be preceded by the word "about," "at least about," "less than about," or "more than about," and any of the foregoing numbers can be used singly to describe an open-ended range or in combination to describe a close-ended range. For example, the volume ratio of the aqueous phase to the gas phase is about 60:40, from about 80:20 to about 2:98, less than about 90:10, or more than about 5:95.

Introducing (for example, contacting) the composition for oil recovery with the oil-containing porous media can be performed at ambient conditions or reservoir conditions. Temperatures (° C.) can be 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 190, 195, 200, 205, 210, 215, 220, 225, 230, 235, 240, 245, or 250, or any temperature therein between such temperatures. Each of the foregoing numbers can be preceded by the word "about," "at least about," "less than about," or "more than about," and any of the foregoing numbers can be used singly to describe an open-ended range or in combination to describe a close-ended range. For example, the temperature can be about 100° C., from about 90° C. to about 115° C., less than about 200° C., or more than about 75° C. In at least some examples, the temperature is from about 10° C. to about 250° C., such as from about 20° C. to about 200° C., such as from about 50° C. to about 150° C., such as from about 75° C. to about 125° C., such as from about 90° C. to about 110° C. Other temperatures are contemplated.

Pressures (in units of Megapascal (MPa)) can be 0, 5, 10, 15, 20, 25, 30, 35, 40, 45, 50, 55, 60, 65, 70, 75, 80, 85, 90, 95, 100, 105, 110, or 115, or any pressure therein between such pressures. Each of the foregoing numbers can be preceded by the word "about," "at least about," "less than about," or "more than about," and any of the foregoing numbers can be used singly to describe an open-ended range or in combination to describe a close-ended range. For example, the pressure can be about 13.8 MPa, from about 5 MPa to about 40 MPa, less than about 20 MPa, or more than about 2.1 MPa. In at least one embodiment, the pressure can range from about 0 pounds per square inch (psi) to about 15,000 psi (~103 MPa), such as from about 10 psi (~0.07 MPa) to about 12000 psi (~82 MPa), such as from about 300 psi (~2.1 MPa) to about 10,000 psi (~69 MPa), such as from about 500 psi (~3.4 MPa) to about 8,000 psi (~55 MPa), such as from about 1,000 psi (~6.9 MPa) to about 6,500 psi (~45 MPa), such as about 2,000 psi (~13.8 MPa) to about 6,000 psi (~41 MPa). Other pressures are contemplated.

When a foam composed of certain fraction of gas and surfactant is injected or otherwise introduced into a formation, reservoir, or well, the foam can be injected at a total flow rate (mL/min) of 0.01, 0.02, 0.04, 0.06, 0.08, 0.1, 0.2, 0.3, 0.4, 0.5, 0.6, 0.7, 0.8, 0.9, 1, 1.5, 2, 2.5, 3, 3.5, 4, 4.5, 5, 5.5, 6, 6.5, 7, 7.5, or 8. Each of the foregoing numbers can be preceded by the word "about," "at least about," "less than about," or "more than about," and any of the foregoing numbers can be used singly to describe an open-ended range or in combination to describe a close-ended range. For example, the total flow rate can be about 0.2 mL/min, from about 0.01 mL/min to about 8 mL/min, less than about 2 mL/min, or more than about 0.1 mL/min. Other flow rates are contemplated.

The foam, according to embodiments described herein can have, one or more of the following characteristics or properties:

(a) An apparent viscosity value of the foam, reflecting the foam strength, (in the presence or the absence of oil), in units of millipascal-second (mPa·s), that can be 1, 5, 10, 15, 20, 25, 30, 35, 40, 45, 50, 55, 60, 65, 70, 75, 80, 85, 90, 95, 100, 110, 120, 130, 140, 150, 200, 250, 300, 350, 400, 450, 500, 550, 600, 650, 700, 750, 800, 850, 900, 950, or 1000. Each of the foregoing numbers can be preceded by the word "about," "at least about," "less than about," or "more than about," and any of the foregoing numbers can be used singly to describe an open-ended range or in combination to describe a close-ended range. In at least one embodiment, the apparent viscosity value (in the presence or the absence of oil) is about 1,000 mPa·s or less, such as from about 1 mPa·s to about 400 mPa·s, such as from about 5 mPa·s to about 350 mPa·s, such as from about 10 mPa·s to about 300 mPa·s, such as from about 20 mPa·s to about 200 mPa·s, such as from about 30 mPa·s to about 100 mPa·s. Other apparent viscosities are contemplated. The apparent viscosity of the foam is determined as described in the Examples.

(b) A half-life of the foam in the absence of oil (in minutes (min)) that can be 30, 60, 90, 120, 150, 180, 210, 240, 270, 300, 330, 360, 390, 420, 450, 480, 510, 540, 570, 600, 630, 660, 690, 720, 750, 780, 810, 840, 870, 900, 930, 960, 990, 1020, 1050, 1080, 1110, 1140, 1170, or 1200. Each of the foregoing numbers can be preceded by the word "about," "at least about," "less than about," or "more than about," and any of the foregoing numbers can be used singly to describe an open-ended range or in combination to describe a close-ended range. In at least one embodiment, the half-life of the foam in the absence of oil is from about 400 min to about 1200 min, such as from about 600 min to about 1000 min. Other half-life values of the foam in the absence of oil are contemplated. The half-life of the foam is determined as described in the Examples.

(c) A half-life in the presence of oil (in minutes (min)) that can be 30, 60, 90, 120, 150, 180, 210, 240, 270, 300, 330, 360, 390, 420, 450, 480, 510, 540, 570, 600, 630, 660, 690, or 720. Each of the foregoing numbers can be preceded by the word "about," "at least about," "less than about," or "more than about," and any of the foregoing numbers can be used singly to describe an open-ended range or in combination to describe a close-ended range. In at least one embodiment, the half-life of the foam in the presence of oil is about 600 min or less, such as from about 60 min to about 480 min, such as from about 120 min to about 360 min, such as from about 240 min to about 300 min. Other half-life values of the foam in the presence of oil are contemplated. The half-life of the foam is determined as described in the Examples.

Methods described herein can further include mobilizing oil from the oil-containing porous media by contacting the porous rock formation with a composition for oil recovery. The method can further include collecting at least a portion of the mobilized oil.

Suitable methods and apparatus known in the art can be utilized for introducing a composition for oil recovery with the oil-containing porous media such as an additive injection system. If it is desired to recover oil during performance of the method, suitable apparatus and methods known in the art (for example, oil extraction apparatus) can be utilized to recover, collect, extract, or otherwise remove oil from the oil-containing porous media.

Methods described herein can be performed in unconventional reservoirs and conventional reservoirs. The methods can be performed on various oil-containing formations and reservoirs. Such formations and reservoirs contain oil-containing porous media. The methods can be performed on formations, reservoirs, and oil-containing porous media such as those already subjected to recovery operations, such as primary, secondary, and/or tertiary recovery operations. The formations, reservoirs, and oil-containing porous media can also include those not yet subject to such recovery operations. In some embodiments, the oil-containing porous media includes hydrocarbons, such as crude oil. In some embodiments, the oil-containing porous media comprises an oil-wet porous media comprising crude oil, a water-wet porous media comprising crude oil, or combinations thereof.

In some embodiments, the oil-containing porous media can be any suitable oil-containing porous media. For example, the oil-containing porous media can include carbonate, quartz, calcite ($CaCO_3$), feldspar, dolomite ($MgCO_3$), silica, illite, apatite, muscovite, rutile, gypsum, anhydrite, chamosite, clinochlore, zircon, biotite, pyrite, expansible clays, kaolinite, mica minerals, trace minerals, organic matter, or combinations thereof. In some examples, the oil-containing porous media includes tight porous media. In some examples, the oil-containing porous media comprises rock. In some embodiments, the oil-containing porous media comprises quartz, calcite, feldspar, and dolomite. In some examples, the oil-containing porous media comprises dolomite. In some examples, the oil-containing porous media comprises carbonate.

In some examples, the oil-containing porous media comprises an oil-wet porous media, a mixed-wet porous media, a weakly water-wet porous media, or a water-wet porous media. Additionally, or alternatively, the oil-containing porous media can be hydrophilic, hydrophobic, or mixed. Additionally, or alternatively, the oil-containing porous media can be consolidated porous media.

Methods described herein can be performed on unconventional reservoirs and conventional reservoirs. To date, state-of-the art-methods for chemical flooding of unconventional reservoirs is limited, and when it has been utilized, the amount of oil produced from the reservoirs is inadequate. Embodiments of the methods described herein overcome these and other issues.

In some embodiments, methods described herein can be performed in a tight oil reservoir, in a conventional oil reservoir, in a hydraulically fractured tight oil reservoir, and/or on a tight porous media. The term "tight" when used herein in relation to oil, a reservoir, or oil recovery is a term of art and is used herein consistent with its art-recognized definition. For example, tight porous media is a term typically used in relation to unconventional reservoirs or low permeability porous media with an average permeability of less than about 50 millidarcy (mD), such as about 40 mD or less, such as about 30 mD or less, such as about 20 mD or less, such as about 15 mD or less, such as about 10 mD or less, or in some embodiments less than about 2 mD or 1 mD. Other permeabilities are contemplated.

In some embodiments, methods described herein are performed in a tight porous media, an oil-wet porous media, a weakly oil wet porous media, a weakly water-wet porous media, and/or a water-wet porous media. In some embodiments, porous media includes MNCB carbonate outcrop rocks, Edwards limestone carbonate outcrop rocks, among many others.

In some embodiments, the porous media has any suitable pore size. For example, in some embodiments, the pore size (nm) is 1, 2, 3, 4, 5, 6, 7, 8, 9, 10, 12, 14, 16, 18, 20, 25, 30, 35, 40, 45, 50, 60, 70, 80, 90, 100, 120, 140, 160, 180, 200, 250, 300, 350, 400, 450, 500, 550, 600, 650, 700, 750, 800, 850, 900, 950, or 1000. Each of the foregoing numbers can be preceded by the word "about," "at least about," "less than about," or "more than about", and any of the foregoing numbers can be used singly to describe an open-ended range or in combination to describe a close-ended range. For example, and in some embodiments, the pore size is about 1 nm to about 3 nm, about 400 nm to 750 nm, less than about 300 nm, or at least about 450 nm. Other pore sizes are contemplated.

In some embodiments, the porous media has any suitable pore volume. For example, in some embodiments, the pore volume ($cm^3$) is 1, 2, 3, 4, 5, 6, 7, 8, 9, 10, 12, 14, 16, 18, 20, 25, 30, 35, 40, 45, 50, 60, 70, 80, 90, or 100. Each of the foregoing numbers can be preceded by the word "about," "at least about," "less than about," or "more than about", and any of the foregoing numbers can be used singly to describe an open-ended range or in combination to describe a close-ended range. For example, and in some embodiments, the pore size is about 10 $cm^3$ to about 50 $cm^3$, less than about 40 $cm^3$, or at least about 5 $cm^3$. Other pore volumes are contemplated.

In some examples, methods described herein are performed in a hydraulically fractured tight oil reservoir. Here, and prior to introducing the composition for oil recovery with oil-containing porous media, the method can include creating fractures in rock formations in a tight oil reservoir, and propping the fractures open by administering a proppant.

The following examples are put forth so as to provide those of ordinary skill in the art with a complete disclosure and description of how to make and use embodiments of the present disclosure, and are not intended to limit the scope of embodiments of the present disclosure. Efforts have been made to ensure accuracy with respect to numbers used (for example, amounts, dimensions, et cetera) but some experimental errors and deviations should be accounted for.

EXAMPLES

The stability of various foams, and the influence of foam on gas permeability during EOR processes were investigated. Different surfactants and compositions were investigated under reservoir conditions. In addition, different foaming gases (for example, $N_2$, $CO_2$, and hydrocarbon gas ($CH_4$)), in bulk and porous media. Investigations were also performed with and without oil. Overall, the results indicated that the foams generated by embodiments described herein reduced gas permeability during EOR processes in heterogeneous reservoirs. The foams are also stable and persistent under ambient conditions, reservoir conditions (high-temperature, high-pressure conditions), and/or high-salinity conditions.

In some embodiments, it was determined that zwitterionic surfactants (for example, betaine-based, amine oxides) can have good salt tolerance, interfacial tension (IFT) lowering ability, and are chemically and thermally stability. The zwitterionic surfactants can also provide excellent foam stabilization and viscosity enhancement. Overall, the zwitterionic surfactants can display very good foaming performance under ambient or harsh conditions.

Crude oil. All experiments performed with oil were conducted using Bakken crude oil (density 0.7104 g/cm$^3$ and viscosity 0.7385 mPa·s at 90° C.).

Surfactants. Table 1A includes a diverse range of example surfactants investigated. The surfactants had a variety of functional groups and presented as anionic, cationic, nonionic, zwitterionic, and combinations thereof. The surfactants were used without any further treatment.

TABLE 1A

| Surfactant Ex. | Surfactant charge | Surfactant Trademark | Surfactant |
|---|---|---|---|
| S-1 | Anionic | BIO-TERGE AS-40 | Sodium C14-C16 sulfonates |
| S-2 | Anionic | BIO-SOFT D-62 LT | Sodium dodecylbenzene sulfonate |
| S-3 | Anionic | POLYSTEP A-16-22 | Sodium dodecylbenzene sulfonate |
| S-4 | Anionic | ALPHA FOAMER | Ammonium alkyl ether sulfate |
| S-5 | Anionic | STEPWET DOS-70 | Sodium dioctyl sulfosuccinate |
| S-6 | Anionic | STEOL KS-460 | Mixture of oxirane, 2-methyl-, polymer with oxirane, mono(hydrogen sulfate), dodecyl ether, sodium salt; and oxirane, methyl-, polymer with oxirane, mono(hydrogen sulfate), decyl ether, sodium salt |
| S-7 | Anionic | ENORDET 0332 | Sodium alkyl (C14-C17) sulphonates |
| S-8 | Anionic | SULFOCHEM NADS-40 | Sodium decyl sulfate |
| S-9 | Anionic | AMMONYX CETAC-30 | Cetyltrimethylammonium chloride |
| S-10 | Cationic | DTAB | Dodecyltrimethylammonium bromide |
| S-11 | Cationic | CRODAQUAT 1207 | Cocotrimethylammonium chloride |
| S-12 | Cationic | ETHOMEEN T/25 | PEG-10 hydrogenated tallow amine |
| S-13 | Nonionic | DUOMEEN OL | N-oleyl-1,3-diaminopropane |
| S-14 | Nonionic | BIO-SOFT N91-8 | C9-C11 alcohol ethoxylate |
| S-15 | Nonionic | BIO-SOFT GSB-9 | C9-C11 alcohol ethoxylate and C9-C11 alcohol |
| S-16 | Nonionic | BIO-SOFT N25-9 | C12-C15 alcohol ethoxylate |
| S-17 | Nonionic | TRITON X-100 | Octoxynol 9 9002-93-1 |
| S-18 | Zwitterionic | AMPHOSOL CG | Cocamidopropyl betaine |
| S-19 | Zwitterionic | AMMONYX LO SPECIAL | Lauramine oxide |
| S-20 | Zwitterionic | MACKAM LSB 50 | Cocamidopropyl hydroxysultaine |
| S-21 | Zwitterionic | AMMONYX LMDO | Mixture of lauramidopropylamine oxide and myristamidopropylamine oxide |
| S-22 | Anionic and Zwitterionic | MIRACARE 2MHT | Disodium lauroamphodiacetate and sodium trideceth sulfate |

Synthetic brine. The synthetic brine had a total dissolved salts (TDS) content of about 200,000 mg/L, and were comprised of ~87.2% sodium chloride (NaCl), 11.77% calcium chloride ($CaCl_2$)), and 1.03% magnesium chloride ($MgCl_2$). The synthetic brine had a density (at ~90° C.) and viscosity (at ~90° C.) of about 1.0923 g/cm$^3$ and about 0.5110 mPa·s, respectively. The synthetic brine represented the average compositions of Middle Bakken formation water. Other brines are contemplated.

Surfactant solutions. The surfactant solutions were prepared using the surfactants listed in Table 1A. All surfactant solutions were prepared in synthetic brine. The concentration of the one or more surfactants in the surfactant solutions was fixed at about 5000 ppm for all investigated implementations. Other concentrations of the one or more surfactants in the surfactant solutions are contemplated.

Table 1B shows an assessment of the appearance of the surfactant solutions under a variety of conditions, such as ambient temperature (~21° C.), high temperature (~90° C.), and high temperature and high pressure (~90° C., ~13.8 MPa). The foaming ability of the surfactant solutions with $N_2$ as the foaming gas was also observed. The observations, detailed in Table 1B, were performed to evaluate the chemical compatibility (for example, degradation) and foamability (foaming ability) of the surfactants.

TABLE 1B

| Surfactant Ex. | Observation at 21° C. | Observation at 90° C. | Observation at 90° C., 13.8 MPa | Foaming ability with $N_2$ |
|---|---|---|---|---|
| S-1 | Agglomerated | Clear | — | — |
| S-2 | Agglomerated | Agglomerated | — | — |
| S-3 | Agglomerated | Agglomerated | — | — |
| S-4 | Cloudy | Clear | — | — |
| S-5 | Agglomerated | Clear | — | — |
| S-6 | Clear | Clear | — | — |
| S-7 | Agglomerated | Cloudy | — | — |
| S-8 | Agglomerated | Agglomerated | — | — |
| S-9 | Clear | Clear | Clear | Good |
| S-10 | Clear | Clear | Clear | Good |
| S-11 | Clear | Clear | Agglomerated | Poor |
| S-12 | Clear | Clear | Cloudy | Poor |
| S-13 | Agglomerated | Cloudy | — | — |
| S-14 | Clear | Clear | Cloudy | Poor |
| S-15 | Clear | Clear | Cloudy | Poor |
| S-16 | Clear | Cloudy | — | — |
| S-17 | Clear | Cloudy | — | — |
| S-18 | Clear | Clear | Clear | Good |
| S-19 | Clear | Clear | Color changed | Good |
| S-20 | Clear | Clear | Clear | Good |
| S-21 | Clear | Clear | Clear | Good |
| S-22 | Cloudy | Cloudy | — | — |

FIG. 1 shows exemplary photos of the phase behavior of selected surfactants-S-9, S-10, S-11, S-12, S-14, S-15, S-18, S-19, S-20, and S-21—in surfactant solutions that were screened at high temperature and high pressure (~90° C., ~13.8 MPa). Many of the surfactant solutions were observed to be clear and showed no precipitation or agglomeration. Under the conditions tested, Surfactant S-21 showed the best phase behavior. Additionally, the selected surfactants either did not experience degradation or only negligible degradation under the conditions tested indicating that the surfactants could be characterized as having good foaming ability.

Foaming Gases. One or more foaming gases can be utilized to generate foams described herein. For example, introduction or contact of one or more foaming gases with a surfactant solution can form a foam. Illustrative, but non-limiting, examples of foaming gases include $N_2$, hydrocarbon gas (for example, $CH_4$), $CO_2$, or combinations thereof. Other gases, as well as mixtures of gases, are contemplated. Table 1C shows the density and viscosity of the selected gases determined at temperature and pressure conditions of about 90° C. and about 13.8 MPa, respectively.

TABLE 1C

| Gas | Density, g/cm$^3$ | Viscosity, mPa · s |
|---|---|---|
| $N_2$ (99.999%) | 0.122 | 0.0230 |
| $CO_2$ (99.95%) | 0.337 | 0.0280 |
| $CH_4$ (99.99%) | 0.078 | 0.161 |

Core samples. Two different example outcrops of carbonate rocks were used for coreflood experiments: Minnesota Northern Cream Buff (MNCB), comprising mostly dolomites, and Edwards Yellow Limestone (Edwards limestone). Table 1D shows non-limiting physical properties of the example core samples corresponding to each experiment. Determinations of pore volume, porosity, and brine permeability are described below. Brine permeability was measured in units of millidarcy (mD) and was determined to be about 0.8 mD for the MNCB cores and about 16 mD for the Edwards limestone cores.

TABLE 1D

| No. | Core Sample | Experiment | Length (cm) | Diameter (cm) | Pore volume (cm$^3$) | Porosity (%) | Brine permeability (mD) |
|---|---|---|---|---|---|---|---|
| 1 | MNCB | $N_2$-foam | 14.48 | 3.87 | 22.16 | 12.99 | 0.76 |
| 2 | MNCB | $CO_2$-foam | 14.47 | 3.73 | 23.82 | 14.47 | 0.84 |
| 3 | MNCB | $CH_4$-foam | 14.23 | 3.81 | 23.35 | 14.19 | 0.91 |
| 4 | Edwards limestone | $N_2$-foam | 15.11 | 3.78 | 29.32 | 17.24 | 15.47 |
| 5 | Edwards limestone | $CO_2$-foam | 15.08 | 3.81 | 29.56 | 17.19 | 16.33 |
| 6 | Edwards limestone | $CH_4$-foam | 15.24 | 3.65 | 29.32 | 18.37 | 15.71 |

Figure 2:
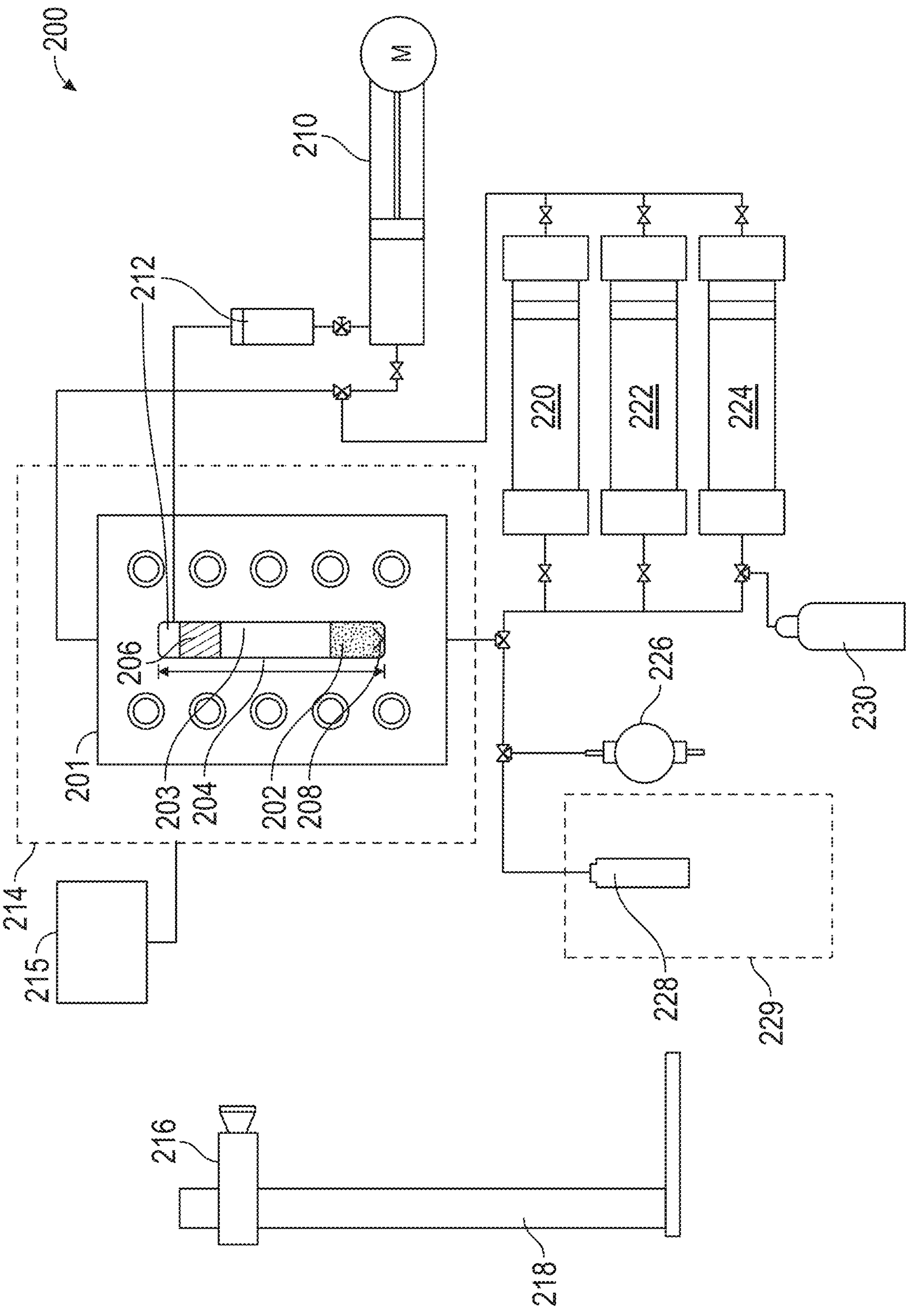
FIG. 2 is a schematic diagram illustrating an example pressure-volume-temperature (PVT) system for bulk foamability and foam stability tests according to at least one embodiment of the present disclosure.

Foam flooding experiments were carried out using the MNCB cores. FIG. 2 shows an example DBR Pressure-Volume-Temperature (PVT) system 200 used for the foam flooding experiments available from DBR Technology Center, Schlumberger, Canada. The PVT system includes a visual PVT cell 201 that withstands operating temperatures of about 10° C. to about 200° C. and operating pressures up to about 104 MPa. A high pressure transparent glass column 204 (HP glass column), with a total volume of about 112 mL, is mounted inside the PVT cell 201. Fluid sample 202 and a gas phase 203 are shown.

The HP glass column 204 is equipped with a piston 206 (which can be an isolation piston) and a magnetic stirrer 208 (such as a mixer impeller). The magnetic stirrer 208 is driven by a magnet assembly (not shown) to agitate the fluid sample 202 (for example, a surfactant solution 220 and/or crude oil 222) at various rotational speeds, while the piston 206 isolates the fluid sample 202. A positive displacement DBR pump is in fluid communication with the PVT cell 201. The piston 206, via pressurization from the DBR pump 210, controls the fluid pressure by compressing or expanding the confining fluid 212. The DBR pump 210 can be controlled by a CPU.

The PVT cell 201 is located inside a temperature-controlling device 214 (such as an oven, heater, or other temperature-controlling device, for example, an air bath), as indicated in FIG. 2 by the dashed lines. The temperature-controlling device 214 is utilized to regulate the temperature of the system. The temperature can be controlled by a resistance temperature device and a microprocessor temperature controller. Pressure and temperature can be monitored via a display 215. Seals and gaskets, selected based on their compatibility with the fluids, gases, and testing conditions, are placed on portions of the system. Chemraz O-rings and seals (ResFluid Solutions Inc., Canada) can be used.

A camera 216, such as a high dimension digital camera, and a cathetometer 218 are positioned outside of the PVT cell 201 to monitor and measure the height of the fluid sample 202 inside the HP glass column 204. The fluid height of the fluid sample 202 and changes thereof can be converted to volumetric units via a conversion factor corresponding to the HP glass column 204 containing the fluid sample 202. Besides the DBR pump 210, the PVT cell 201 is placed in fluid communication, via suitable tubing/piping and valves, with various elements that hold surfactant solution 220, crude oil 222, and a gas 224, respectively. The PVT cell 201 is also fluidly coupled with a vacuum pump 226 to, for example, vacuum the air in the PVT cell 201, a waste container 228, and a gas tank 230. The waste container is positioned within a fume hood 229 (indicated by dashed lines)

During the experiments, the surfactant solutions 220—prepared as described above—were transferred into the HP glass column 204. In the experiments conducted in the presence of crude oil 222, the Bakken crude oil at about 10 vol % of the surfactant solution 220 was transferred into the HP glass column 204 at constant pressure after transferring the surfactant solution 220 into the HP glass column 204. The temperature of the PVT cell 201 was set to about 90° C. and the fluid sample 202 was pressurized to about 13.8 MPa. After the pressure and temperatures stabilized, a fixed volume of gas 224 was injected into the HP glass column 204 at constant pressure. Prior to foam generation experiments, the system was left for about 12 hours at testing conditions in order to reach equilibrium.

Foam generation. The surfactant solution and foaming gas (for example, $N_2$, $CO_2$, and/or $CH_4$) were mixed for about 5 min with an agitation speed of about 2500 revolutions per minute (rpm). The produced foam generally reached its maximum volume after a period of about 3-4 min under the conditions described.

Foamability. The ability of a surfactant solution and a foaming gas to generate foam (foamability) was assessed based on the initial foam volume produced after the mixing was stopped. The data presented in Table 1B, supra, includes six example surfactants—Surfactant S-9, Surfactant S-10, Surfactant S-18, Surfactant S-19, Surfactant S-20, and Surfactant S-21—that showed good foaming ability with $N_2$ foaming gas under the conditions tested. FIGS. 5A-5F, further discussed below, show the molecular structures of these surfactants.

Foam capacity. Foam capacity is one of the parameters that can explain the foamability of a surfactant solution and a selected foaming gas, and was used to evaluate the amount of foam produced from a given amount of foaming gas. Foam capacity was determined by the ratio of final foam volume to the total volume of foaming gas delivered. A foam capacity value>1 indicates that the total amount of gas delivered is retained in the foam column during foam generation. A foam capacity value<1 indicates that only a portion of the gas is retained or trapped in the foam column during foam generation. Average foam capacity was determined based on averaging the results of at least two runs.

Foam decay profile. Measurements of the foam decay profiles were performed after foam generation ceased. Foam decay profiles were determined by measuring the foam volume above the bulk liquid as a function of time after foam generation ceased.

Foam stability. Measurement of foam stabilities were performed after foam generation ceased. The foam stability was evaluated by the half-life of the foam. The half-life of the foam refers to the time required to achieve half of the initial foam volume after foam generation ceased.

After foam generation ceased, foam decay profiles and foam stability was determined. Foam decay profiles were determined by measuring the foam volumes above the bulk liquid as a function of time after foam generation ceased. Foam stability was evaluated by the half-life of the foam. The half-life of the foam refers to the time required to achieve half of the initial foam volume after foam generation ceased.

Figure 3:
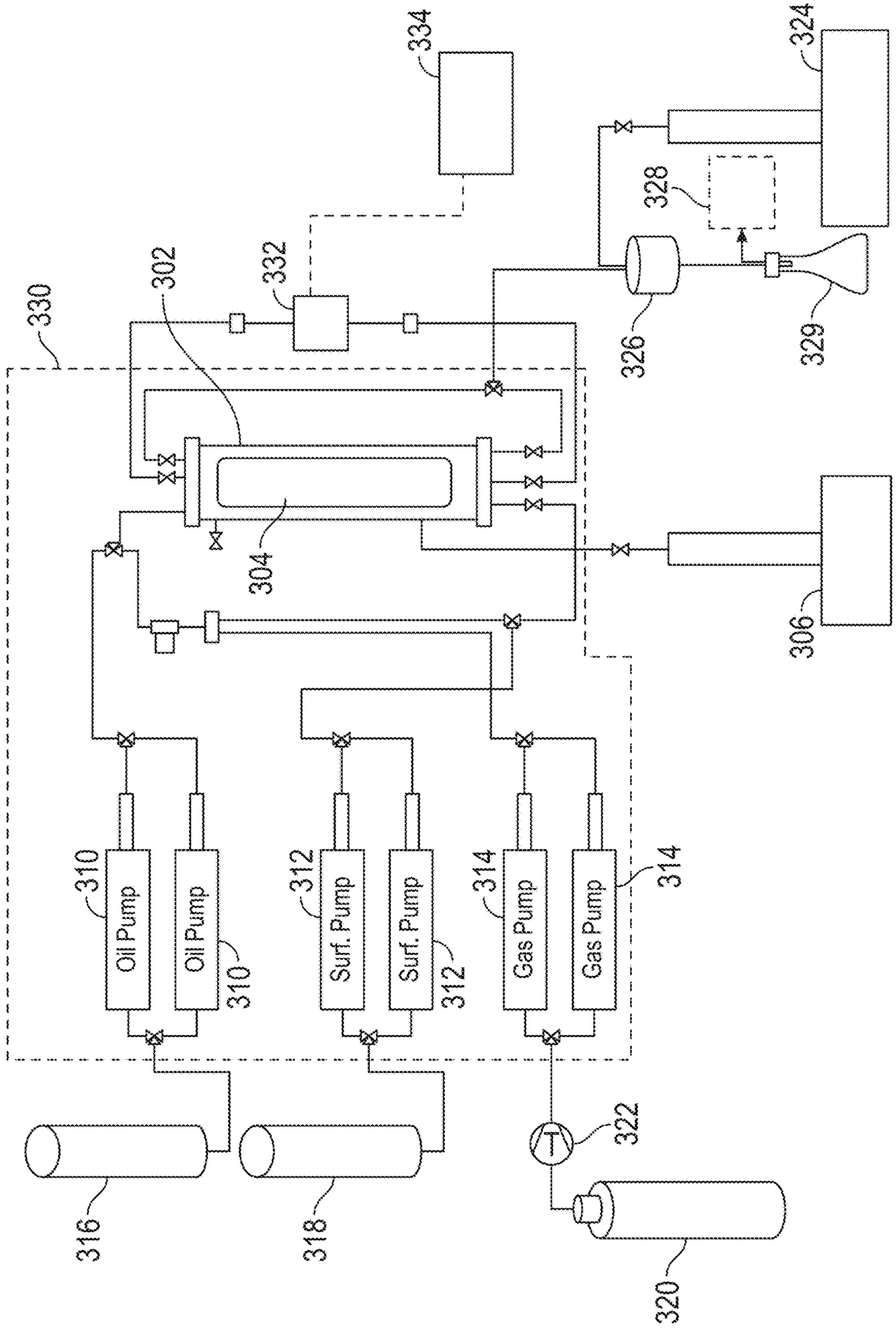
FIG. 3 is a schematic diagram of an example system for performing coreflooding experiments according to at least one embodiment of the present disclosure.

Coreflooding experiments. Coreflooding experiments were carried out using a high-pressure, high-temperature (HPHT) apparatus to determine the foam strength that can be indicated by some parameters, for example, the apparent viscosity and mobility reduction factor which is the ratio of the pressure drop obtained in the absence and presence of foam. FIG. 3 shows an example of an HPHT apparatus 300. The apparatus 300 includes a core holder 302 and a sleeve 304 located inside the core holder 302. A confining pump 306 is positioned in fluid communication with the core holder 302. The core holder 302 holds the core specimens (for example, MNCB, Edwards limestone) through the sleeve 304 by applying a confining pressure (for example, about 24.13 MPa) through operation of the confining pump 306. The core holder 302 is typically made of steel or Hastelloy, while the sleeve 304 is made of an elastomeric/rubber material such as fluoroelastomers including Viton® and AFLAS™ fluoroelastomers, though others can be suitably used.

The core holder 302 is in fluid communication with three dual-cylinder pumps 310, 312, and 314 via suitable tubing and valves. The dual-cylinder pump 310 is used to inject oil into the core holder 302, the dual-cylinder pump 312 is used to inject a surfactant solution into the core holder 302, and the dual-cylinder pump 314 is used to inject a foaming gas into the core holder 302. Separate units containing an oil 316, a surfactant solution 318, and a foaming fluid (for example, foaming gas 320) are fluidly coupled to the corresponding dual-cylinder pump. A back-pressure pump 324 and a back-pressure regulator 326 in fluid communication with the core holder 302 controls the system back-pressure. Any suitable pumps can be used for injecting the oil 316, surfactant solution 318, and foaming gas 320 such as high-precision Quizix 5000 or 6000 series pumps. For the examples, three dual-cylinder 5000-series Quizix pumps (Chandler Engineering) were utilized. Additionally, or alternatively, mass flow controllers and/or gas boosters 322 (such as Haskel gas boosters) can be utilized, among other suitable equipment. Similarly, any suitable pump can be utilized for the back-pressure pump 324 and confining pump 306, such as syringe pumps available from Teledyne ISCO. The back-pressure regulator 326 can be in fluid communication to a fume hood 328 via a flask 329

The core holder 302 and the three dual-cylinder pumps 310, 312, and 314 are positioned inside a temperature-controlling device 330 (such as an oven, heater, or other temperature-controlling device, for example, an air bath, as indicated in FIG. 3 by the dashed lines). The temperature-controlling device 330 is utilized to regulate the temperature of the system. The temperature can be controlled by, for example, a resistance temperature device and a microprocessor temperature controller. In some embodiments, the temperature-controlling device 330 is set to a temperature of about 90° C., though other suitable temperatures are contemplated. Dynamic flow, differential pressure, pressure drop, et cetera was monitored via a differential pressure transmitter 332 (dPT) coupled to the inlets and outlets of the core holder 302. Any suitable dPT can be used such as a Rosemount dPT available from Emerson. Data acquired from the dPT, or other portions of the apparatus (for example, pumps, tanks, etcetera) are logged via connection to a computer 334 for data acquisition.

Prior to the coreflood experiments, core samples were saturated with the synthetic brine for 24 h or more under ambient conditions (about 21° C., about atmospheric pressure). For the coreflood experiments, the foams were pre-generated before reaching the core holder by flowing the foaming gas and surfactant solution simultaneously through a 7-μm Tee filter, such as those available from Swagelok.

Pore volume. The pore volume of each core sample was determined by the difference between the dry weight of the core sample and the wet weight of the core sample after saturation for 24 under ambient conditions (21° C., atmospheric pressure). Table 1D, supra, provides experimentally determined pore volumes of the core samples.

Porosity. The porosity of each core sample was determined from the ratio of a core sample's pore volume to the core sample's bulk volume. Table 1D, supra, provides experimentally determined porosity values of the core samples. The bulk volume was determined using calipers to measure the length and diameter, with the assumption that the core sample was cylindrical.

Permeability. After each core sample was brought to reservoir conditions (about 90° C. and about 13.8 MPa), absolute permeability of each core sample was determined from pressure drop values measured at different total flow rates using Darcy's law. The absolute permeability measurement was performed using brine. Table 1D, supra, provides experimentally determined permeability of the core samples.

Gas injection was performed at a flow rate of about 0.2 mL/min until brine production ceased (about 5 to 8 pore volumes (PV)) and irreducible water saturation was reached. The irreducible water saturations achieved were found to be about 32% in MNCB cores and 29% in Edwards limestone cores. Surfactant solution and the tested foaming gas were then co-injected to reach a steady-state condition at different gas fractional flows (foam qualities) with a fixed total flow rate. Flow rates of 0.2 mL/min were fixed for all experiments.

Optimum Foam Quality. The optimum foam quality was determined by obtaining the highest foam strength during a foam quality scan.

Foam flow behavior measurements. The foam flow behavior was tested by injecting the foam to reach the optimum foam quality (as defined above) with increasing total foam injection rate from about 0.02 mL/min to about 0.5 mL/min (equivalent to about 0.6-15 ft/day total interstitial velocity for MNCB cores, and about 0.5-12 ft/day total interstitial velocity for Edwards limestone cores. The effect of oil was also evaluated. Here, foam and oil were co-injected into a core sample to maintain a constant oil saturation.

According to embodiments described herein, the total flow rate may be referred to as the summation of total foam flow rate and corresponding oil flow rate (for example, about 0.024 to about 0.6 mL/min). Each subtest was terminated after reaching a steady-state condition in which the pressure drop values remained considerably stable.

Gas fractional flow (or foam quality), $f_g$, was determined by the ratio of gas velocity ($u_g$) to the total velocity of the gas phase ($u_g$) and liquid phases ($u_l$) using Equation 1:

$$f_g=(u_g)/(u_g+u_l) \quad \text{Eq. 1}$$

Foam strength was evaluated based on the calculated apparent viscosity established across the core sample. The apparent viscosity values were obtained using Darcy's Law, assuming an instantaneous foam generation as a single-phase fluid takes place wherever gas encounters surfactant solution.

The apparent viscosity of a foam in the absence of oil, $\mu_{app(oil\text{-}free)}$, is calculated using Equation 2:

$$\mu_{app(oil\text{-}free)}=(k_{abs}|\Delta P|)/(u_{total}L)=(k_{abs}|\Delta P|)/((u_g+u_l)L) \quad \text{Eq. 2}$$

where $k_{abs}$ is the absolute permeability of the core sample, $\Delta P$ is the pressure drop across the sample, $u_g$ and $u_l$ are the Darcy velocities of the gas phase and aqueous phase, and L is the length of the core sample.

The apparent viscosity of a foam in the presence of oil, $\mu_{app(oil)}$, is calculated using Equation 3:

$$\mu_{app(oil\text{-}free)}=(k_{abs}|\Delta P|)/((u_g+u_l+u_o)L) \quad \text{Eq. 3}$$

where $k_{abs}$ is the absolute permeability of the core sample, $\Delta P$ is the pressure drop across the sample, $u_g$ and $u_l$ are the Darcy velocities of the gas phase and aqueous phase, respectively, $u_o$ is the oil velocity, and L is the length of the core sample.

The set of experiments described above was arranged for combinations of selected surfactant and different foaming gas types, for example: Surfactant/$N_2$, Surfactant/$CH_4$, and Surfactant/$CO_2$. Each test was performed in the MNCB and Edwards limestone cores, having relatively low permeabilities, to represent tight oil reservoirs.

Table 2 presents properties of two cationic surfactants and four zwitterionic surfactants that showed good foaming ability under reservoir conditions (temperature of about 90° C. and a pressure of about 13.8 MPa). CMC refers to critical micelle concentration, and MW refers to molecular weight. The values for density and viscosity were measured at about 90° C. and about 13.8 MPa. Surfactant S-21, as shown in Table 2, is a mixture of lauramidopropylamine oxide and myristamidopropylamine oxide.

TABLE 2

| Surfactant Ex. | CMC, mg/L | MW, g/mol | Density, g/mL | Viscosity, mPa · s |
|---|---|---|---|---|
| S-9 | 416.96 | 263.9 | 1.0831 | 0.5642 |
| S-10 | 4501.76 | 308.34 | 1.0845 | 0.5270 |
| S-18 | 95.9 | 342.5 | 1.0904 | 0.5228 |
| S-19 | 11 (pH 6-7) | 251 | 1.0875 | 0.5344 |
| S-20 | 685 | 342.5 | 1.0873 | 0.5028 |
| S-21 | 86.0 | 307 | 1.0838 | 0.6145 |

Figure 4A:
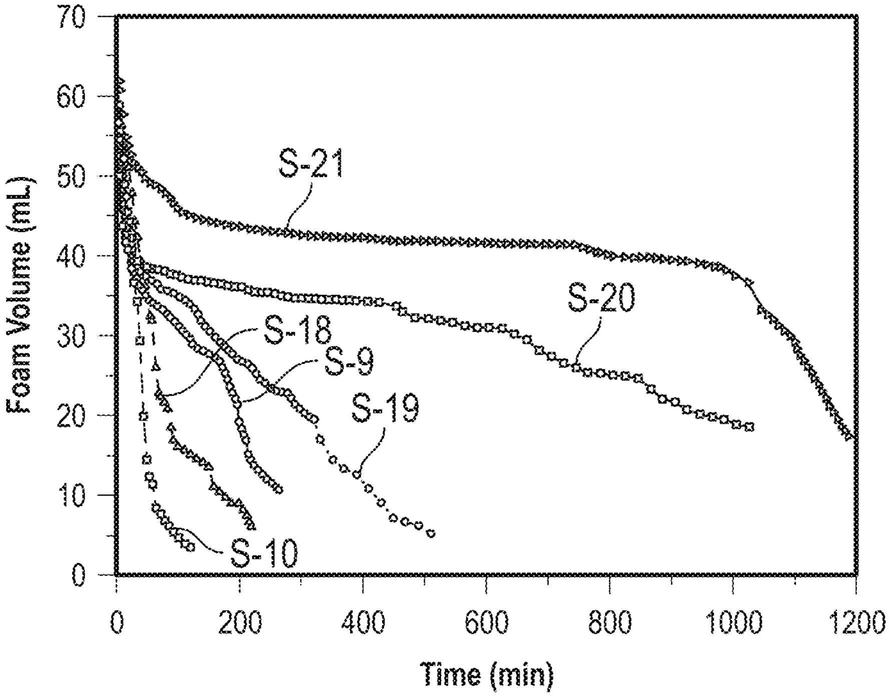
FIG. 4A is a graph illustrating exemplary data for foam volume as a function of time measured for six example surfactants according to at least one embodiment of the present disclosure.
Figure 4B:
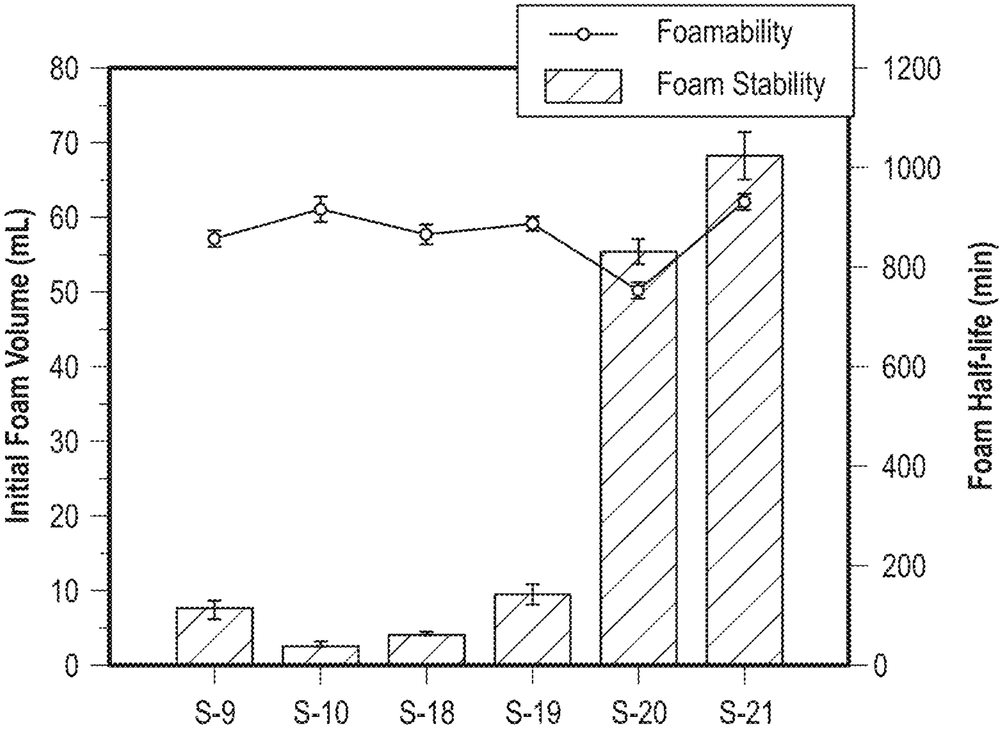
FIG. 4B shows exemplary data of initial foam volume produced by each surfactant of FIG. 4A and their half-lives at about 90° C. and about 13.8 MPa according to at least one embodiment of the present disclosure.

FIG. 4A and FIG. 4B show selected properties of foams produced from the surfactants shown in Table 2. Specifically, FIG. 4A is a graph illustrating exemplary data for foam volume as a function of time measured for Surfactant S-9, Surfactant S-10, Surfactant S-18, Surfactant S-19, Surfactant S-20, and Surfactant S-21. For the data shown in FIG. 4A, the foams were formed using $N_2$ as the gas phase and foam decay/foam volume was measured over a period of about 100 minutes to about 1200 minutes depending on the foam formed. Steep reductions in foam volume were found at earlier stages. Surfactant S-9, Surfactant S-10, Surfactant S-18, and Surfactant S-19 showed continuous decay in the foam volume. Surfactant S-20 and Surfactant S-21 were characterized as having pseudo-plateau foam volume followed by a second decay in the foam volume.

FIG. 4B is a bar graph illustrating exemplary data of initial foam volume produced by each surfactant of FIG. 4A and their half-lives at about 90° C. and about 13.8 MPa. The data indicated that each surfactant showed similar foamability (indicated by the solid line). The example zwitterionic surfactants-Surfactant S-20 and Surfactant S-21-achieved high foam stability, with Surfactant S-20 having a half-life greater than about 13.5 h and Surfactant S-21 having a half-life greater than about 16.6 h.

Figure 5A:
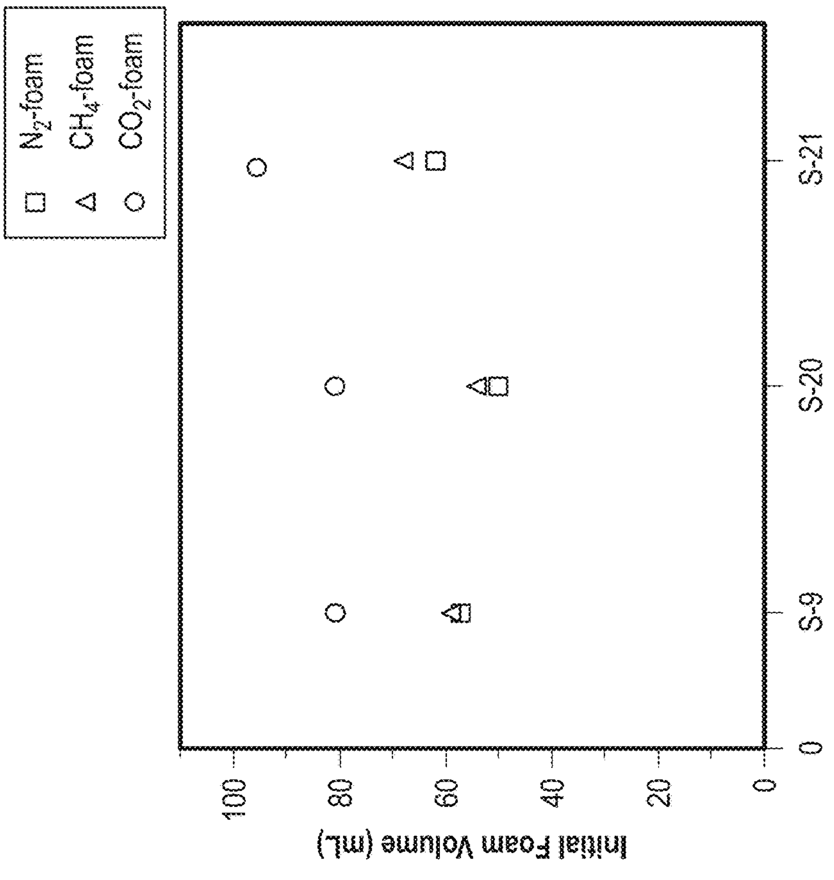
FIG. 5A shows exemplary data of initial foam volume stabilized by example Surfactants S-9, S-20, or S-21 using different gas types—nitrogen ($N_2$), methane ($CH_4$), or carbon dioxide ($CO_2$)—according to at least one embodiment of the present disclosure.
Figure 5B:
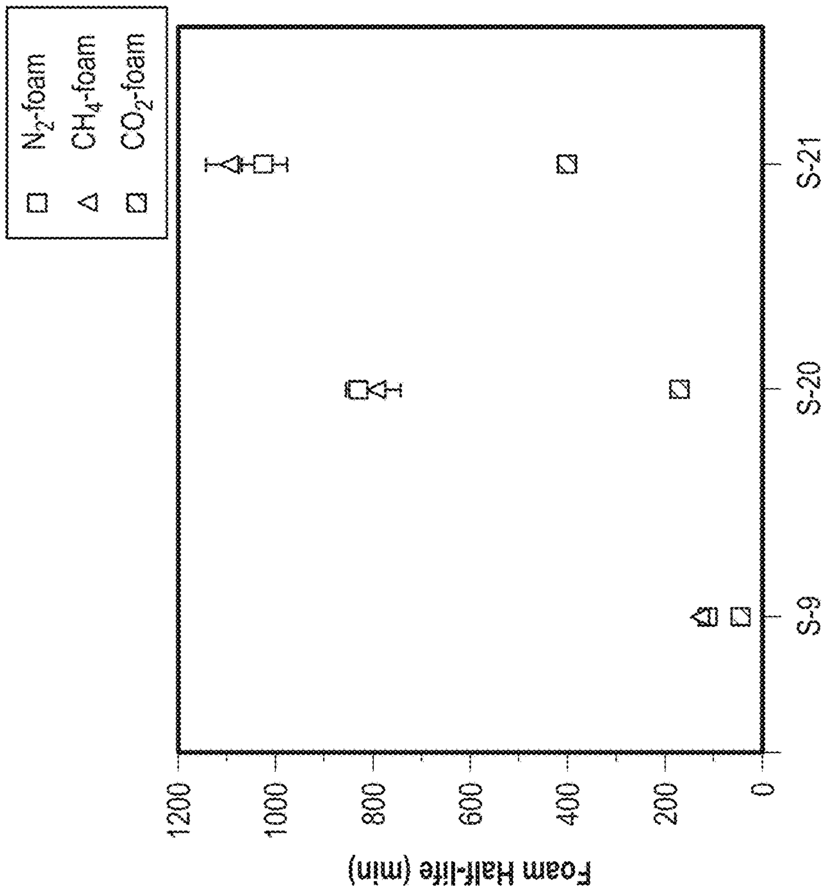
FIG. 5B shows exemplary data for the half-life of foams stabilized by example Surfactants S-9, S-20, or S-21 using different gas types—nitrogen ($N_2$), methane ($CH_4$), or carbon dioxide ($CO_2$)—according to at least one embodiment of the present disclosure.

FIG. 5A and FIG. 5B illustrate initial foam volume and half-life, respectively, for foams stabilized by Surfactant S-9, Surfactant S-20, or Surfactant S-21. These figures provide insight into the bulk foam performance of each surfactant. For each surfactant, $N_2$, $CH_4$, and $CO_2$ gases were tested and used to generate the foam at about 90° C. and about 13.8 MPa. In FIGS. 5A and 5B, and above each surfactant listing on the x-axis, the square represents $N_2$-foam, the triangle represents $CH_4$-foam, and circle represents $CO_2$-foam. The data in FIG. 5A indicated that the volume of foam generated with $CO_2$ was more than about 30% higher than the volume of foams generated with $N_2$ and $CH_4$. The volume of foam generated at the initial stage corresponded to the average foam capacity calculated for the different types of foaming gas. Results from multiple runs are presented in Table 3.

TABLE 3

| | Average Foam Capacity | | |
|---|---|---|---|
| Surfactant Ex. | $N_2$ | $CH_4$ | $CO_2$ |
| S-9 | 0.672 | 0.689 | 0.952 |
| S-20 | 0.591 | 0.630 | 0.953 |
| S-21 | 0.729 | 0.796 | 1.048 |

Foamability results for $CO_2$-foams were consistent, with the foam capacity>1 for Surfactant S-21. The foam capacities for Surfactant S-9 and Surfactant S-21 were slightly less than unity. As described above, a foam capacity value>1 indicates that the total amount of gas delivered is retained in the foam column during foam generation, while a foam capacity value<1 indicates that only a portion of the gas is retained or trapped in the foam column during foam generation. Foams generated with $N_2$ and $CH_4$ had significantly lower foam capacity values indicating that $CO_2$ may be more effective in generating foams. While not wishing to be bound by theory, this result may be due to the lower surface tension of the surfactant against $CO_2$ relative to the other gases. For example, the surface tension (@90° C., 13.8 MPa) of Surfactant S-9, Surfactant S-20, and Surfactant S-21 against $N_2$ were determined to be about 15.188 mN/m, about 15.284 mN/m, and about 16.489 mN/m, respectively. The surface tensions are much lower for $CO_2$: the surface tension (@90° C., 13.8 MPa) of Surfactant S-9, Surfactant S-20, and Surfactant S-21 against $CO_2$ were determined to be about 6.581 mN/m, about 6.122 mN/m, and about 5.545 mN/m, respectively. Accordingly, and in some embodiments, $CO_2$ can provide a higher foamability and a larger foam capacity value than $N_2$ or $CH_4$.

Surfactant monolayers can affect the permeability of the foam film to gas, thereby impacting foam stability. Foam stability can also be affected by gas solubility. Table 4 shows the calculated solubility (@90° C., 13.8 MPa) of $N_2$, $CH_4$, and $CO_2$ in water.

TABLE 4

| Gas type | Gas solubility, mol/kg water |
|---|---|
| $N_2$ | 0.05615 |
| $CH_4$ | 0.08940 |
| $CO_2$ | 1.00545 |

The data shown in FIG. 5B indicated that the half-life of $CO_2$-foam is significantly lower than the half-life of $N_2$-foams and the half-life of $CH_4$-foams. The low stability of $CO_2$-foam can be related to the $CO_2$ solubility (Table 4), which is significantly higher than the solubility of $N_2$ and $CH_4$. The determination that $CH_4$-foams have a higher stability than $N_2$-foams did not necessarily follow the trend that higher gas solubility has lower foam stability as shown by the data in FIG. 5B, where $CH_4$-foams stabilized by S-9 and S-21 were only slightly more stable than the corresponding $N_2$-foams stabilized by Surfactants S-9 and S-21, and the $N_2$-foam stabilized by S-20 was more stable than the $CH_4$-foam stabilized by S-20. The longest half-life was achieved by the foam stabilized by Surfactant S-21 with all gas types.

Figure 6B:
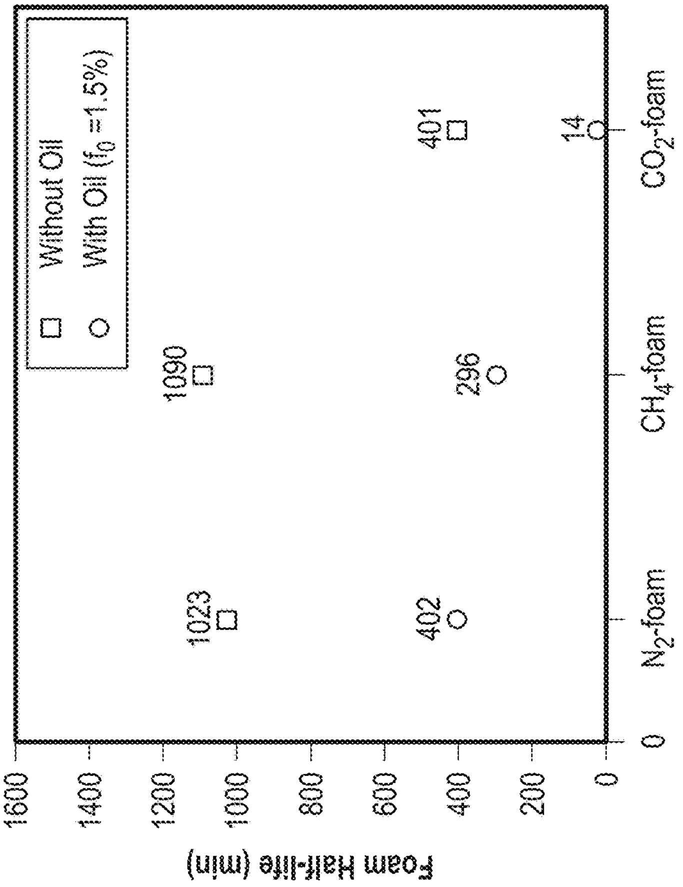
FIG. 6B shows exemplary data for the half-life of foam stabilized by example Surfactant S-21 with different gas types in the absence and presence of oil according to at least one embodiment of the present disclosure.
Figure 6A:
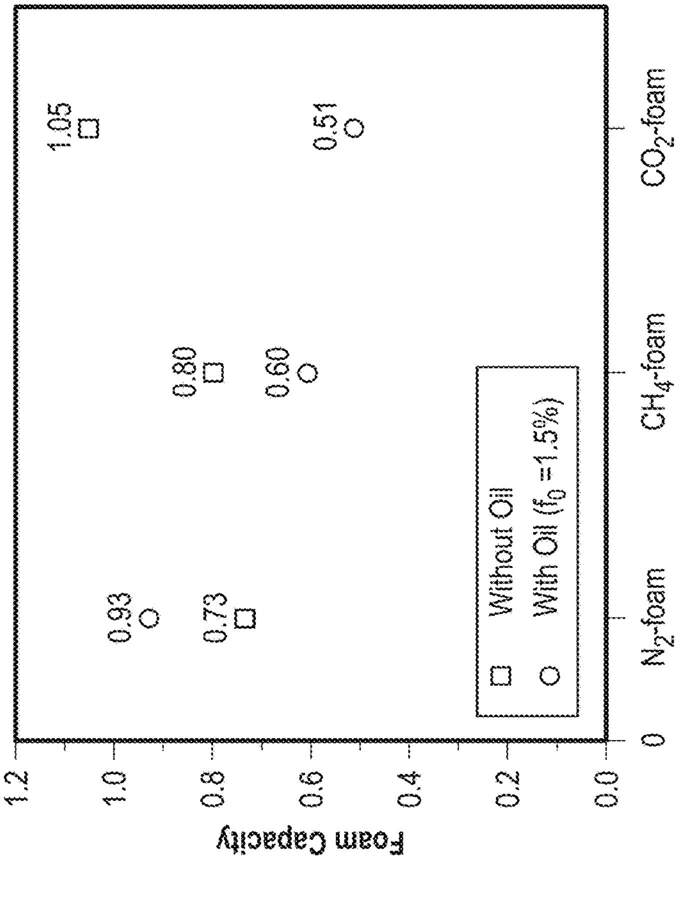
FIG. 6A shows exemplary data for the foam capacity of foam stabilized by example Surfactant S-21 with different gas types in the absence and presence of oil according to at least one embodiment of the present disclosure.

FIG. 6A and FIG. 6B illustrate the foam capacity and half-life, respectively, of Surfactant S-21 with different gas types in the absence of oil or the presence of oil. The data was determined at 90° C., 13.8 MPa. Within each of FIGS. 6A and 6B, and above each gas type of foam, the square represents the absence of oil (without oil) and the circle represents the presence of oil (with oil). The foam capacities for the $N_2$-foam were determined to be about 0.73 (without oil) and about 0.93 (with oil). The foam capacities for the $CH_4$-foam were determined to be about 0.80 (without oil) and about 0.60 (with oil). The foam capacities for the $CO_2$-foam were determined to be about 1.05 (without oil) and about 0.51 (with oil). Overall, the $CH_4$-foam and $CO_2$-foam with oil had lower foam capacity than oil-free $CH_4$— and $CO_2$-foams. In contrast, the foam capacity for $N_2$-foam in the presence of oil was determined to be almost 30% higher than the foam capacity measured without oil.

In some embodiments, mixing times can be selected to increase or decrease the foam capacity. For example, the mixing of one or more of the surfactant solution, the gas, and the oil can be from about 1 min to about 60 min, such as about 5 min to about 30 min, though longer or shorter mixing times are contemplated.

The foam half-life data shown in FIG. 6B indicated that $CH_4$-foam stability (half-life: about 1090 min.) was higher than $N_2$-foam stability (half-life: about 1023 min.) in the absence of oil. In the presence of oil, $CH_4$-foam stability (half-life: about 296 min.) was less than $N_2$-foam stability (half-life: about 402 min.). With respect to $CO_2$-foams, the $CO_2$-foams had a much lower half life in the presence of oil (half-life: about 14 min.) than in the absence of oil (half-life: about 401 min.). The data in FIG. 6B generally showed that the Bakken crude oil (light oil; API gravity generally between 40°-43°) significantly destabilizes foams under the conditions tested. Foam stabilization/destabilization may be different in the presence of heavier oils and/or oils with longer chain hydrocarbons.

Figure 7A:
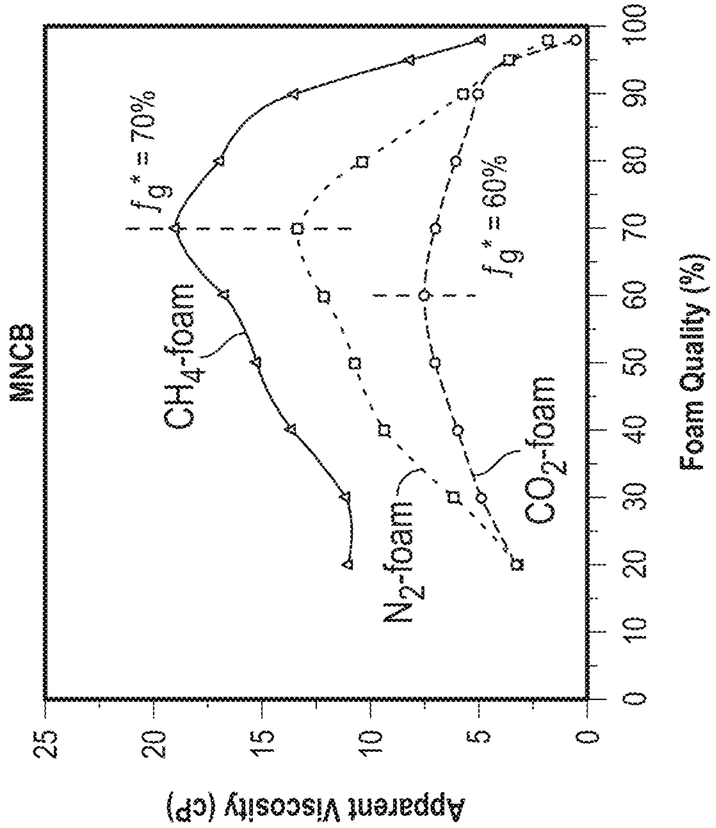
FIG. 7A is a graph illustrating exemplary foam quality scan data for different gas types performed in Minnesota Northern Cream Buff (MNCB) cores according to at least one embodiment of the present disclosure.
Figure 7B:
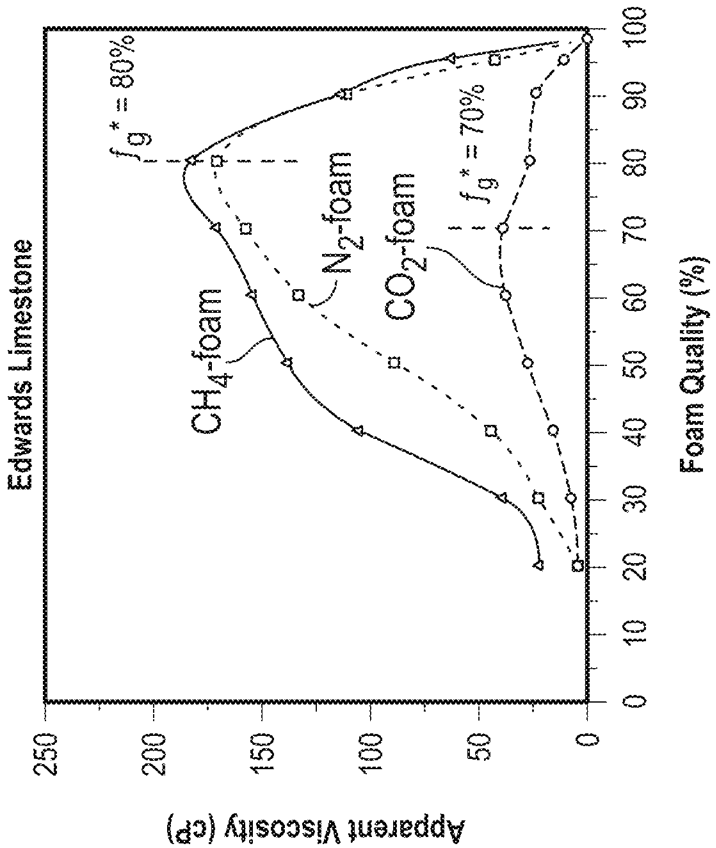
FIG. 7B is a graph illustrating exemplary foam quality scan data for different gas types performed in Edwards Yellow Limestone (Edwards limestone) cores according to at least one embodiment of the present disclosure.

Foam quality scans using two different core samples at reservoir conditions were performed to determine, for example, the highest flow resistance. Foam quality scans allow for a comparison of foam flow resistance or maximum foam strength between the gas types. FIG. 7A and FIG. 7B illustrate the apparent viscosity as a function of foam quality for different gas types in MNCB and Edwards limestone, respectively. The data for FIGS. 7A and 7B was obtained at reservoir conditions (90° C., 13.8 MPa) and a total flow rate at about 0.2 mL/min. A surfactant solution (about 5000 ppm Surfactant S-21 in synthetic brine) with the selected gas was utilized to form the foams. Maximum foam strength for the $N_2$-foam and $CH_4$-foam was observed when the foam qualities were about 70% for MNCB cores and about 80% for Edwards limestone cores. Maximum foam strength for the $CO_2$-foam was observed when the foam quality was about 60% (MNCB cores) and about 70% (Edwards limestone cores). The data indicated that steady-state foam strength, at a fixed foam quality, can decrease with increasing gas density in the following order: $CH_4$-foam, $N_2$-foam, and $CO_2$-foam.

In bulk foam embodiments, $N_2$-foam and $CH_4$-foam stabilized by S-21 surfactant exhibited good tolerance to oil.

Figure 8A:
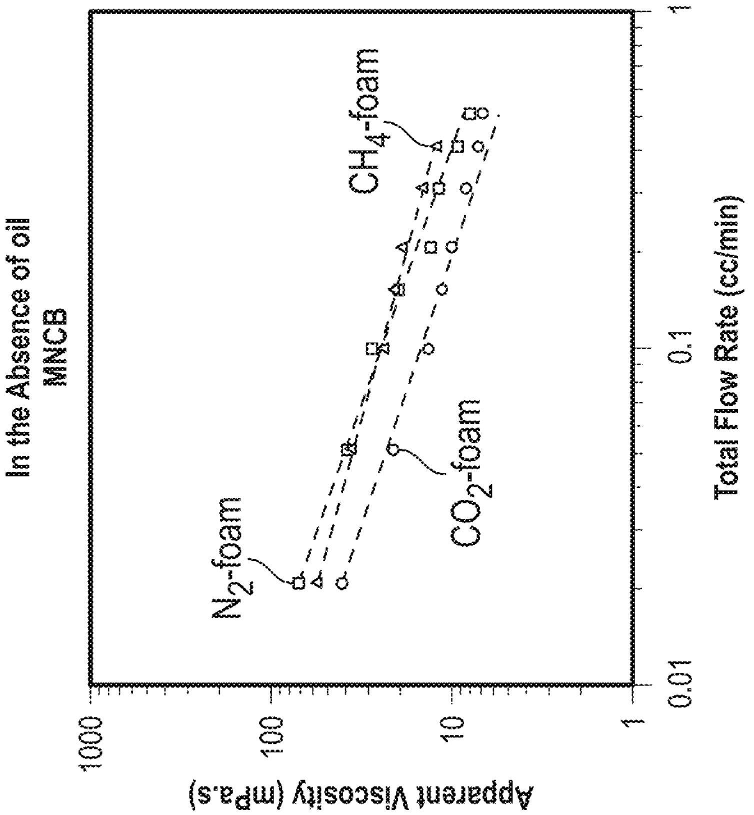
FIG. 8A is a graph illustrating exemplary data for the steady-state viscosity of foam generated with different gases in the absence of oil in MNCB cores according to at least one embodiment of the present disclosure.
Figure 8B:
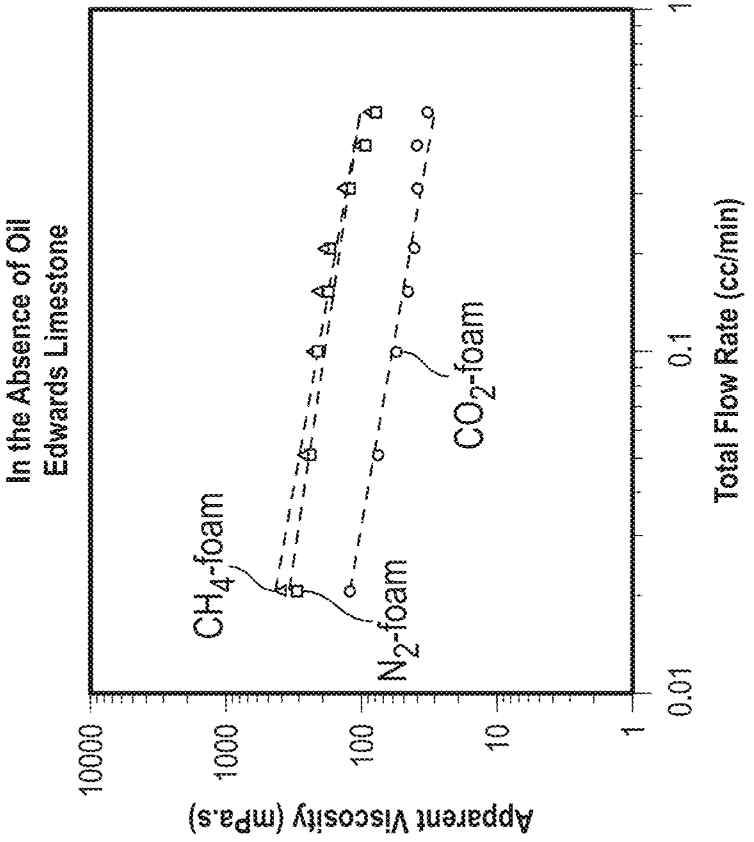
FIG. 8B is a graph illustrating exemplary data for the steady-state apparent viscosity of foam generated with different gases in the absence of oil in Edwards limestone cores according to at least one embodiment of the present disclosure.
Figure 9A:
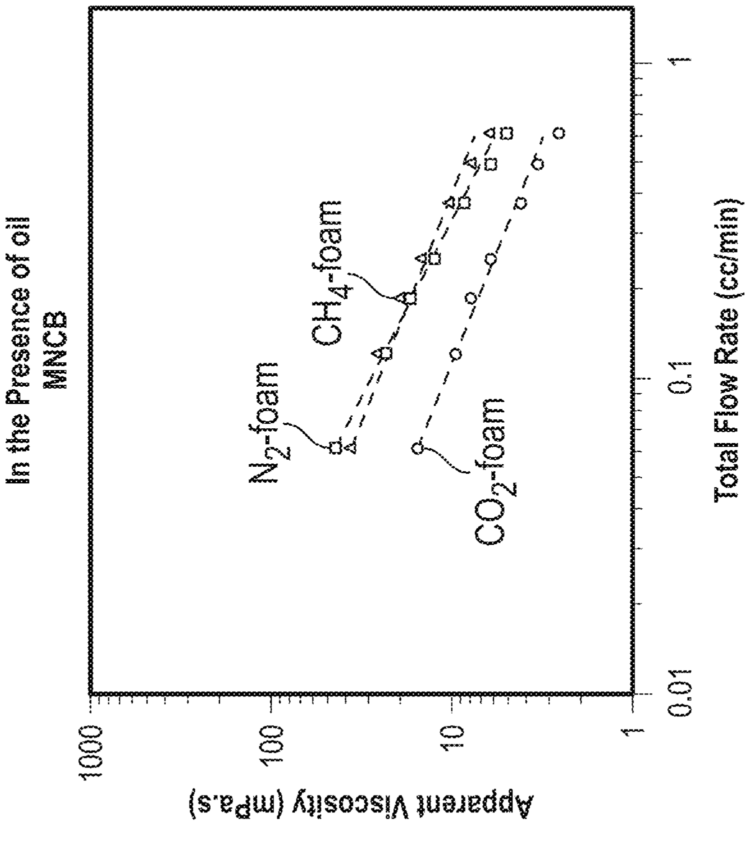
FIG. 9A is a graph illustrating exemplary data for the steady-state apparent viscosity of foam generated with different gases in the presence of oil in MNCB cores according to at least one embodiment of the present disclosure.
Figure 9B:
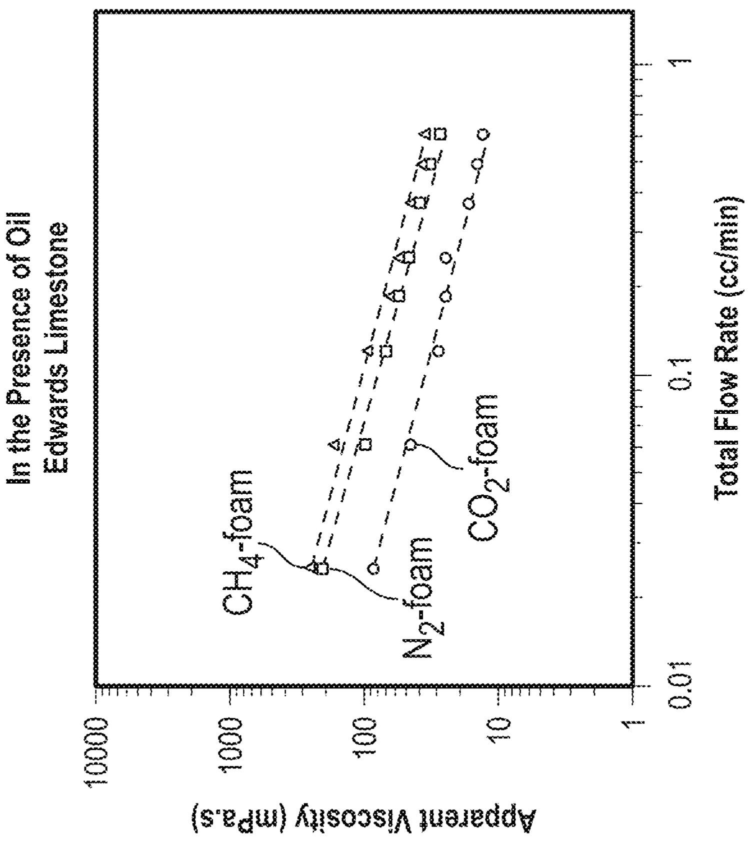
FIG. 9B is a graph illustrating exemplary data for the steady-state apparent viscosity of foam generated with different gases in the presence of oil in Edwards limestone cores according to at least one embodiment of the present disclosure.

FIG. 8A and FIG. 8B are graphs illustrating exemplary data for the steady-state apparent viscosity (mPa·s) of foams generated with different gases at optimum foam qualities in the absence of oil in MNCB cores and Edwards limestone cores, respectively. FIGS. 9A and 9B show the data the steady-state apparent viscosity of foams in the presence of oil. Fits of the data are shown with dashed lines. For the data shown in FIGS. 8A-8B and FIGS. 9A-9B, a surfactant solution (about 5000 ppm Surfactant S-21 in synthetic brine) with the selected gas was utilized to form the foams and the foam quality was selected based on the data from FIGS. 7A and 7B. In examples utilizing oil, the oil saturation was kept constant, $f_o \approx 20\%$, during foam flow, and the pressure drop build-up was monitored until the steady-state condition was reached. The total flow rate involved the oil fractional flow in addition to foam flow rate, as described in Equation 3. Overall, the data in FIGS. 8A-8B and FIGS. 9A-9B indicated that steady-state apparent viscosity decreases when the total flow rate increases. The data also showed that $CO_2$-foams have lower steady-state apparent viscosities than that of both $N_2$-foams and $CH_4$-foams. The data also indicated that rock permeability may also affect the foam strength between gases with and without oil. Edwards limestone is a porous media having a higher permeability than MNCB, and the data showed that foams had larger steady-state apparent viscosities in Edwards limestone cores.

Figure 10A:
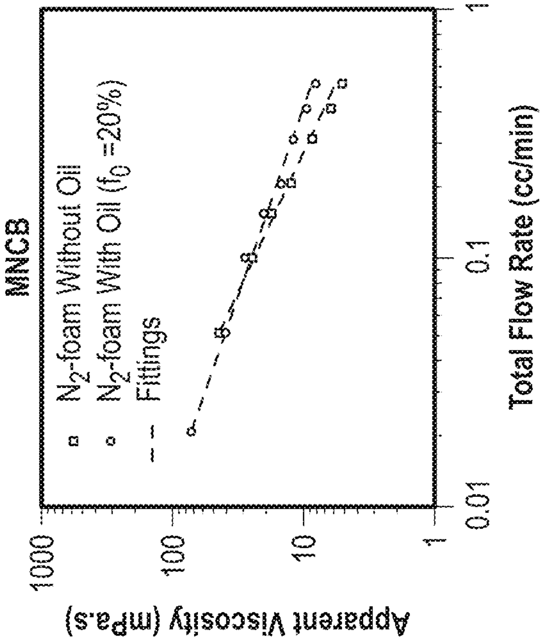
FIG. 10A is a graph illustrating exemplary data for the effect of oil on foam flow behavior produced with an example $N_2$-generated foam in an MNCB core according to at least one embodiment of the present disclosure.
Figure 10B:
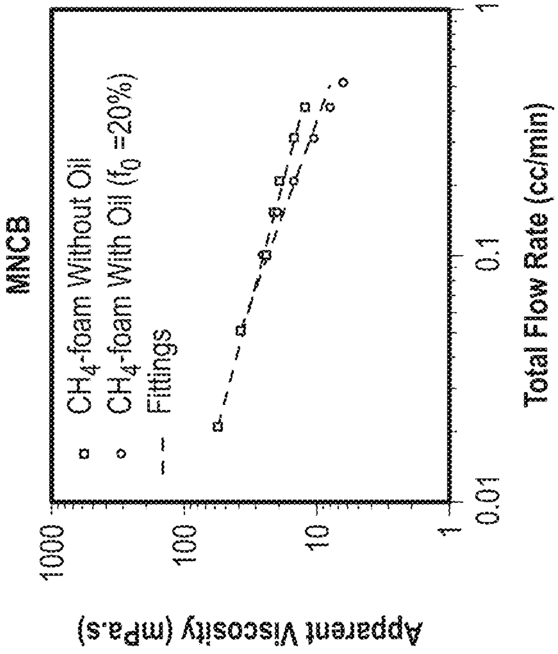
FIG. 10B is a graph illustrating exemplary data for the effect of oil on foam flow behavior produced with an example $CH_4$-generated foam in an MNCB core according to at least one embodiment of the present disclosure.
Figure 10C:
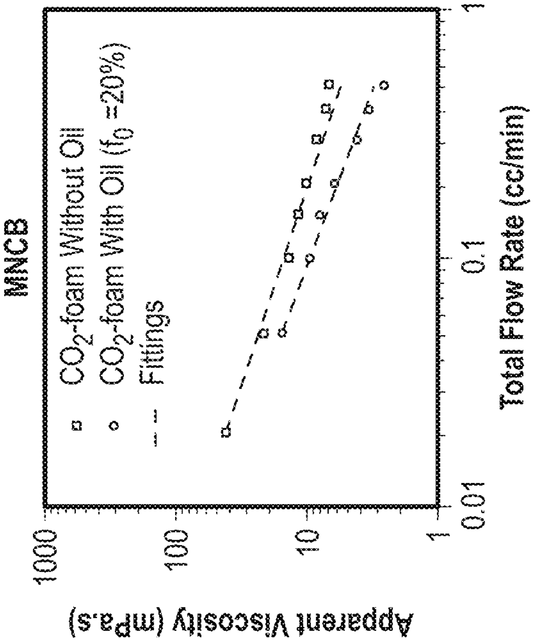
FIG. 10C is a graph illustrating exemplary data for the effect of oil on foam flow behavior produced with an example $CO_2$-generated foam in an MNCB core according to at least one embodiment of the present disclosure.
Figure 11B:
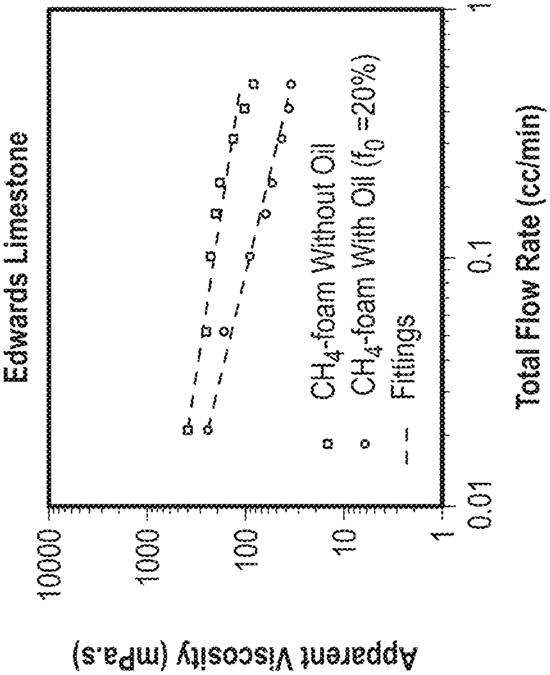
FIG. 11B is a graph illustrating exemplary data for the effect of oil on foam flow behavior produced with an example $CH_4$-generated foam in an Edwards limestone core according to at least one embodiment of the present disclosure.
Figure 11A:
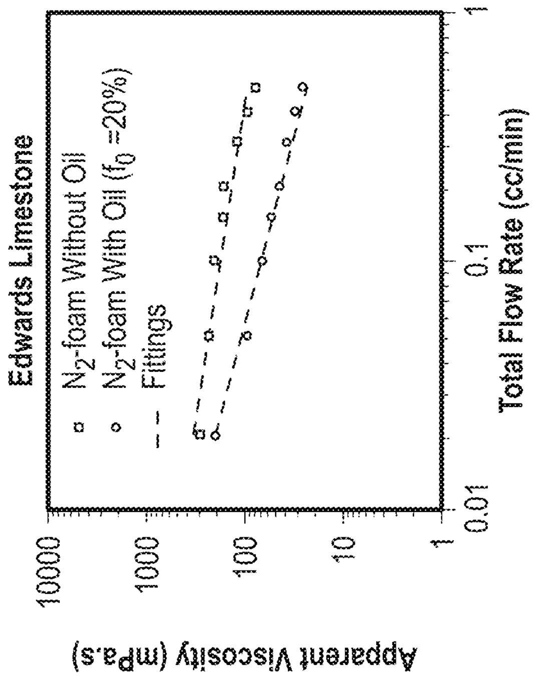
FIG. 11A is a graph illustrating exemplary data for the effect of oil on foam flow behavior produced with an example $N_2$-generated foam in an Edwards limestone core according to at least one embodiment of the present disclosure.
Figure 11C:
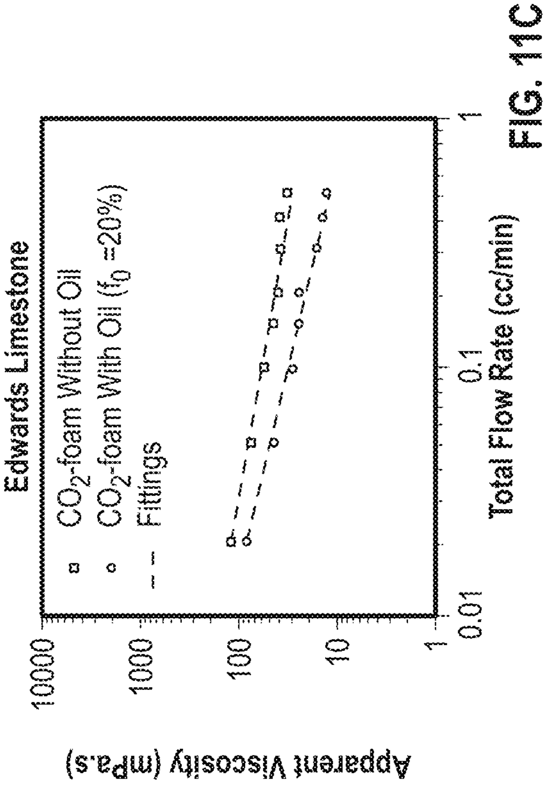
FIG. 11C is a graph illustrating exemplary data for the effect of oil on foam flow behavior produced with an example $CO_2$-generated foam in an Edwards limestone core according to at least one embodiment of the present disclosure.

FIGS. 10A, 1013, and 10C are graphs illustrating exemplary data for the effect of oil on foam flow behavior produced with $N_2$-foams, $CH_4$-foams, and $CO_2$-foams, respectively, in MNCB cores. FIGS. 11A, 1113, and 11C are graphs illustrating exemplary data for the effect of oil on foam flow behavior produced with $N_2$-foams, $CH_4$-foams, and $CO_2$-foams, respectively, in MNCB cores. Fits of the data are shown with dashed lines. For the data shown in FIGS. 10A-C and FIGS. 11A-11C, the foam injection rate was carried out in the range of about 0.02 mL/min to about 0.5 mL/min. In examples utilizing oil, the oil saturation was kept constant, $f_o \approx 20\%$, during foam flow, and the pressure drop build-up was monitored until the steady-state condition was reached. The total flow rate involved the oil fractional flow in addition to foam flow rate, as described in Equation 3.

Overall, the data in FIGS. 10A-C and FIGS. 11A-11C indicated that, in general, the foams became weaker at higher total flow rates. The data also indicated that foams generated with $N_2$ or $CH_4$ foaming gases were able to maintain foam strength at total flow rates of about 0.05 mL/min to about 0.1 mL/min, and the foam strength gradually reduced when the total flow rate increases to about 0.1 mL/min. Further, the data also showed that foams generated with $CO_2$ as the foaming gas were generally destabilized over the whole set of the total flow rates tested. In addition, the presence of oil acted to weaken the performance of the foams.

The permeability (k) of the core samples also had an effect, MNCB ($k \approx 0.8$ mD) and Edwards limestone ($k \approx 16$ mD), where the foam was more destabilized in the higher-permeability rock. As shown in FIGS. 11A-11C, the Edwards limestone cores had a more destabilizing effect on the foam strength at flow rates of about 0.2 mL/min or higher. This result indicates that the foam may act as a foam diverting agent in reservoirs having higher lithological heterogeneity.

Figure 12B:
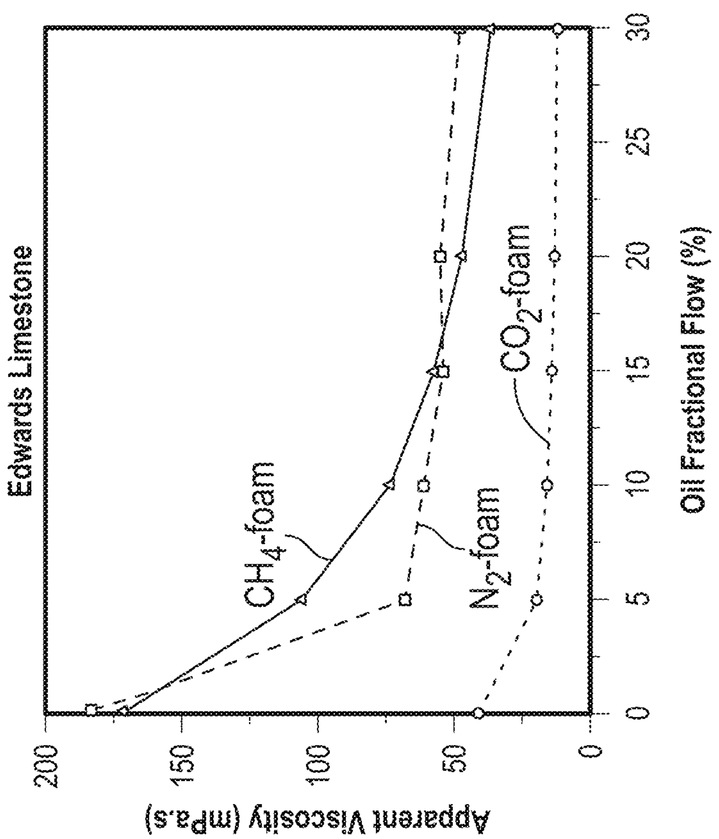
FIG. 12B is a graph illustrating exemplary data for the steady-state apparent viscosity of example foams—a $N_2$-generated foam, a $CH_4$-generated foam, and a $CO_2$-generated foam—at different oil fractional flows during foam/oil co-injection in Edwards limestone cores according to at least one embodiment of the present disclosure.
Figure 12A:
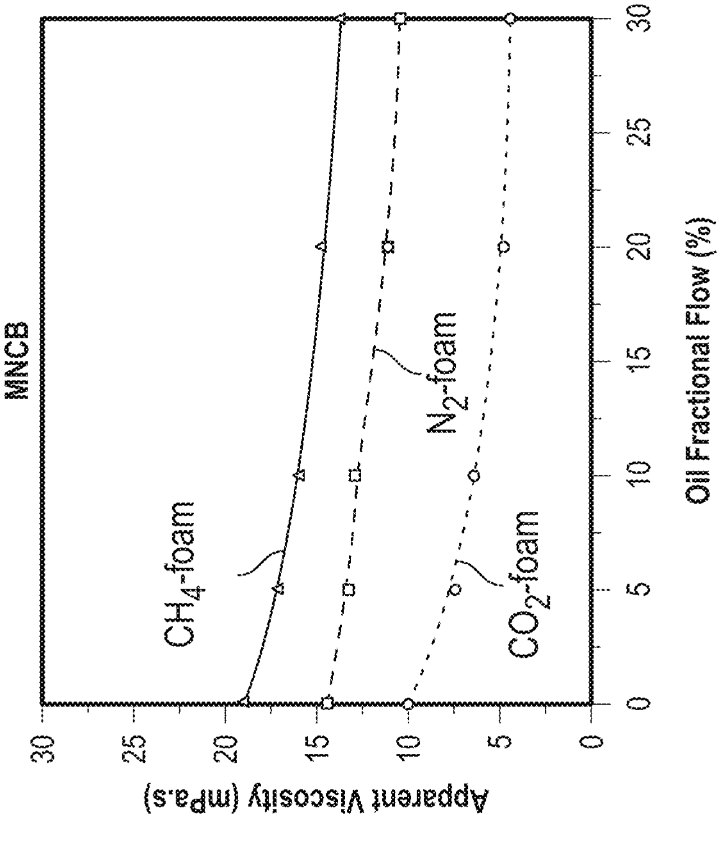
FIG. 12A is a graph illustrating exemplary data for the steady-state apparent viscosity of example foams—a $N_2$-generated foam, a $CH_4$-generated foam, and a $CO_2$-generated foam—at different oil fractional flows during foam/oil co-injection in MNCB cores according to at least one embodiment of the present disclosure.

The effect of oil saturation was examined by changing the fractional flow of oil, $f_o$, from about 5% to about 30%, during foam/oil co-injection. FIG. 12A and FIG. 12B are graphs illustrating exemplary data for the steady-state apparent viscosity of example foams—a $N_2$-foam, a $CH_4$-foam, and a $CO_2$-foam—at different oil fractional flows ($f_o$) during foam/oil co-injection in MNCB cores and Edwards limestone cores, respectively. For the data presented in FIGS. 12A and 12B, the total flow rate of foam (foaming gas plus surfactant solution) was set at about 0.2 mL/min. The optimum foam quality, as defined above, was utilized. For both MNCB and Edwards limestone cores, the foam strength generally decreased as the oil fractional flow increased for each gas utilized. Of note, the foam apparent viscosity of the $CO_2$-foams held almost steady when the oil fractional flow was about 20% and about 10% in the MNCB cores and Edwards limestone cores, respectively.

Figure 13:
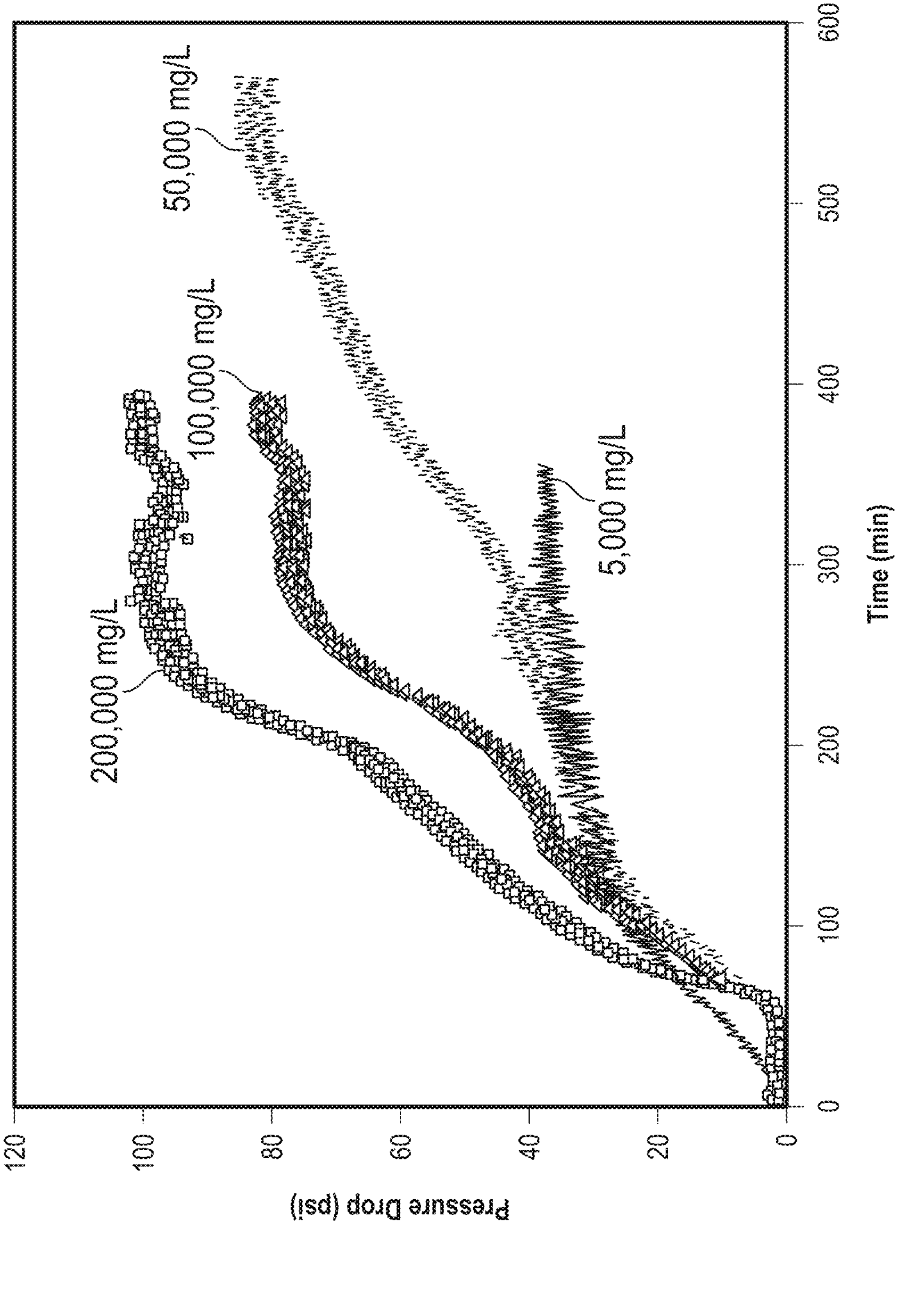
FIG. 13 shows exemplary data for the pressure drops of example foams at various concentrations of dissolved salts in an oil-wet porous medium according to at least one embodiment of the present disclosure.

FIG. 13 shows the effect of the total dissolved salts (TDS) content of brine on the pressure drop of example foams according to at least one embodiment of the present disclosure. The TDS content of the brines investigated ranged from about 5,000 mg/L to about 200,000 mg/L. The data presented in FIG. 13 was obtained at a temperature of about 115° C. and a pressure of about 242 bar in an oil-wet porous medium (with about 10% initial oil saturation in the proppant packs). In this non-limiting example, a surfactant solution (about 4,000 ppm of Surfactant S-21 in synthetic brine), though other surfactants and concentrations are contemplated. The foams were generated using a flow rate of about 1 mL/min, with a volume ratio (v/v) of aqueous phase to gas phase of about 15:85. Strong foams appeared in most cases. As shown in FIG. 13, the steady-state pressure drops of the foams ranged from about 30 psi (~2.1 bar) to about 110 psi (~7.6 bar).

Figure 14:
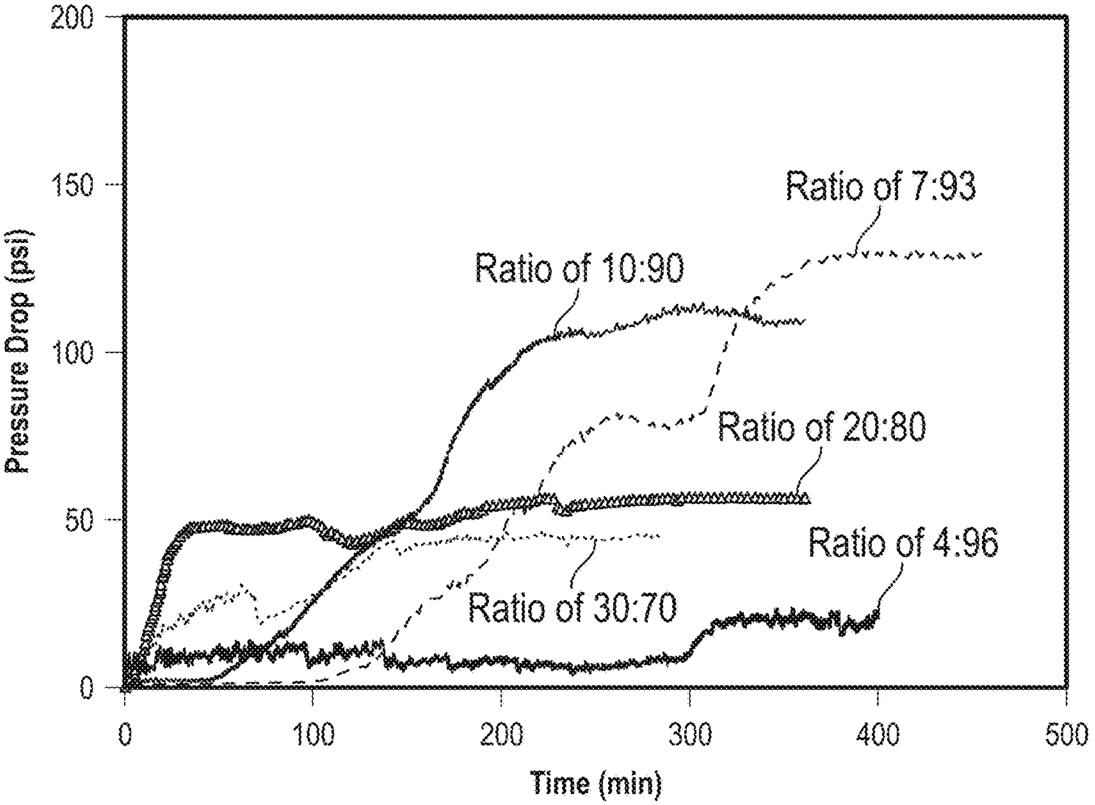
FIG. 14 shows exemplary data for the pressure drops of example foams generated at various volume ratios (v/v) of aqueous phase to gaseous phase in an oil-wet porous medium according to at least one embodiment of the present disclosure.

FIG. 14 shows data for the pressure drops of example foams generated at various volume ratios (v/v) of aqueous phase to gaseous phase according to at least one embodiment of the present disclosure. The volume ratios of aqueous phase to gas phase tested ranged from about 4:96 to about 30:70. The data presented in FIG. 14 was obtained at a temperature of about 115° C. and a pressure of about 242 bar in an oil-wet porous medium (with about 10% initial oil saturation in the proppant packs). The foams were generated using a flow rate of about 1 mL/min and a concentration of Surfactant S-21 of about 4,000 ppm. Strong foams were generated. As shown in FIG. 14, the steady-state pressure drops of the foams ranged from about 30 psi (~2.1 bar) to about 140 psi (~9.7 bar).

Figure 15:
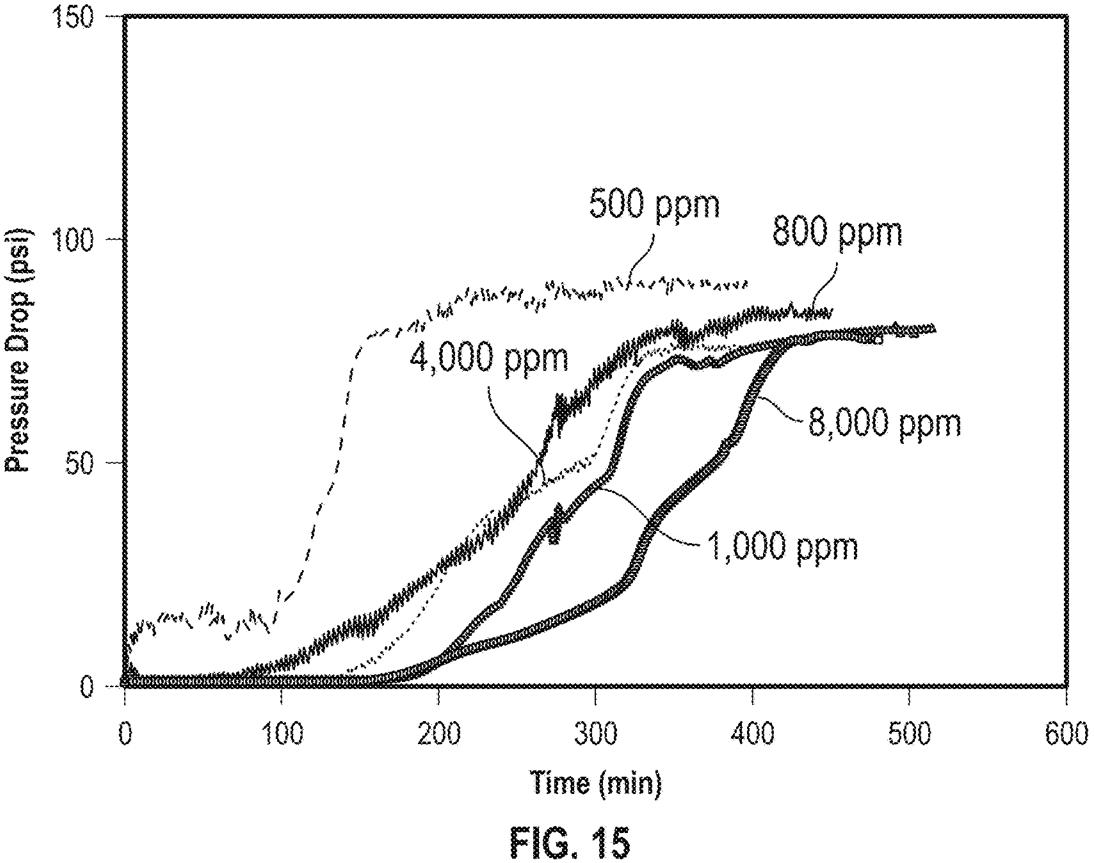
FIG. 15 shows exemplary data for the pressure drops of example foams generated using different concentrations of a primary surfactant phase in an oil-wet porous medium according to at least one embodiment of the present disclosure.

FIG. 15 shows data for the pressure drops of example foams generated using different concentrations of a primary surfactant according to at least one embodiment of the present disclosure. The concentrations of primary surfactant tested ranged from about 500 ppm to about 8,000 ppm in synthetic brine. In this non-limiting example, Surfactant S-21 was chosen, though other surfactants are contemplated. The data presented in FIG. 15 was obtained at a temperature of about 115° C. and a pressure of about 242 bar in an oil-wet porous medium (with about 10% initial oil saturation in the proppant packs). The foams were generated using a flow rate of about 1 mL/min, with the foams having a volume ratio (v/v) of aqueous phase to gas phase of about 15:85. Strong foams appeared in most cases. As shown in FIG. 15, the steady-state pressure drops of the foams ranged from about 70 psi (~4.8 bar) to about 100 psi (~6.9 bar).

Figure 16:
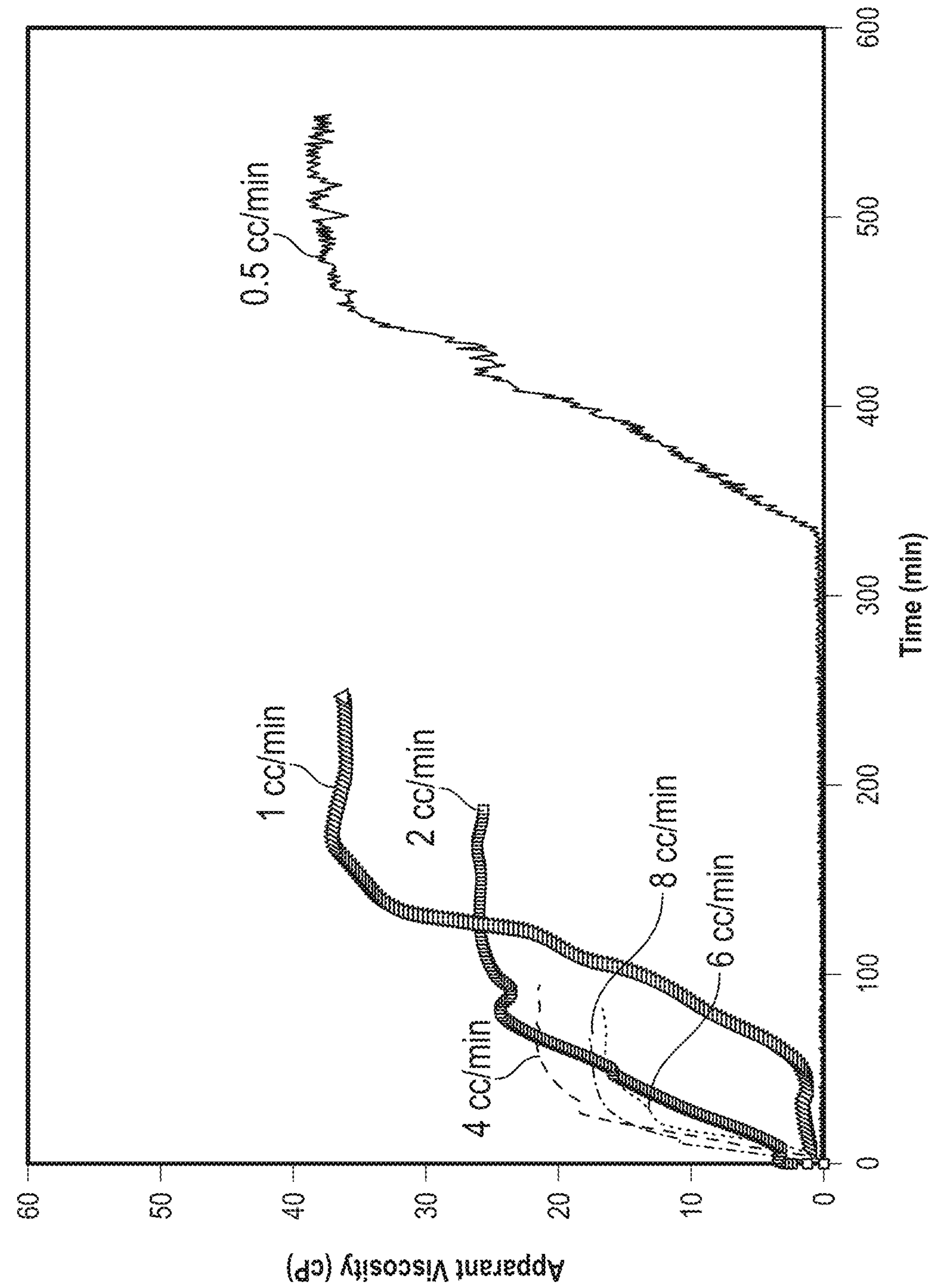
FIG. 16 shows exemplary data for the apparent viscosities of example foams generated using different total flow rates in an oil-wet porous medium according to at least one embodiment of the present disclosure.

FIG. 16 shows data for the apparent viscosities of example foams generated using different total flow rates according to at least one embodiment of the present disclosure. The total flow rates tested for this investigation ranged from about 0.5 to about 8 cc/min (about 0.5 to about 8 mL/min). In this non-limiting example, a surfactant solution (about 4,000 ppm of Surfactant S-21 in synthetic brine), though other surfactants and concentrations are contemplated. The data presented in FIG. 16 was obtained at a temperature of about 115° C. and a pressure of about 242 bar in an oil-wet porous medium. The foams generated had a volume ratio (v/v) of aqueous phase to gas phase of about 15:85. Strong foams appeared in most cases. As shown in FIG. 16, the steady-state apparent viscosity of the foams ranged from about 15 cP to about 40 cP.

Figure 17:
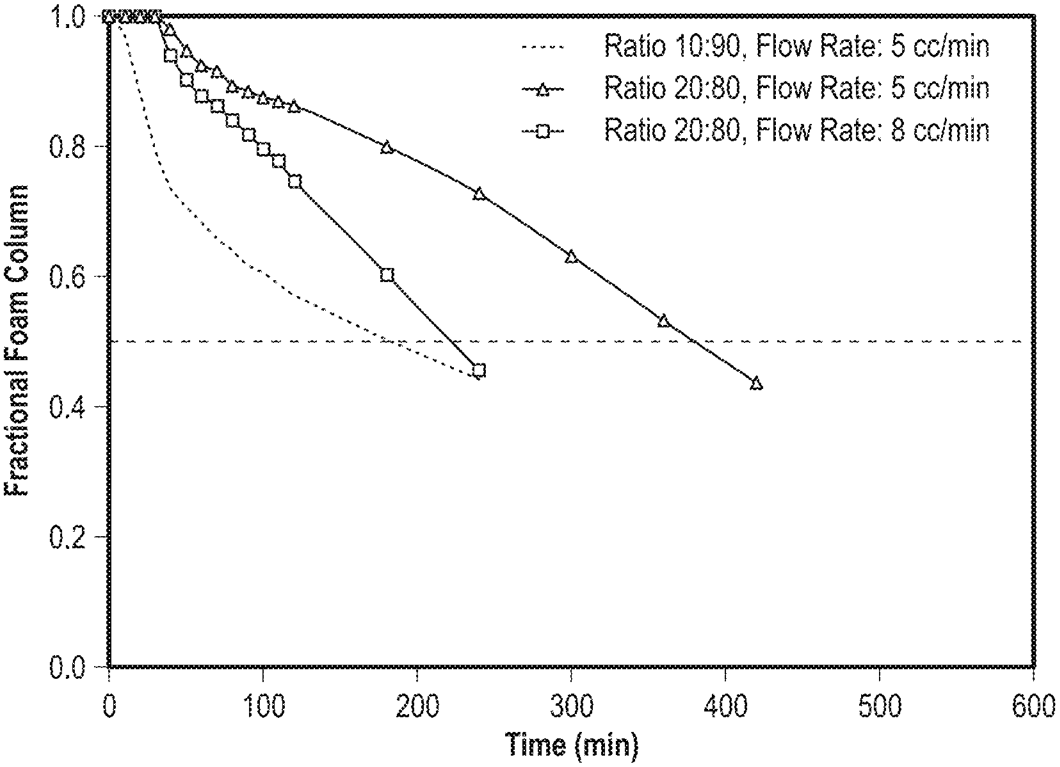
FIG. 17 shows exemplary data illustrating variations of fractional bulk-foam column height for example foams generated at various total flow rates in a water-wet porous media and in the absence of oil according to at least one embodiment of the present disclosure.

FIG. 17 shows variations of fractional bulk-foam column height for example foams generated at various total flow rates in a water-wet porous media and in the absence of oil according to at least one embodiment of the present disclosure. The water-wet porous media represents a hydrophilic consolidated porous media. In this non-limiting example, a surfactant solution (about 4,000 ppm of Surfactant S-21 in synthetic brine), though other surfactants and concentrations are contemplated. The total flow rates tested ranged from about 5 cc/min to about 8 cc/min (about 5 mL/min to about 8 mL/min), with the foams having different volume ratios (v/v) of aqueous phase to gas phase. The data presented in FIG. 17 was obtained at a temperature of about 115° C. and a pressure of about 242 bar. Strong foams appeared in most cases. As shown in FIG. 17, the half-life of the foams ranged from about 150 minutes to about 400 minutes.

Figure 18:
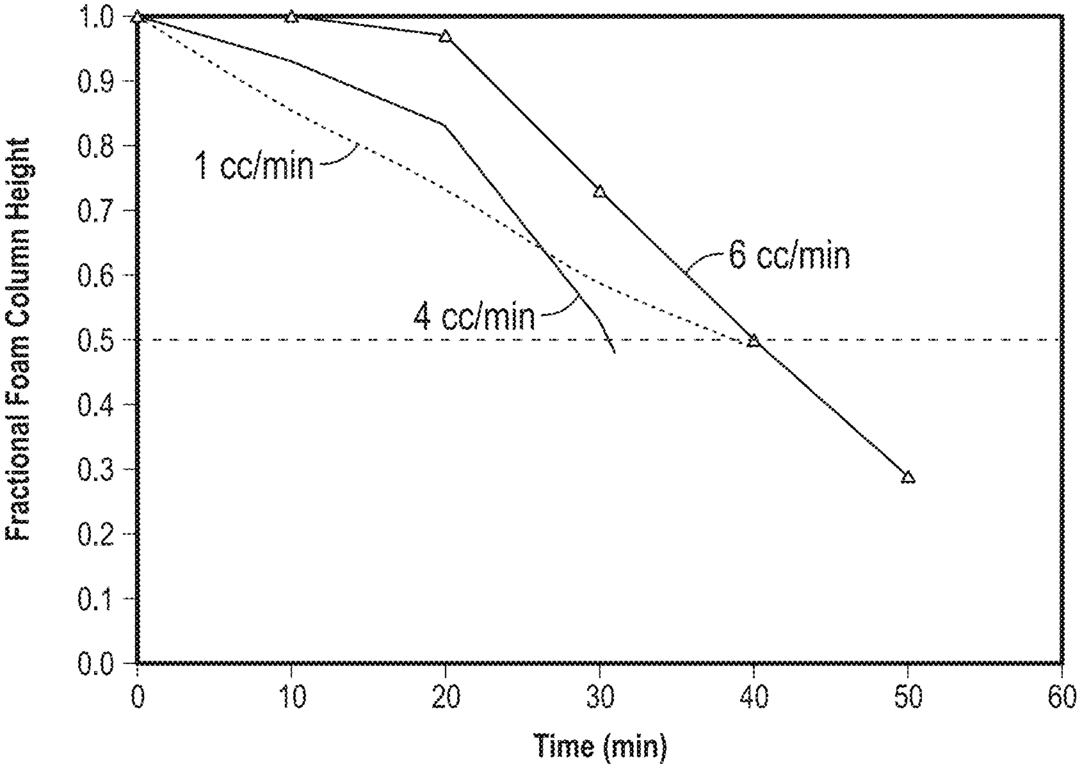
FIG. 18 shows exemplary data illustrating variations of fractional bulk-foam column height for example foams generated at various total flow rates in an oil-wet porous medium according to at least one embodiment of the present disclosure.

FIG. 18 shows variations of fractional bulk-foam column height for example foams generated at various total flow rates in an oil-wet porous medium (with 10% initial oil saturation in the proppant packs) according to at least one embodiment of the present disclosure. In this non-limiting example, a surfactant solution (about 4,000 ppm of Surfactant S-21 in synthetic brine), though other surfactants and concentrations are contemplated. The data presented in FIG. 18 was obtained at a temperature of about 115° C. and a pressure of about 242 bar. The total flow rates tested ranged from about 1 cc/min to about 6 cc/min (about 1 mL/min to about 6 mL/min, and specifically, 1, 4, and 6 cc/min), with the foams having a volume ratio (v/v) of aqueous phase to gas phase of about 15:85. Strong foams appeared in most cases. As shown in FIG. 18, the half-life of the foams ranged from about 30 minutes to about 40 minutes.

Figure 19:
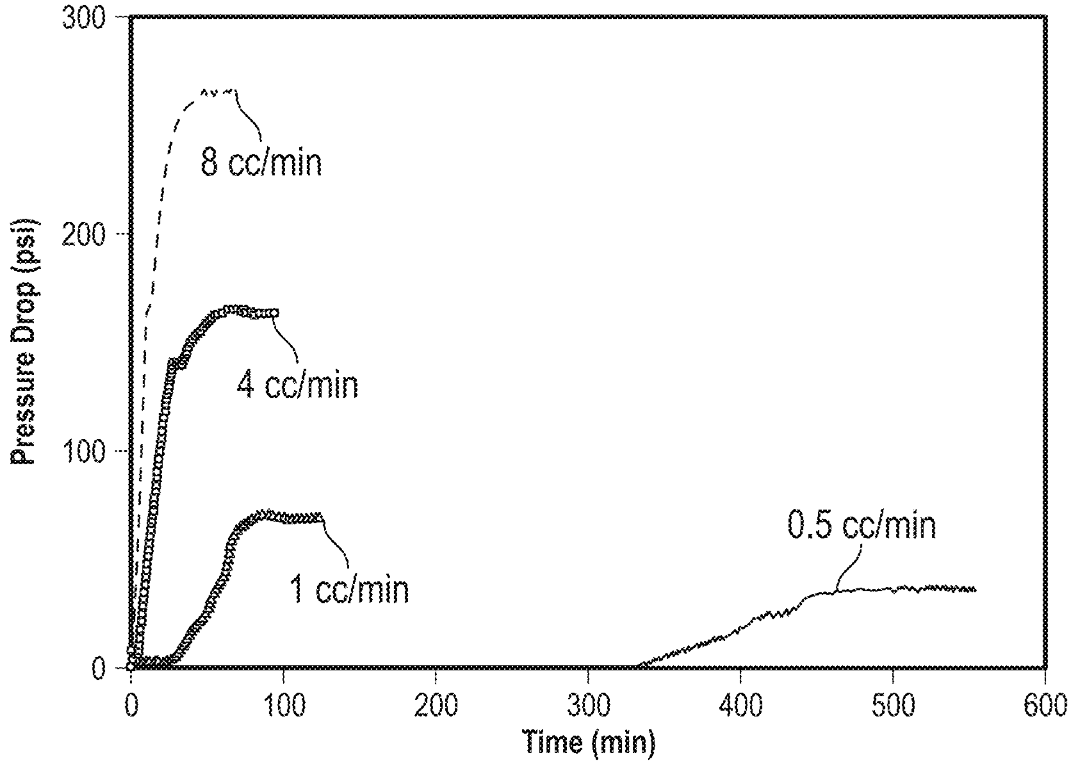
FIG. 19 shows exemplary data for the pressure drops of example foams generated using different total flow rates in an oil-wet porous medium according to at least one embodiment of the present disclosure.

FIG. 19 shows data for the pressure drops of example foams generated using different total flow rates in an oil-wet porous medium (with 10% initial oil saturation in the proppant packs) according to at least one embodiment of the present disclosure. In this non-limiting example, a surfactant solution (about 4,000 ppm of Surfactant S-21 in synthetic brine), though other surfactants and concentrations are contemplated. The total flow rates tested ranged from about 0.5 cc/min to about 8 cc/min (about 0.5 mL/min to about 8 mL/min), with the foams generated at a volume ratio (v/v) of aqueous phase to gas phase of about 15:85. The data presented in FIG. 19 was obtained at a temperature of about 115° C. and a pressure of about 242 bar. Strong foams appeared in most cases. As shown in FIG. 19, the steady-state pressure drops of the foams ranged from about 30 psi (~2.07 bar) to about 300 psi (~21 bar).

Figure 20:
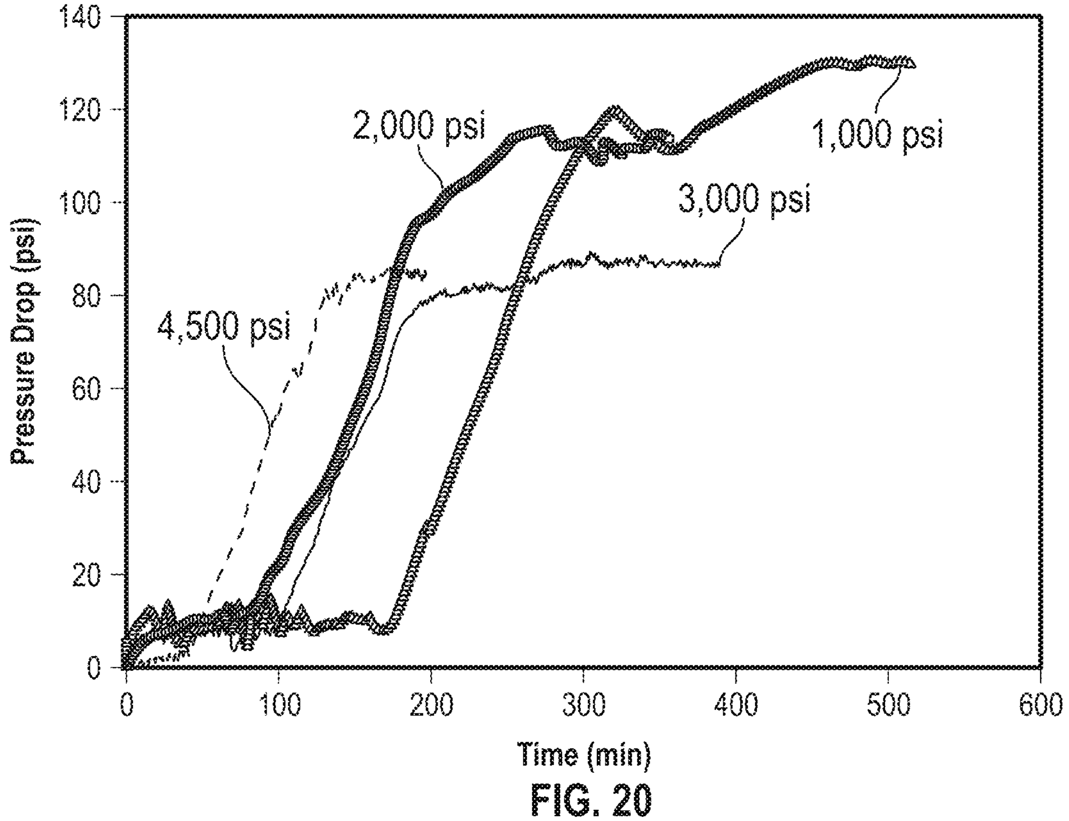
FIG. 20 shows exemplary data for the apparent viscosities of example foams generated at various formation pressures in an oil-wet porous medium according to at least one embodiment of the present disclosure.

FIG. 20 shows data for the pressure drops of example foams generated at various formation pressures in an oil-wet porous medium (with about 10% initial oil saturation in the proppant packs) according to at least one embodiment of the present disclosure. The formation pressures investigated ranged from about 69 bar to about 310 bar. In this non-limiting example, a surfactant solution (about 4,000 ppm of Surfactant S-21 in synthetic brine), though other surfactants and concentrations are contemplated. The data presented in FIG. 20 was obtained at a temperature of about 115° C. The foaming processes were conducted at a total flow rate of about 1 mL/min, with the foams having a volume ratio (v/v) of aqueous phase to volume of gas phase of about 15:85. Strong foams appeared in most cases. As shown in FIG. 20, the steady-state apparent viscosities of the foams ranged from about 5 cP to about 10 cP.

Figure 21:
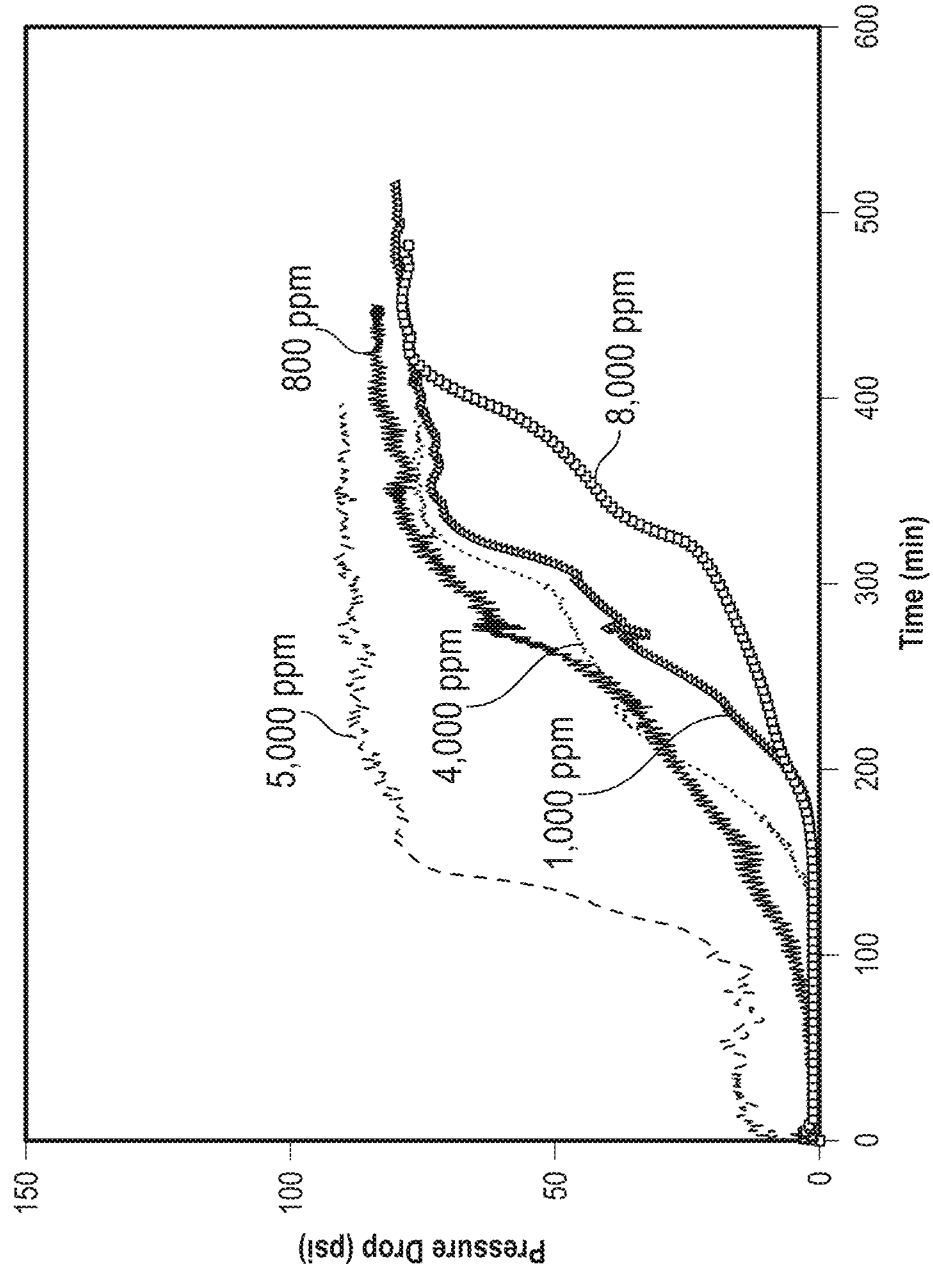
FIG. 21 shows exemplary data for the pressure drops of example foams generated using various concentrations of a primary surfactant in an oil-wet porous medium according to at least one embodiment of the present disclosure.

FIG. 21 shows data for the pressure drops of example foams generated using various concentrations of a primary surfactant in an oil-wet porous medium (with 10% initial oil saturation in the proppant packs) according to at least one embodiment of the present disclosure. The concentrations of primary surfactant tested ranged from about 500 ppm to about 8,000 ppm in synthetic brine. In this non-limiting example, Surfactant S-21 was chosen, though other surfactants are contemplated. The data presented in FIG. 21 was obtained at a temperature of about 115° C. and a pressure of about 242 bar. The foaming processes were conducted at a total flow rate of about 1 mL/min, with the foams having a volume ratio (v/v) of aqueous phase to volume of gas phase of about 15:85. Strong foams appeared in most cases. As shown in FIG. 21, the steady-state pressure drops of the foams ranged from about 70 psi (~4.8 bar) to about 100 psi (~6.9 bar).

Embodiments of the present disclosure generally relate to materials and methods for foam generation. More specifically, embodiments of the present disclosure relate to foaming agents, gas mobility control agents for use in porous media, compositions comprising such agents, methods for using such agents, methods for generating foams, and systems for enhanced oil recovery. As described herein, the inventors have found, at least, new and improved compositions, methods, and systems for generating foams. Embodiments of the present disclosure can enable the formation of stable foams where conventional technologies have failed.

Embodiments Listing

The present disclosure provides, among others, the following embodiments, each of which can be considered as optionally including any alternate embodiments:

Clause A1. A method for recovering oil from a porous rock formation, the method comprising:

contacting the porous rock formation with a foaming fluid and a surfactant solution;

generating a foam comprising the foaming fluid and the surfactant solution, the surfactant solution comprising brine and one or more surfactants, at least one surfactant of the one or more surfactants comprising a primary foaming agent represented by formula (FX1):

(FX1)

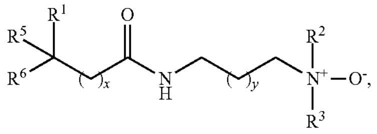

wherein:

x of formula (FX1) is a number selected from 6 to 13;

y of formula (FX1) is a number selected from 0 to 3;

each of $R^1$, $R^2$, $R^3$, $R^4$, $R^5$, and $R^6$ of formula (FX1), is, independently, hydrogen, substituted $C_{1-3}$ hydrocarbyl, or unsubstituted $C_{1-3}$ hydrocarbyl group; and when the surfactant solution comprises more than one surfactant, the primary foaming agent is the surfactant of highest concentration in the surfactant solution;

mobilizing oil from the porous rock formation by contacting the porous rock formation with the foam; and collecting at least a portion of the mobilized oil.

Clause A2. The method of Clause A1, wherein: $R^1$ of formula (FX1) is methyl; each of $R^5$ and $R^6$ of formula (FX1) is hydrogen; and the following moiety of formula (FX1)

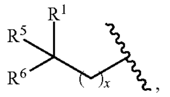

including the carbonyl carbon to which the moiety is attached, comprises an octyl, nonyl, decyl, undecyl, lauryl, tridecyl, myristyl, cetyl, stearyl, isostearyl, or oleyl alkyl group.

Clause A3. The method of Clause A1 or Clause A2, wherein at least one surfactant of the one or more surfactants independently comprise lauramidopropylamine oxide, myristamidopropylamine oxide, or a mixture of lauramidopropylamine oxide and myristamidopropylamine oxide.

Clause A4. The method of Clause A3, wherein, when the at least one surfactant of the one or more surfactants independently comprises lauramidopropylamine oxide, myristamidopropylamine oxide, or both, a ratio of lauramidopropylamine oxide to myristamidopropylamine oxide is from about 6:1 to about 3:1.

Clause A5. The method of any one of Clauses A1-A4, wherein:

x of formula (FX1) is a number selected from 9 to 11;

y of formula (FX1) is 1; and each of $R^5$ and $R^6$ of formula (FX1) is hydrogen.

Clause A6. The method of any one of Clauses A1-A5, wherein the primary foaming agent is represented by formula (FX2):

(FX2)

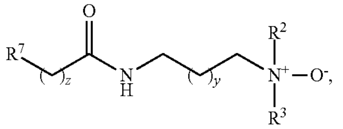

wherein:

y of formula (FX2) is a number selected from 0 to 3;

z of formula (FX2) is a number selected from 7 to 14; and $R^7$ of formula (FX2) is hydrogen, $C_{1-3}$ substituted hydrocarbyl group, or unsubstituted $C_{1-3}$ hydrocarbyl group.

Clause A7. The method of Clause A6, wherein each of $R^2$ and $R^3$ of formula (FX2) is methyl.

Clause A8. The method of any one of Clauses A1-A7, wherein the primary foaming agent has the structure:

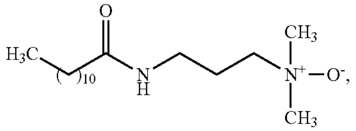

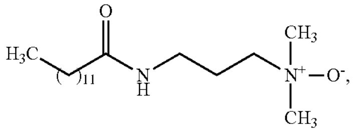

or

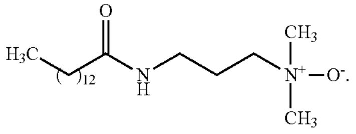

Clause A9. The method of any one of Clauses A1-A8, wherein a total dissolved salts content of the brine, excluding surfactant, is from about 5,000 mg/L to about 250,000 mg/L.

Clause A10. The method of any one of Clauses A1-A9, wherein the foaming fluid comprises:

about 50 wt % to about 100 wt % of a mixture of two or more hydrocarbons;

about 50 wt % to about 100 wt % of a pure hydrocarbon such as methane, ethane, or butane;

about 50 wt % to about 100 wt % $CO_2$; or about 50 wt % to about 100 wt % $N_2$; or combinations thereof.

Clause A11. The method of any one of Clauses A1-A10, wherein the foaming fluid comprises natural gas, air, combusted natural gas, or combinations thereof.

Clause A12. The method of any one of Clauses A1-A11, wherein:

the foam comprises:

a phase comprising the foaming fluid; and an aqueous phase comprising the brine and the one or more surfactants; and a volume ratio of the aqueous phase to the phase comprising the foaming fluid of the foam is from about 80:20 to about 2:98 when a temperature of the porous rock formation is selected from about 90° C. to about 115° C. and a pressure of the porous rock formation is selected from about 5 MPa to about 40 MPa.

Clause A13. The method of any one of Clauses A1-A12, wherein:

the foam comprises:

a phase comprising the foaming fluid; and an aqueous phase comprising the brine and the one or more surfactants; and a concentration of the primary foaming agent in the aqueous phase of the foam is from about 500 ppm to about 15,000 ppm when a temperature of the porous rock formation is selected from about 90° C. to about 115° C. and a pressure of the porous rock formation is selected from about 5.5 MPa to about 34.5 MPa.

Clause A14. The method of any one of Clauses A1-A13, wherein the one or more surfactants further comprise one or more additional surfactants selected from the group consisting of cocamidopropyl hydroxysultaine, cocamidopropyl betaine, and combinations thereof.

Clause A15. The method of any one of Clauses A1-A14, wherein the foam has an apparent viscosity value ranging from about 1 mPa·s (1 cP) to about 400 mPa·s (400 cP) when:

a flow rate of the foam is selected from about 0.01 mL/min to about 8 mL/min; and the porous rock formation has a temperature selected from about 90° C. to about 115° C. and a pressure selected from about 5.5 MPa to about 34.5 MPa.

Clause A16. The method of any one of Clauses A1-A15, wherein the foam generated in hydrophilic consolidated porous media has a foam stability selected from about 15 hours to about 18 hours in the absence of oil when a temperature of the porous rock formation is selected from about 90° C. to about 115° C. and a pressure of the porous rock formation is selected from about 5.5 MPa to about 34.5 MPa.

Clause A17. The method of any one of Clauses A1-A16, wherein the foam generated in hydrophilic consolidated porous media has a foam stability selected from about 4 hours to about 5 hours in the presence of oil when a temperature of the porous rock formation is selected from about 90° C. to about 115° C. and a pressure of the porous rock formation is selected from about 5.5 MPa to about 34.5 MPa.

Clause A18. The method of any one of Clauses A1-A17, wherein the surfactant solution comprises a brine of the porous rock formation or a synthetic brine.

Clause A19. The method of any one of Clauses A1-A18, wherein the porous rock formation is within a hydraulically fractured unconventional reservoir or a hydraulically fractured conventional reservoir.

Clause A20. The method of Clause A19, wherein, when the hydraulically fractured unconventional reservoir or the hydraulically fractured conventional reservoir is propped, the method further comprises:

creating fractures in the porous rock formation; and propping the fractures open via administration of a proppant.

Clause A21. The method of Clause A19, wherein the hydraulically fractured unconventional reservoir or the hydraulically fractured conventional reservoir is unpropped.

Clause A22. The method of any one of Clauses A1-A21, wherein the porous rock formation is water-wet.

Clause A23. The method of any one of Clauses A1-A22, wherein the porous rock formation is oil-wet.

Clause A24. The method of any one of Clauses A1-A23, wherein the foam is introduced to the porous rock formation at a total flow rate of about 0.01 mL/min to about 8 mL/min.

Clause A25. The method of any one of Clauses A1-A24, wherein the foam is introduced to the porous rock formation at a pressure of about 5 MPa to about 40 MPa.

Clause A26. The method of any one of Clauses A1-A25, wherein the foam is introduced to the porous rock formation at a temperature of about 90° C. to about 115° C.

Clause B1. A method for recovering oil, comprising:

injecting a foaming fluid and a surfactant solution into a porous rock formation, wherein:

the surfactant solution comprises one or more surfactants;

a first surfactant of the one or more surfactants comprises lauramidopropylamine oxide, myristamidopropylamine oxide, or a mixture of lauramidopropylamine oxide and myristamidopropylamine oxide; and when the surfactant solution comprises more than one surfactant, the first surfactant is present in the surfactant solution at a higher concentration than other surfactants;

generating a foam comprising the foaming fluid, the surfactant solution, and a brine of the porous rock formation;

mobilizing oil from the porous rock formation by contacting the porous rock formation with the foam; and collecting at least a portion of the mobilized oil.

Clause C1. A composition for oil recovery, comprising:

a foam comprising:

a phase comprising one or more foaming fluids; and an aqueous phase comprising one or more surfactants and brine, the one or more surfactants comprising a primary foaming agent represented by formula (FX1):

(FX1)

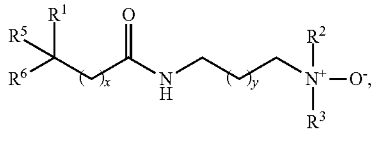

wherein:

x of formula (FX1) is a number selected from 6 to 13;

y of formula (FX1) is a number selected from 0 to 3;

each of $R^1$, $R^2$, $R^3$, $R^4$, $R^5$, and $R^6$ of formula (FX1), is, independently, hydrogen, substituted $C_{1-3}$ hydrocarbyl group, or unsubstituted $C_{1-3}$ hydrocarbyl group; and when more than one surfactant is present, the primary foaming agent has the highest concentration of the surfactants.

Clause C2. The composition of Clause C1, wherein the brine is from a porous rock formation of an unconventional reservoir or a conventional reservoir.

Clause C3. The composition of Clause C1 or Clause C2, further comprising a proppant.

Clause C4. The composition of any one of Clauses $C_1$-$C_3$, further comprising oil, the oil comprising oil produced from a porous rock formation or a different oil.

Clause C5. The composition of any one of Clauses $C_1$-$C_4$, wherein:

$R^1$ of formula (FX1) is methyl;

each of $R^5$ and $R^6$ of formula (FX1) is hydrogen; and the following moiety of formula (FX1)

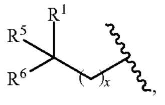

including the carbonyl carbon to which the moiety is attached, comprises an octyl, nonyl, decyl, undecyl, lauryl, tridecyl, myristyl, cetyl, stearyl, isostearyl, or oleyl alkyl group.

Clause C6. The composition of any one of Clauses $C_1$-$C_5$, wherein at least one surfactant of the one or more surfactants independently comprises lauramidopropylamine oxide, myristamidopropylamine oxide, or a mixture of lauramidopropylamine oxide and myristamidopropylamine oxide.

Clause C7. The composition of any one of Clauses $C_1$-$C_6$, wherein, when at least one surfactant of the one or more surfactants independently comprises lauramidopropylamine oxide, myristamidopropylamine oxide, or both, a ratio of lauramidopropylamine oxide to myristamidopropylamine oxide is from about 6:1 to about 3:1.

Clause C8. The composition of any one of Clauses $C_1$-$C_7$, wherein:

x of formula (FX1) is a number selected from 9 to 11;

y of formula (FX1) is 1; and each of $R^5$ and $R^6$ of formula (FX1) is hydrogen.

Clause C9. The composition of any one of Clause $C_1$-$C_8$, wherein the primary foaming agent is represented by formula (FX2):

(FX2)

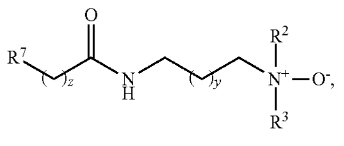

wherein:

y of formula (FX2) is a number selected from 0 to 3;

z of formula (FX2) is a number selected from 10 to 12; and $R^7$ of formula (FX2) is hydrogen, $C_{1-3}$ substituted hydrocarbyl group, or unsubstituted $C_{1-3}$ hydrocarbyl group.

Clause C10. The composition of Clause C9, wherein each of $R^2$ and $R^3$ of formula (FX2) is methyl.

Clause C11. The composition of any one of Clauses $C_1$-$C_{10}$, wherein the primary foaming agent has the structure:

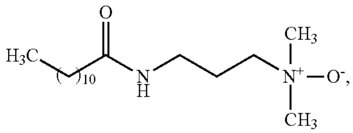

,

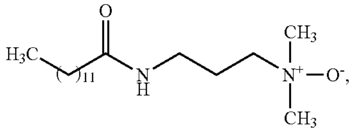

or

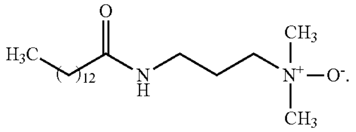

.

Clause C12. The composition of any one of Clauses $C_1$-$C_{11}$, wherein a concentration of the primary foaming agent in the brine is from about 500 ppm to about 15,000 ppm.

Clause C13. The composition of any one of Clauses $C_1$-$C_{12}$, wherein the one or more surfactants further comprise one or more additional surfactants selected from the group consisting of cocamidopropyl hydroxysultaine, cocamidopropyl betaine, and combinations thereof.

Clause C14. The composition of any one of Clauses $C_1$-$C_{14}$, wherein a total dissolved salts content of the brine, excluding surfactant, is from about 5,000 mg/L to about 250,000 mg/L.

Clause C15. The composition of any one of Clauses $C_1$-$C_{14}$, wherein the brine comprises:

from about 13 wt % to about 18 wt % sodium chloride, an ion thereof, or both;

from about 2 wt % to about 6 wt % calcium chloride, an ion thereof, or both;

from about 0.2 wt % to about 0.7 wt % magnesium chloride, an ion thereof, or both; or combinations thereof.

Clause C16. The composition of any one of Clauses $C_1$-$C_{15}$, wherein the one or more foaming fluids comprises:

about 50 wt % to about 100 wt % of a mixture of two or more hydrocarbons;

about 50 wt % to about 100 wt % of a pure hydrocarbon such as methane, ethane, or butane;

about 50 wt % to about 100 wt % $CO_2$; or about 50 wt % to about 100 wt % $N_2$; or combinations thereof.

Clause C17. The composition of any one of Clauses $C_1$-$C_{16}$, wherein the one or more foaming fluids comprises natural gas, air, combusted natural gas, or combinations thereof.

Clause C18. The composition of any one of Clauses $C_1$-$C_{17}$, wherein a volume ratio of the phase comprising the one or more foaming fluids to the aqueous phase is from about 20:80 to about 98:2.

Clause D1. A composition for oil recovery, comprising:

a foam comprising:

a phase comprising one or more foaming fluids; and an aqueous phase comprising one or more surfactants and a brine, the one or more surfactants comprising a primary foaming agent, the primary foaming agent comprising lauramidopropylamine oxide, myristamidopropylamine oxide, or a mixture of lauramidopropylamine oxide and myristamidopropylamine oxide, wherein, when more than one surfactant is present, the primary foaming agent has the highest concentration of the more than one surfactant present.

Clause E1. An enhanced oil recovery system, comprising:

a rock formation;

a foam comprising:

a phase comprising one or more foaming fluids; and an aqueous phase comprising one or more surfactants in brine solution, the one or more surfactants comprising a primary foaming agent represented by formula (FX1):

(FX1)

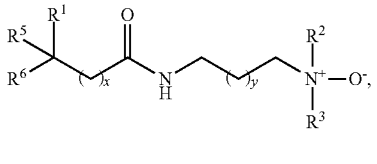

wherein:

x of formula (FX1) is a number selected from 6 to 13;

y of formula (FX1) is a number selected from 0 to 3;

each of $R^1$, $R^2$, $R^3$, $R^4$, $R^5$, and $R^6$ of formula (FX1), is, independently, hydrogen, substituted $C_{1-3}$ hydrocarbyl group, or unsubstituted $C_{1-3}$ hydrocarbyl group; and when more than one surfactant is present, the primary foaming agent has the highest concentration of the more than one surfactant present;

a proppant; and subterranean oil.

Clause E2. The enhanced oil recovery system of Clause E1, wherein: $R^1$ of formula (FX1) is methyl;

each of $R^5$ and $R^6$ of formula (FX1) is hydrogen; and the following moiety of the formula (FX1)

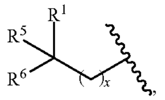

including the carbonyl carbon to which the moiety is attached, comprises an octyl, nonyl, decyl, undecyl, lauryl, tridecyl, myristyl, cetyl, stearyl, isostearyl, or oleyl group.

Clause F1. An enhanced oil recovery system, comprising:

a rock formation;

a subterranean oil; and a foam comprising:

a phase comprising one or more foaming fluids; and an aqueous phase comprising one or more surfactants in brine solution, the one or more surfactants comprising a primary foaming agent, the primary foaming agent comprising lauramidopropylamine oxide, myristamidopropylamine oxide, or a mixture of lauramidopropylamine oxide and myristamidopropylamine oxide.

Clause F2. The enhanced oil recovery system of Clause F1, wherein, when more than one surfactant is present, the primary foaming agent has the highest concentration of the more than one surfactant present.

Clause G1. A composition for oil recovery, comprising: a surfactant represented by formula (FX1):

(FX1)

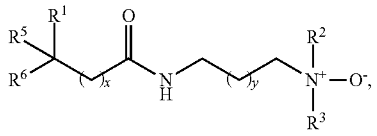

wherein:

x of formula (FX1) is a number selected from 6 to 13;

y of formula (FX1) is a number selected from 0 to 3; and each of $R^1$, $R^2$, $R^3$, $R^4$, $R^5$, and $R^6$ of formula (FX1), is, independently, hydrogen, substituted $C_{1-3}$ hydrocarbyl group, or unsubstituted $C_{1-3}$ hydrocarbyl group.

As is apparent from the foregoing general description and the specific aspects, while forms of the aspects have been illustrated and described, various modifications can be made without departing from the spirit and scope of the present disclosure. Accordingly, it is not intended that the present disclosure be limited thereby. Likewise, the term "comprising" is considered synonymous with the term "including." Likewise whenever a composition, process operation, process operations, an element or a group of elements is preceded with the transitional phrase "comprising," it is understood that we also contemplate the same composition or group of elements with transitional phrases "consisting essentially of," "consisting of," "selected from the group of consisting of," or "Is" preceding the recitation of the composition, process operation, process operations, element, or elements and vice versa, such as the terms "comprising," "consisting essentially of," "consisting of" also include the product of the combinations of elements listed after the term.

For purposes of this present disclosure, and unless otherwise specified, all numerical values within the detailed description and the claims herein are modified by "about" or "approximately" the indicated value, and consider experimental error and variations that would be expected by a person having ordinary skill in the art. For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. For example, the recitation of the numerical range 1 to 5 includes the subranges 1 to 4, 1.5 to 4.5, 1 to 2, among other subranges. As another example, the recitation of the numerical ranges 1 to 5, such as 2 to 4, includes the subranges 1 to 4 and 2 to 5, among other subranges. Additionally, within a range includes every point or individual value between its end points even though not explicitly recited. For example, the recitation of the numerical range 1 to 5 includes the numbers 1, 1.5, 2, 2.75, 3, 3.80, 4, 5, among other numbers. Thus, every point or individual value may serve as its own lower or upper limit combined with any other point or individual value or any other lower or upper limit, to recite a range not explicitly recited References cited herein are incorporated by reference herein in their entirety to indicate the state of the art as of their publication or filing date and it is intended that this information can be employed herein, if needed, to exclude specific embodiments that are in the prior art.

As used herein, the indefinite article "a" or "an" shall mean "at least one" unless specified to the contrary or the context clearly indicates otherwise. For example, embodiments comprising "a surfactant" include embodiments comprising one, two, or more surfactants, unless specified to the contrary or the context clearly indicates only one surfactant is included.

While the foregoing is directed to embodiments of the present disclosure, other and further embodiments of the disclosure may be devised without departing from the basic scope thereof, and the scope thereof is determined by the claims that follow.

What is claimed is:

1. A method for recovering oil from a porous rock formation, the method comprising:

contacting a porous rock formation with a foaming fluid and a surfactant solution;

generating a foam comprising the foaming fluid and the surfactant solution, the surfactant solution comprising brine, a first surfactant represented by formula (FX1), and a second surfactant represented by formula (FX1):

(FX1)

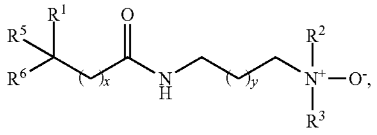

wherein:

x of formula (FX1) is a number selected from 6 to 13;

y of formula (FX1) is a number selected from 0 to 3;

each of $R^1$, $R^2$, $R^3$, $R^4$, $R^5$, and $R^6$ of formula (FX1), is, independently, hydrogen, substituted $C_{1-3}$ hydrocarbyl, or unsubstituted $C_{1-3}$ hydrocarbyl group;

the first surfactant represented by formula (FX1) and the second surfactant represented by formula (FX1) are different; and the first surfactant represented by formula (FX1) is the surfactant of highest concentration in the surfactant solution;

mobilizing oil from the porous rock formation by contacting the porous rock formation with the foam; and collecting at least a portion of the mobilized oil.

2. The method of claim 1, wherein:

$R^1$ of formula (FX1) is methyl;

each of $R^5$ and $R^6$ of formula (FX1) is hydrogen; and the following moiety of formula (FX1)

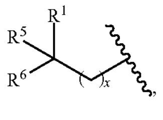

including the carbonyl carbon to which the moiety is attached, comprises an octyl, nonyl, decyl, undecyl, lauryl, tridecyl, myristyl, cetyl, stearyl, isostearyl, or oleyl alkyl group.

3. The method of claim 1, wherein at least one of the first surfactant represented by formula (FX1) and the second surfactant represented by formula (FX1) independently comprises lauramidopropylamine oxide or myristamidopropylamine oxide.

4. The method of claim 1, wherein a ratio of the first surfactant represented by formula (FX1) to the second surfactant represented by formula (FX1) is from about 6:1 to about 3:1.

5. The method of claim 1, wherein:

x of formula (FX1) is a number selected from 9 to 11;

y of formula (FX1) is 1; and each of $R^5$ and $R^6$ of formula (FX1) is hydrogen.

6. The method of claim 1, wherein the first surfactant represented by formula (FX1) comprises:

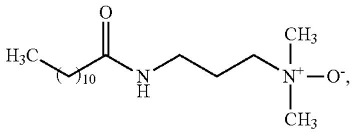,

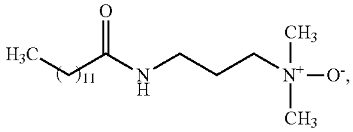, or

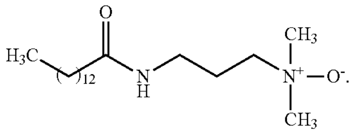.

7. The method of claim 1, wherein a total dissolved salts content of the brine, excluding surfactant, is from about 5,000 mg/L to about 250,000 mg/L.

8. The method of claim 1, wherein the foaming fluid comprises:

about 50 wt % to about 100 wt % of a mixture of two or more hydrocarbons;

about 50 wt % to about 100 wt % of a pure hydrocarbon;

about 50 wt % to about 100 wt % $CO_2$;

about 50 wt % to about 100 wt % $N_2$; or combinations thereof.

9. The method of claim 1, wherein the foaming fluid comprises about 50 wt % to about 100 wt % $CO_2$.

10. The method of claim 1, wherein:

the foam comprises:

a phase comprising the foaming fluid; and an aqueous phase comprising the brine, the first surfactant represented by formula (FX1), and the second surfactant represented by formula (FX1); and a volume ratio of the aqueous phase to the phase comprising the foaming fluid of the foam is from about 80:20 to about 2:98 when a temperature of the porous rock formation is selected from about 90° C. to about 115° C. and a pressure of the porous rock formation is selected from about 5 MPa to about 40 MPa.

11. The method of claim 1, wherein the surfactant solution further comprises one or more additional surfactants selected from the group consisting of cocamidopropyl hydroxysultaine, cocamidopropyl betaine, and combinations thereof.

12. The method of claim 1, wherein:

the foam is introduced to the porous rock formation at a pressure of about 5 MPa to about 40 MPa;

the foam is introduced to the porous rock formation at a temperature of about 90° C. to about 115° C.; or combinations thereof.

13. The method of claim 1, wherein the brine comprises brine from the porous rock formation.

14. The method of claim 1, wherein a total dissolved salts content of the brine, excluding surfactant, is from about 100 ppm to 10,000 ppm.

15. The method of claim 1, wherein a total dissolved salts content of the brine, excluding surfactant, is from about 100,000 ppm to about 400,000 ppm.

16. The method of claim 1, wherein the porous rock formation is oil-wet prior to contacting the porous rock formation with the foaming fluid and the surfactant solution.

17. The method of claim 1, wherein the porous rock formation is fractured porous media.

* * * * *